US010967255B2

(12) United States Patent
Rosado

(10) Patent No.: US 10,967,255 B2
(45) Date of Patent: Apr. 6, 2021

(54) VIRTUAL REALITY SYSTEM FOR FACILITATING PARTICIPATION IN EVENTS

(71) Applicant: Brandon Rosado, Orlando, FL (US)

(72) Inventor: Brandon Rosado, Orlando, FL (US)

( * ) Notice: Subject to any disclaimer, the term of this patent is extended or adjusted under 35 U.S.C. 154(b) by 0 days.

(21) Appl. No.: 15/991,605

(22) Filed: May 29, 2018

(65) Prior Publication Data

US 2018/0342106 A1 Nov. 29, 2018

Related U.S. Application Data

(60) Provisional application No. 62/511,642, filed on May 26, 2017.

(51) Int. Cl.

| G06T 19/00 | (2011.01) |
|---|---|
| G06T 17/05 | (2011.01) |
| G06T 7/521 | (2017.01) |
| H04L 29/06 | (2006.01) |
| G06T 7/20 | (2017.01) |

(Continued)

(52) U.S. Cl.
CPC ............. *A63F 13/35* (2014.09); *A63F 13/60* (2014.09); *A63F 13/65* (2014.09); *A63F 13/795* (2014.09); *A63F 13/86* (2014.09); *G06F 3/011* (2013.01); *G06Q 10/02* (2013.01); *G06Q 10/10* (2013.01); *G06Q 10/109* (2013.01); *G06Q 50/01* (2013.01); *G06T 7/20* (2013.01); *G06T 7/521* (2017.01); *G06T 15/506* (2013.01); *G06T 17/05* (2013.01); *G06T 19/003* (2013.01); *G06T 19/006* (2013.01); *G06T 19/20* (2013.01);

(Continued)

(58) Field of Classification Search
CPC ......... G06T 19/006; G06T 7/20; G06T 7/521; G06T 15/506; G06T 17/05; A63F 13/35; A63F 13/65; A63F 13/86; A63F 13/60; A63F 13/795; G06Q 10/10; G06Q 10/109; G06Q 50/01; H04W 12/06; H04L 67/38

See application file for complete search history.

(56) References Cited

U.S. PATENT DOCUMENTS

| 10,638,122 B1 * | 4/2020 | Rao .................... G06F 1/163 |
| 2008/0215973 A1 * | 9/2008 | Zalewski ............. A63F 13/35 715/706 |

(Continued)

*Primary Examiner* — Michael Le
(74) *Attorney, Agent, or Firm* — Akerman LLP; Mammen (Roy) P. Zachariah, Jr.

(57) ABSTRACT

A system for providing a virtual reality system is disclosed. In particular, the system provides a game-simulation hybrid that provides a massive online virtual world and accompanying network based around user profiles, events, activities, challenges, virtual lifestyle, and advertising. The system enables users to actively participate in live events or activities occurring in locations remote from the users by rendering digital versions of the live events or activities via applications executing on the computing devices of the users. The digital versions of the live events may be rendered within the virtual world and the system may enable users to interact in the virtual world in meaningful ways. For example, the system may enable users to communicate with other users during the rendering of the live events or activities, participate in the rendered live events with other users, interact with and purchase various rendered goods and services, among other functionality.

20 Claims, 48 Drawing Sheets

(51) Int. Cl.

| | | |
|---|---|---|
| *G06T 15/50* | (2011.01) | |
| *G06F 3/01* | (2006.01) | |
| *A63F 13/60* | (2014.01) | |
| *H04W 12/06* | (2021.01) | |
| *G06T 19/20* | (2011.01) | |
| *A63F 13/35* | (2014.01) | |
| *A63F 13/65* | (2014.01) | |
| *A63F 13/86* | (2014.01) | |
| *G06Q 50/00* | (2012.01) | |
| *G06Q 10/10* | (2012.01) | |
| *A63F 13/795* | (2014.01) | |
| *G06Q 10/02* | (2012.01) | |

(52) U.S. Cl.
CPC ......... *H04L 67/38* (2013.01); *H04W 12/0608* (2019.01); *A63F 2300/69* (2013.01); *G06T 2219/2004* (2013.01)

(56) References Cited

U.S. PATENT DOCUMENTS

| | | | |
|---|---|---|---|
| 2013/0205243 A1* | 8/2013 | Rivera | H04L 63/123 715/776 |
| 2013/0215116 A1* | 8/2013 | Siddique | G06Q 20/204 345/420 |
| 2015/0058324 A1* | 2/2015 | Kauwe | G06F 16/284 707/722 |
| 2015/0131845 A1* | 5/2015 | Forouhar | G06F 16/71 382/100 |
| 2016/0026253 A1* | 1/2016 | Bradski | H04N 13/344 345/8 |
| 2016/0170998 A1* | 6/2016 | Frank | G06Q 30/0251 707/748 |
| 2016/0350973 A1* | 12/2016 | Shapira | G06F 3/017 |
| 2018/0032997 A1* | 2/2018 | Gordon | G06Q 30/0269 |

* cited by examiner

Product form on Merchant Website

FIG. 30

VIRTUAL REALITY SYSTEM FOR FACILITATING PARTICIPATION IN EVENTS

CROSS-REFERENCE TO RELATED APPLICATIONS

The application claims priority to and the benefit of U.S. Provisional Patent Application No. 62/511,642, filed on May 26, 2017, which is hereby incorporated by reference in its entirety.

FIELD OF THE INVENTION

The present application relates to virtual reality technologies, augmented reality technologies, simulation technologies, gaming technologies, social network technologies, and computing technologies, and more particularly, to a virtual reality system and associated methods.

BACKGROUND

In today's technologically-driven society, there exist various systems and methods for facilitating interaction with digital content and facilitating interactions between users, who may be located in a variety of different locations. As an example, virtual reality systems and methods exist, which allow a user to utilize a virtual reality headset in combination with one or more software applications to enable a user to interact with various digital, characters, objects, and content provided in a digital world or landscape generated and rendered using such applications. As another example, augmented reality systems and methods allow for the superimposition of computer-generated content within a user's view of the real world through the visual interface of a computing device, such as a mobile smartphone or a laptop. As another example, currently existing social media applications enable users to create user accounts and profiles with such applications so as to enable the users to digitally befriend one another and to perform interactions with each other. Such interactions may include, but are not limited to, posting online media content to user profiles and digital walls, participating in electronic messaging communications with users utilizing the applications, liking or disliking posted content, editing and/or filtering content, finding friends, performing a variety of other interactions, or a combination thereof. As a further example, currently existing gaming applications allow users in remote locations to participate in various types of digital games with each other and communicate with each other, such as by using gaming headsets and/or electronic messaging.

While such technologies exist today, currently existing versions of technologies and processes still have many shortcomings. For example, even though current technologies enable users to interact with one another, the interactions are often brief and do not result in meaningful, rich, and long-term interactions. Additionally, current technologies and processes do not provide a meaningful integration of social media with virtual reality and augmented reality systems. Moreover, while current technologies have been utilized to attract users to various types of content, activities, and products, currently existing technologies have not provided optimal or engaging ways of doing so. Still further, currently existing technologies do not readily allow users to readily explore and discover new interests. As a result, current technologies and processes may be modified and improved so as to provide enhanced functionality and features for users to interact and participate in events with one another in a more effective manner. Such enhancements and improvements may provide for improved user satisfaction, improved and meaningful user interaction, increased access to meaningful data, increased user engagement with such systems, and increased ease-of-use for users.

SUMMARY

A unique virtual reality system (i.e. the Virtuoso system) and accompanying methods for operating and utilizing the virtual reality system are disclosed. In particular, the system and accompanying methods provide for a virtual reality system that enables users to actively participate in live events or activities occurring in locations remote from the users by rendering, in real-time, digital versions of the live events or activities that are readily accessible via applications executing on the computing devices of the users. Additionally, the system and accompanying methods provide a novel way for users to interact with each other in a digital/virtual world in meaningful ways. These and other features of the virtual reality system and methods for operating and utilizing the virtual reality system are described in the following detailed description, drawings, and appended claims.

In certain embodiments, the virtual reality system and accompanying methods may include creating a virtual world including a massive online multiplayer social network based around user profiles, events, activities, challenges, virtual lifestyle, and advertising. The virtual reality system and methods provide a connected and real world integration for social media and major brand activation on a level of immersion that is unmatched and symbiotic to the real world economy through gamifying micro-economics. The system and methods also focuses on enhancing user and/or device self-awareness, speculation, world understanding, and learning. Certain data will be gathered to help the real world market grow and evolve, such as, but not limited to, advertising engagement, communication influence, behavior analysis, and numerical data. In certain embodiments, the system and methods provide a game-simulation hybrid developed in a software engine, such as Unreal Engine 4 or other suitable software engine, designed for use collectively with others in virtual reality. The present disclosure provides insight into the development roadmap and many of the concepts in which are integrated into the system and methods to provide a great and well-rounded experience for users and/or devices that explores the larger potentials of the emerging industry of virtual reality. The system and methods also have the capabilities to revolutionize online communities, marketing, and social media as a whole.

In further embodiments, the system and methods aim to create rich social interaction between users by developing an immersive multi-world global community based on major shared interests. Additionally, the system and methods allow people to come together over similar interests and grant the ability for people to explore and discover new interests in a social environment. Multiple layers of social interaction are responsible for the positive atmosphere the system and methods create. The system and methods embrace an individual's personality and allow the individual to meet new people to share their social media with, create constructive friend groups, partake in group activities, surveys, challenges, creations, education, and enjoy live acts or performances together. Users and/or devices will also work together to gain experience in a multi-faceted behavior system which is put together to assist in creating an online community that promotes the values of kindness, self-awareness, integrity, togetherness, creativity, support, and forward thinking.

In one embodiment, a unique virtual reality system is disclosed. The system may include a memory that stores instructions and a processor that executes the instructions to perform operations conducted by the system. The system may perform an operation that includes receiving, via a client application executing on a first user device, authentication credentials associated with a user of the client application. Based on the authentication credentials, the system may log the user into the client application. After logging the user into the client application, the system may perform an operation that includes generating and/or loading a virtual home for the user and an avatar for the user. In certain embodiments, the virtual home may be rendered and viewable via a graphical user interface of the client application and may reside within a virtual world rendered by the client application. The system may then perform an operation that includes enabling, via the client application, the user to join a live event or activity occurring in a real world. Additionally, the system may perform an operation that includes digitally rendering a digital version of the live event or activity within the virtual world. Furthermore, the system may perform an operation that includes enabling, via the client application, the user to participate in the digital version of the live event or activity.

In another embodiment, a method for providing a virtual reality system is disclosed. The method may include utilizing a memory that stores instructions, and a processor that executes the instructions to perform the various functions of the method. In particular, the method may include receiving, via a client application executing on a first user device, authentication credentials associated with a user of the client application. Based on the authentication credentials, the method may include logging the user into the client application. Once the user is logged into the client application, the method may include loading a virtual home for the user and an avatar for the user. In certain embodiments, the virtual home may be rendered and viewable via a graphical user interface of the client application and may reside within a virtual world rendered by the client application. The method may then include enabling, via the client application, the user to join a live event or activity occurring in a real world. Additionally, the method may include digitally rendering a digital version of the live event or activity within the virtual world. Furthermore, the method may include enabling, via the client application, the user to participate in the digital version of the live event or activity.

These and other features of the systems and methods for providing a virtual reality system are described in the following detailed description, drawings, and appended claims.

BRIEF DESCRIPTION OF THE DRAWINGS

FIG. 30 illustrates a sample digital form that a digital merchant may fill out to place an item for purchase in the virtual world.

DETAILED DESCRIPTION OF THE INVENTION

Figure 1:
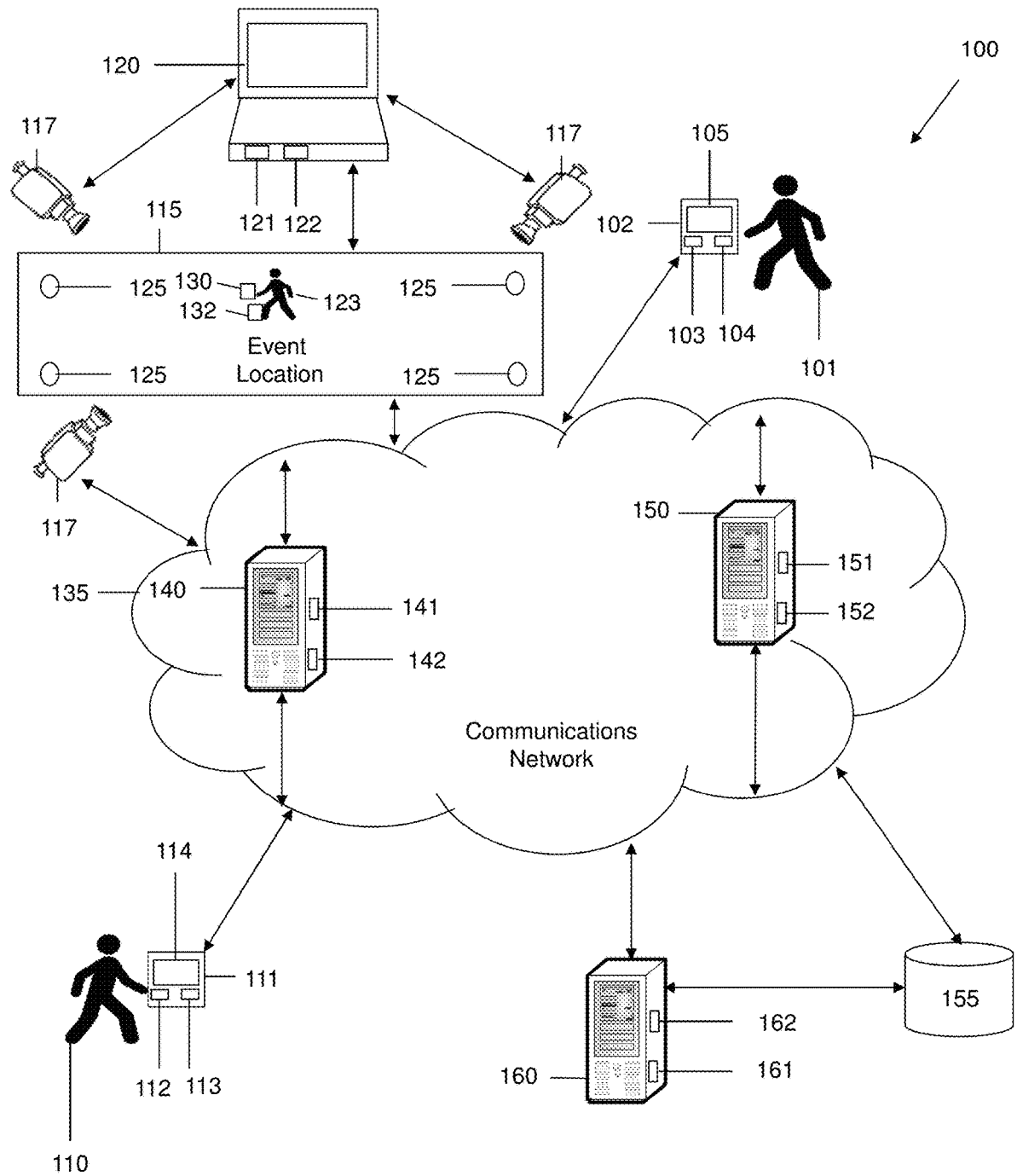
FIG. 1 is a schematic diagram of a system for providing a virtual reality system according to an embodiment of the present disclosure.

A virtual reality system 100 and methods for utilizing and operating the virtual reality system 100 are disclosed. In particular, the system 100 and accompanying methods provide for a virtual reality system that enables users to actively participate in live events or activities occurring in locations remote from the users by rendering, in real-time, digital versions of the live events or activities that are readily accessible via applications executing on the computing devices of the users. Additionally, the system 100 and accompanying methods enable users to interact with each other in a digital/virtual world in meaningful ways. In certain embodiments, the system 100 and accompanying methods may include creating a virtual world including a massive online multiplayer social network based around user profiles, events, activities, challenges, virtual lifestyle, and advertising. The system 100 and methods provide a connected and real world integration for social media and major brand activation on a level of immersion that is unmatched and symbiotic to the real world economy through gamifying micro-economics. The system 100 and methods also focuses on enhancing user and/or device self-awareness, speculation, world understanding, and learning. In certain embodiments, the system 100 and methods gather data to help the real world market grow and evolve, such as, but not limited to, advertising engagement, communication influence, behavior analysis, and numerical data. In certain embodiments, the system 100 and methods provide a game-simulation hybrid developed in a software engine designed for use collectively with others in virtual reality. The present disclosure provides insight into the development roadmap and many of the concepts in which are integrated into the system 100 and methods to provide a great and well-rounded experience for users and/or devices that explores the larger potentials of the emerging industry of virtual reality. The system and methods also have the capabilities to revolutionize online communities, marketing, and social media as a whole.

In certain embodiments, the system 100 and methods aim to create rich social interaction between users by developing an immersive multi-world global community based on major shared interests. Additionally, the system 100 and methods allow users to come together over similar interests and grant the ability for users to explore and discover new interests in a social environment. The system 100 and methods may provide multiple layers of social interaction to foster a positive atmosphere among the users of the system 100. The system 100 and methods embrace a user's personality and allow the users to meet new users to share their social media with, create constructive friend groups, partake in group activities, surveys, challenges, creations, education, and enjoy live acts or performances together. The system 100 and methods may also enable users and/or devices to work together to gain experience in a multi-faceted behavior system which may be put together to assist in creating an online community that promotes the values of kindness, self-awareness, integrity, togetherness, creativity, support, and forward thinking.

As shown in FIGS. 1-48, a system 100 for providing a unique virtual reality system is disclosed. The system 100 may be configured to support, but is not limited to supporting, data and content services, virtual reality services, augmented reality services, machine learning services, artificial intelligence services, computing applications and services, cloud computing services, internet services, satellite services, telephone services, software as a service (SaaS) applications, mobile applications and services, and any other computing applications and services. The system 100 may be developed in a software-based engine and may support any type of virtual reality devices, such as, but not limited to, Oculus Rift and HTC Vive, among other virtual reality devices. The system may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may be desiring to participate in an event or activity, such as, but not limited to, a concert, a sports game, a nightclub event, a dancing event, a work-related project, a social event, any other type of activity or event, or any combination thereof. For example, the first user 101 may be an individual that is searching for a concert that is tailored to his interests. If the first user 101 is interested in electronic dance music, the first user 101 may desire to attend an event that plays electronic dance music or is attended by other people having similar interests as the first user 101. The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality.

In addition to the first user 101, the system 100 may include a second user 110, who may utilize a second user device 111 to access data, content, and applications, or to perform a variety of other tasks and functions. The second user 110 may also be searching for an event or activity to participate in. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1.

In certain embodiments, the first user device 102 and the second user device 111 may have any number of software applications and/or application services stored and/or accessible thereon. For example, the first and second user devices 102, 111 may include virtual reality applications, augmented reality applications, cloud-based applications, location-determining applications, GPS applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for generating and rendering virtual reality worlds and content, applications for generating and transmitting electronic messages, applications for generating and transmitting various types of content, any other type of applications, or a combination thereof. In certain embodiments, the first and second user devices 102, 111 may include associated telephone numbers, internet protocol addresses, device identities, or any other identifiers to uniquely identify the first and second user devices 102, 111.

The system 100 may include a location 115, which may be any type of location that an event, activity, and/or gathering may take place. For example, the location 115 may be a concert hall, an amphitheater, a movie theater, campgrounds, a beach location, a location within a building, a location on top of or under a building, a field, a stadium, any type of location, or a combination thereof. In certain embodiments, the first and/or second users 101, 110 may desire to be at the location 115, but may be unable to physically do so for a variety of reasons. Nevertheless, the first and/or second users 101, 110 may desire to communicate with others at the location 115, participate in an event at the location, and/or otherwise engage with the location 115 despite being located remotely from the location 115.

The system 100 may also include one or more cameras 117, which may be any type of camera. In certain embodiments, the cameras 117 may be configured to include a memory that stores instructions and a processor that executes the instructions from the memory to perform the various operative functionality of the cameras 117. The cameras 117 may also be configured to communicate with any other device in the system 100 or outside the system 100, such as via short-range wireless communications, long-range wireless communications, any type of communication technology, or a combination thereof. In certain embodiments, the cameras 117 may have any functionality of any traditional digital or non-digital camera, and may be configured to capture, manipulate, and/or process audio, video, a combination of audio and video, motion capture content, augmented reality content, virtual reality content, any type of content, or any combination thereof. In certain embodiments, the cameras 117 may be configured with infrared technology, motion detectors, laser detectors, or any other type of detector to assist in determine a position, movement, velocity, or other information associated with an object at the location 115 within a view of the cameras 117. In certain embodiments, any number of cameras 117 may be positioned at any position at the location 115 and/or any position in proximity to the location 115. For example, in FIG. 1, two cameras 117 are illustratively being shown at the location 115, at which a concert or other activity may be occurring.

In certain embodiments, the cameras 117 may also include a microphone for receiving and recording sound inputs occurring at the location 115. The cameras 117 may also include emitters, which may be light emitters that can project a pattern of light, such as infrared or other types of light at the location 115. In certain embodiments, the cameras 117 may capture media content and may be configured to include one or more depths sensors that may be configured to obtain depth information associated with objects at the location 115 and/or the location 115 itself. The depth information may be utilized to create three-dimensional images of the objects and/or the location 115. The media content recorded by the cameras 117 may include visual content, audio content, and/or any other recordable content. In one embodiment, the cameras 117 may capture media content associated with the first and/or second users 101, 110 and the location 115. Notably, the cameras 117 may be communicatively linked with any of the components in the system 100 and may transmit information generated or received by the cameras 117 to any of the other components in the system 100 (e.g. database 155, server 140, sensors 125, computing device 120, etc.), such as by utilizing communications network 135.

As indicated above, the cameras 117 may be utilized to generate three-dimensional depth images. In certain embodiments, the cameras 117 may utilize any suitable technique such as stereoscopy, structured light, any type of three-dimensional depth imaging technique, and/or other techniques. For example, the cameras 117 may project a light pattern of pixels at the location 115. In certain embodiments, the light pattern may be an infrared light grid pattern, ultraviolet light grid pattern, or other pattern that may be utilized for generating three-dimensional images. As the light grid pattern contacts the surfaces of the various objects at the location 115 (e.g. a performer at the location 115 such as user 123 and/or any number of other users), the cameras 117 may detect deformations, distortions, alterations, or a combination thereof, in the light grid pattern to calculate the depth and surface information of the objects at the location 115. As the depth and surface information is obtained by cameras 117, processors of the cameras 117 can process the depth information to generate three-dimensional depth images corresponding to the objects at the location 115 and/or the location 115 itself. The three-dimensional depth images can enable the cameras 117 to distinguish various objects in the environment from one another.

In certain embodiments, the system 100 can determine a position of an object at the location 115 relative to the location 115, to the computing device 120, to other objects at the location 115, or to any other object within the range of the system 100. In certain embodiments, the position of the objects may be expressed as a physical distance (e.g. feet, inches, meters, centimeters etc.) with respect to any reference point. The system 100 may also be configured to determine not only the position of an object or person (e.g. user 123 and/or any number of other users) at the location 115, but also the positions of each body part of a person at the location 115 relative to other body parts of the person, the positions of each part of an object relative to other parts of the object, or any combination thereof. In certain embodiments, position of persons (e.g. user 123 and/or any number of other users) and/or objects may be determined by the system 100 in real time as the persons and/or objects move at the location 115. In certain embodiments, real time may mean determining the movement of persons and/or objects within milliseconds, microseconds, or other unit of time as the persons and/or objects change position. In certain embodiments, the term real time may mean determining the position of objects and/or persons at the same time that the object and/or person changes their position.

The system 100 may also include a computing device 120. The computing device 120 may be a device located on-site at the location 115, in proximity to the location 115, and/or in communication range of devices at the location 115. The computing device 120 utilized by the first user 101 (or any other desired user, such as user 123, who may be a performer at the location 115, an attendee at the location 115, or an individual working at the location 115, for example) may include a memory 121 that includes instructions, and a processor 122 that executes the instructions from the memory 121 to perform the various operations that are performed by the computing device 120. In certain embodiments, the processor 122 may be hardware, software, or a combination thereof. The computing device 120 may also include an interface (e.g. screen, monitor, graphical user interface, etc.) that may enable the first user 101 (or other user) to interact with various applications executing on the computing device 120, to interact with various applications executing within the system 100, and to interact with the system 100. In certain embodiments, the computing device 120 may be a computer, a laptop, a tablet device, a phablet, a server, a mobile device, a smartphone, a smart watch, and/or any other type of computing device. Illustratively, the computing device 120 is shown as a laptop in FIG. 1. The computing device 120 may also include a global positioning system (GPS), which may include a GPS receiver and any other necessary components for enabling GPS functionality.

The system 100 may also include one or more sensors 125. The sensors 125 may be any type of suitable sensor, such as, but not limited to, motion sensors, temperature sensors, proximity sensors, light sensors, any type of sensor, or any combination thereof. In certain embodiments, the sensors 125 may be configured to be depth sensors, which may include any of the functionality that the depth sensors of the cameras 117 may have. In certain embodiments, the sensors 125 may be included within or may be attached to the cameras 117. The sensors 125 may be configured to track the movements of the user 123 at the location, track the movements of any objects at the location, or any combination thereof. In certain embodiments, any measurements taken by the sensors 125 and/or tracked motion and/or depth information may be provided to any device of the system 100, such as, but not limited to, the cameras 117, the computing device 120, the first and/or second user devices 102, 111, the servers 140, 150, 160, and/or the database 155 for further processing. In certain embodiments, the sensors 125 may be configured to interact with software of the system 100 may and enable the sensors 125 to detect objects at the location 115 that are within a capture zone of the sensors 125 and/or cameras 117. In certain embodiments, the sensors 125 may communicate by utilizing Wi-Fi, cellular, satellite, short-range wireless communication technologies (e.g. Bluetooth), infrared radiation, ZigBee, Z-Wave, any type of wireless protocol, radio technologies (e.g. radio frequency identification), or any combination thereof.

In certain embodiments, multiple sensors 125 (e.g. depth sensors may be placed around a performance area (e.g. location 115), which may be used to capture and record pointcloud data of anyone (e.g. user 123) standing within a performance zone at a live event. The pointcloud data may be sent to a computer on site (e.g. computing device 120), which then sends the data over the internet to the system event host server (e.g. servers 140, 150, 160). This data may be replicated across all clients connected to the live event. Within the virtual world that the users are connected to via client applications supported by the system 100, a custom bounds object may be designed to display the pointcloud data that is being received by the server(s). The pointcloud viewing object may be placed in the area in which the performer would be in the virtual world. As a result, within the virtual/digital world, a live pointcloud replication of the performer(s) (e.g. user 123) may be displayed that is visible by viewers using the client application of the system 100.

In certain embodiments, the system 100 may also include a device 130, which may be any type of computing device, including, but not limited to, a computer, a laptop, a tablet device, a phablet, a server, a mobile device, a smartphone, a smart watch, and/or any other type of computing device. Illustratively, the device 130 is shown as a wearable computing device in FIG. 1. The device 130 may include a memory that stores instructions and a processor that executes the instructions from the memory to perform the various operations of the device 130. The device 130 may also include a global positioning system (GPS), which may include a GPS receiver and any other necessary components for enabling GPS functionality. In certain embodiments, the device 130 may be configured to receive data, measurements, and information from one or more sensors 132, which may be worn by a user, such as user 123 at the location 115. For example, the sensors 132 may be placed on various body parts of the user 123 and may be configured to retrieve, capture and/or record real time motion capture data associated with each body part of the user 123 as each body part is moved. The capture motion capture data may be transmitted to the device 130 for processing and/or handling, and the device 130 may transmit the captured data to the servers 140, 150 and/or to any other devices of system 100 for further processing. In certain embodiments, the sensors 132 may be any type of sensor, such as, but not limited to, motion sensors, temperature sensors, proximity sensors, light sensors, any type of sensor, or any combination thereof, and may include any circuitry and/or memories and/or processors to support the functionality of the sensors 132. In certain embodiments, the sensors 132 may communicate with the device 130 and/or any other device in the system 100, such as by utilizing Wi-Fi, cellular, satellite, short-range wireless communication technologies (e.g. Bluetooth), infrared radiation, ZigBee, Z-Wave, any type of wireless protocol, radio technologies (e.g. radio frequency identification), or any combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, any network, or any combination thereof. Illustratively, server 140, and server 150 are shown as residing within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140, and 150 may be utilized to perform the various operations and functions provided by the system 100, such as those requested by applications executing on the first and second user devices 102, 111. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. In certain embodiments, the servers 140, 150 may process any data, information, and/or measurements provided by any of the components in the system 100.

In certain embodiments, the servers 140, 150, and/or 160 may be configured to handle all incoming streams of data required to produce the digital event and serve all users who log on to the client application. The servers 140, 150, and/or 160 may communicatively link with database 155 to exchange user data, livestream content, merchandise data, a points system, and to handle the interaction experiences with the client application being utilized by the first and/or second users 101, 110. In certain embodiments, the servers 140, 150, and/or 160 may be configured to participate in blockchain and/or cryptocurrency transactions and inventory verification, as is discussed in further detail in this disclosure. In certain embodiments, activities in game (i.e. in the client application) may allow the first and/or second user 101, 110 to conduct cryptocurrency mining for in-game mining, and, in the case a user receives a farming multiplier (discussed in further detail in this disclosure), the servers 140, 150, 160 will dedicate themselves to the job for the duration of the multiplier.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, the cameras 117, the sensors 125, the on-site computing device 120, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store location information for event location 115, store user profiles associated with the first and second users 101, 110, store device profiles associated with any device in the system 100, store communications traversing the system 100, store user preferences, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The database 155 may store avatars, communications, social media content, other media content, activity information, event information, digital mailbox communications, digital/virtual merchandise purchase information, recordings of events and activities, any other information or content, or any combination thereof, of the first and second users 101, 110. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include a client application, which may be configured to perform and support the operative functions of the system 100. In certain embodiments, the client application may be a website, a mobile application, a software application, or a combination thereof, which may be made accessible to users utilizing one or more computing devices, such as first user device 102. The application may be utilized to render a digital world/virtual world for the first user 101 to interact with, receive information and inputs from the first user 101, generate avatars for the first user 101, render digital versions of actual events or activities that the first user 101 desires to participate in, render digital merchandise, enable purchases of the digital merchandize, generate renderings of performers at the events or activities for display in the digital world/virtual world, performing any other action described herein, or any combination thereof. The client application of the system 100 may be accessible via an internet connection established, such as by utilizing a browser program executing on the first or second user devices 102, 111. In certain embodiments, the client application of the system 100 may be a mobile application executing on the first or second user devices 102, 111, an application directly executing on the first or second user devices 102, 111, or an application provided through other suitable means. In certain embodiments, the client application may be downloaded onto the first and/or second user devices 102, 111. Additionally, the client application may allow users and computing devices to create accounts with the system 100 and sign-in to the created accounts with authenticating username and password log-in combinations. The client application may include a custom graphical user interface that the first user 101 or second user 110 may interact with by utilizing the first user device 102 or second user device 111.

In certain embodiments, when the first user 101 (or second user 110) accesses the client application, the application may generate a digital page, which may allow the first user 101 to create an account with the client application and/or system 100. The digital page may be a digital form that takes inputs for a username, password, email address, year of birth, gender, ethnicity, other information, or any combination thereof. Once such information is entered in the digital form on the digital page, the system 100 may save the information into the system 100 and associate the account with the client application and the first user 101. The client application may then allow the first user 101 to log into the client application using the authentication credentials that the first user 101 entered into the digital form. If the first user 101 forgets their authentication credentials (e.g. password, username, etc.), the client application may enable the first user 101 to submit their email address so that the authentication credentials may be emailed to the first user 101 or otherwise presented to the user. Once the first user 101 logs into the client application using the authentication credentials, the system 100 may generate and display a virtual home for the first user 101 within a rendered digital world displayed via a graphical user interface of the client application. The virtual home may allow the first user 101 to access account information, access or participate in an event or activity, communicate with other users of the system 100, access mail from the first user's 101 digital mailbox, purchase merchandise, select and create an avatar for the first user 101, move around in the digital world/virtual world using the first user device 102, perform any type of action, or any combination thereof. For example, upon logging in, the first user 101 may be provided with the ability to join activities, travel to and discover virtual worlds generated by the system 100, and/or attend live events from around the real world. In certain embodiments, live events may take place in the retrospective world relative to the industry in which the category of that event falls in. In certain embodiments, users may be able to access a library via the client application in which they can view an events schedule, which may enable them to order single events for participating in, subscription packages, and/or participate in unique special promotions. In certain embodiments, the client application may enable a user to gift various features provided by the client application to other users (e.g. to participate in a live event, mined cryptocurrency, etc.) In certain embodiments, when a user logs into the client application, the client application may enable the user to access interaction preferences, settings, inventory, avatar data, and all performances or livestream events that the user may or may not be interested in. In certain embodiments, the client application may interact with any of the devices of system 100, such as the servers 140, 150, 160 to gather required data and synchronize any events or performances being watched with other users and their corresponding client applications. In certain embodiments, the client application may also include a miner for cryptocurrency in the virtual world and/or games provided by the client application. For example, the miner may be utilized when participate in farming and experience-based activities, as detailed elsewhere in this disclosure.

Figure 32:
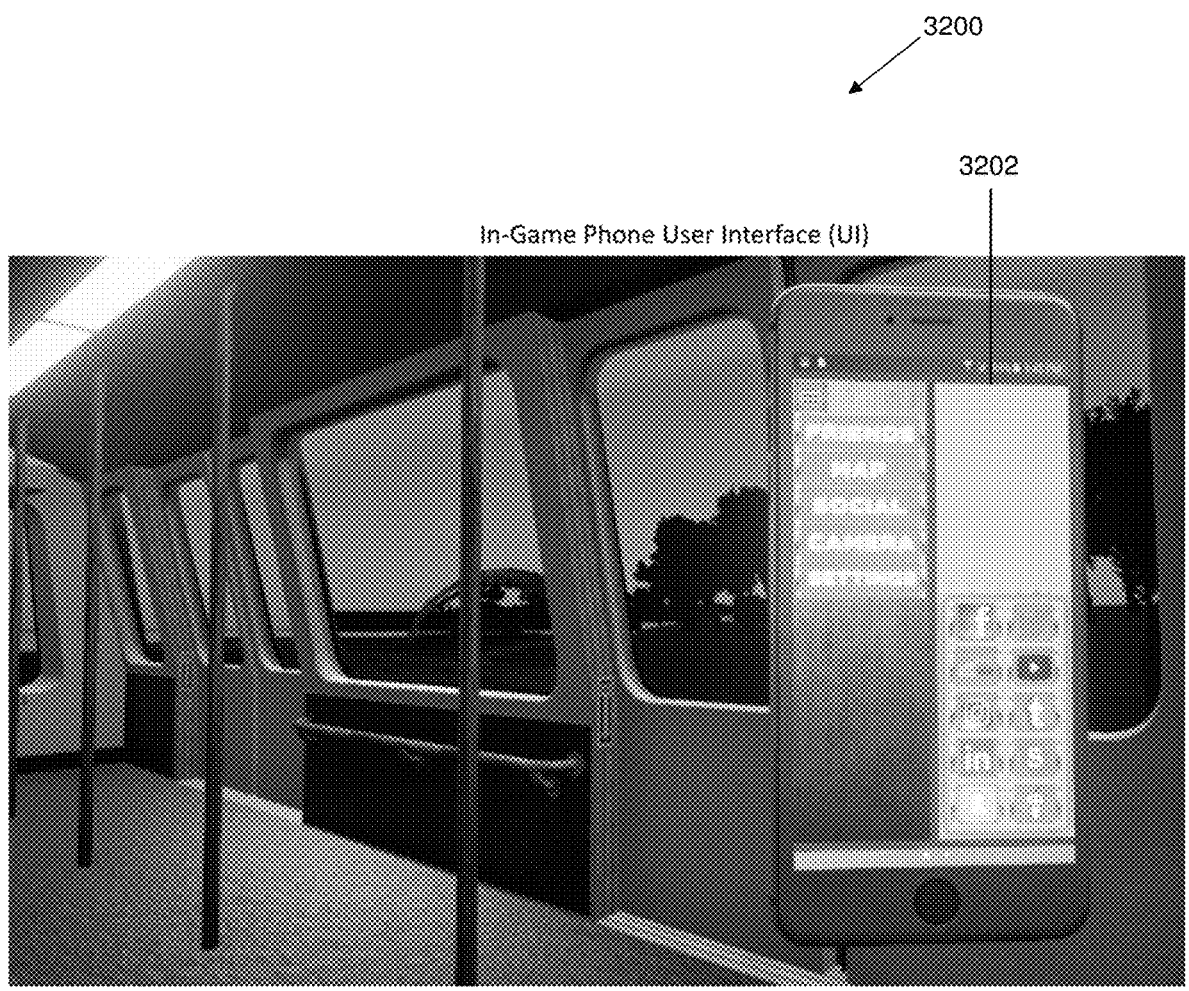
FIG. 32 is a diagram illustrating a rendering of the in-game virtual phone user interface of FIG. 31.
Figure 33:
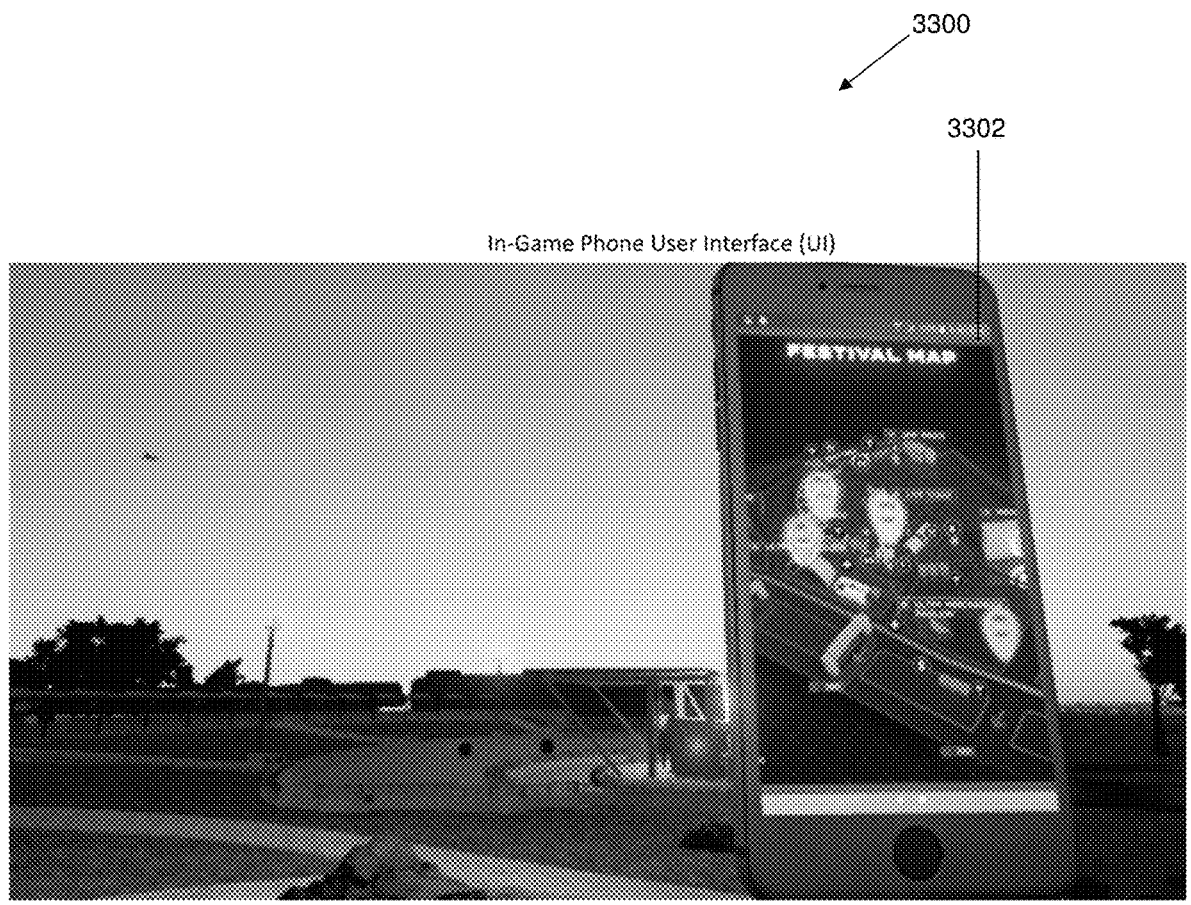
FIG. 33 is a diagram illustrating a rendering of the in-game virtual phone user interface of FIG. 31, which features a festival map for an event that a user is participating in while using the virtual reality system of FIG. 1.

The client application and/or the system 100 may also be configured to provide various types of user experiences for the first and/or second users 101, 110. The client application may display a main menu and a digital property for a user's virtual home when the user logs into the client application. The client application may display a digital mailbox for accessing messages and other content (and to send digital electronic messages to other users), and can enable a user to customize his or her virtual house and property as desired. The client application may enable users to experience custom events that may be performed using online content provider systems, such as YouTube, Spotify, and SoundCloud, or by utilizing 3D cameras 117 in the system 100 and the user's computer (e.g first user device 102) audio input of whom is hosting the event. In certain embodiments, the users may be able to change their avatar's appearance in a room of their virtual home, as well as avatar-based clothing or customization experiences. In certain embodiments, controls of the system 100, menus (e.g. menus for accessing purchases, accessing mail, accessing social networks, accessing a map of the virtual world, accessing camera feeds of live events, connecting with friends on their separate client applications, accessing settings of the client application, accessing account information, etc.), and/or methods of interacting with the client application may be provided via a rendered digital phone (e.g. as shown in FIGS. 32 and 33 by the in-game phone user interfaces 3202 and 3302) or other desired rendering of any other type of device. In certain embodiments, the in-game phone user interface may be displayed on a virtual smartphone that can be brought out by the avatar of the user in the virtual world and put away in the place of a pause menu. In certain embodiments, the virtual smartphone may follow the controller (i.e. the controller that the user uses on the first user device 102 to move the avatar and/or conduct operations in the virtual world) of the user when it is opened. In certain embodiments, within the virtual world, a custom bounds object may be provided that automatically displays a specified page if a user opens their virtual smartphone men graphical user interface within a proximity defined in the virtual world. In certain embodiments, the phone user interface of the virtual smartphone may enable the user to check view quests, challenges, virtual world interactions, exhibits, and/or multimedia menus. In certain embodiments, the graphical user interface (i.e. the rendered phone user interface within the user interface of the client application) may include a simple emulated operating system which handles text menu based functions and/or other functions. In certain embodiments, the simulated operating system may allow customizations of the background and colors occurring within the virtual world. In certain embodiments, televisions rendered in the virtual world, as well as the phone user interface (e.g. interfaces 3202 and 3302), may display news streams that show all recent posts from official social media accounts of the users, patch updates, and fixes. In certain embodiments, settings in the rendered phone user interface may allow modification of graphics settings, user account information, social media accounts, subscriptions, statistics, points information, and may provide a points redemption portal. In certain embodiments, users can use the digital rendered phone interface to see which of their friends are online, join voice and chat groups, send messages, and interact with activities and objectives provided by the system 100. In certain embodiments, the client application may enable users to join voice chat groups and channels so that they can discuss different topics using the rendered phone interface. In certain embodiments, users can add each other on social networks (even external social networks that are separate from the system 100) by selecting and holding a social network icon of their choice within the phone user interface and tap (e.g. by using a cursor or touchscreen input or other mechanism for receiving the tap input) with another user holding the same social network icon. In certain embodiments, the client application may render website kiosks in the virtual world, which may allow a user to interact more in depth with certain interactive experiences, advertising experiences, and/or additional content.

In certain embodiments, the system 100 via the client application may enable users to create profiles via their user accounts. Via the profiles, the client application may enable users provide any information they would like for the purpose of displaying to other users. In certain embodiments, the profiles may include biography, work, school, creative, and custom fields to allow users to create a profile for many purposes. In certain embodiments, each field, as well as social media linked profiles can be set to public, friends only, or private to decide which information is revealed to others. In certain embodiments, users can enter a variety of interests, which may be utilized by the system 100 to categorize users for the sake of finding others with similar interests. In certain embodiments, users can also set their interest sharing to on or off, which may affect whether other users can find you by interest or not. In certain embodiments, users can select an interest of their choice and the system 100 would create an aura highlight around other users to identify that both users share interests. In certain embodiments, all linked social media accounts can be viewed by expanding the user menu when highlighting another user in the virtual world.

As indicated above, the client application may render a virtual home and/or property for each user of the client application. For example, every user may have a property (e.g. virtual home), in which they can create their own living space, customized with decorations, furniture, art, property, landscape, terrain, and items. In certain embodiments, for example, a user can build a small forest home with a river, a modern mansion, or a sci-fi fantasy hybrid world. For the client application and system 100, there are no limits for the virtual world and/or home based on a user's imagination. In certain embodiments, such as via the virtual home, the client application may enable users to buy, sell, and trade property and living space designs on the marketplace. When users log on to the client application, the user's may be started in their living space, and can go to each world or event being rendered in the system 100 from there, as a homepage portal. In certain embodiments, users can invite other friends to live in their virtual living space as well, and therefore they can share the spaces, and both users may log in to the same area and share customization of the living space. In certain embodiments, users can expand their property size with passion points, which are discussed in further detail elsewhere in this disclosure. In further embodiments, users can start group communities together and invite other friends to live in a virtual living space where users share the spaces they have created. In further embodiments, for example, users can view the night sky through a telescope and may receive the same data as the a planetarium sector within the virtual world generated by the system 100. In certain embodiments, users can also view constellations and any stars they own.

The system 100, such as via the client application, may also enable digital farming. In certain embodiments, farming may be a way in which users may obtain passion points. In certain embodiments, users can buy digital seeds for every type of digital vegetation, and create a virtual garden in accordance with their full customizable liking. In certain embodiments, users may be required to tend the virtual garden for it to maintain life, if not the virtual plants may wither and die. In certain embodiments, the users can pay to install digital auto irrigation systems so their virtually rendered plants grow automatically. In certain embodiments, rendered plants may grow at a rate faster than the real-time rate (e.g. two times faster than actual plants, for example), allowing a reasonable amount of time to watch the virtual garden grow. In certain embodiments, users can buy, sell, and trade plants in the game marketplace provided by the system 100. In certain embodiments, time spent farming may have your game client (e.g. the client application) enabled to mine for points (Currency Idea A (described elsewhere in the disclosure)) or cryptocurrency (Currency Idea B (described elsewhere in the disclosure)). As the user's digital farm grows to exponential sizes, the user may achieve seasonal multipliers for points (Currency Idea A (described elsewhere in the disclosure)) or cryptocurrency (Currency Idea B (described elsewhere in the disclosure)) with extra mining power backed by the servers of the system 100.

Figure 47:
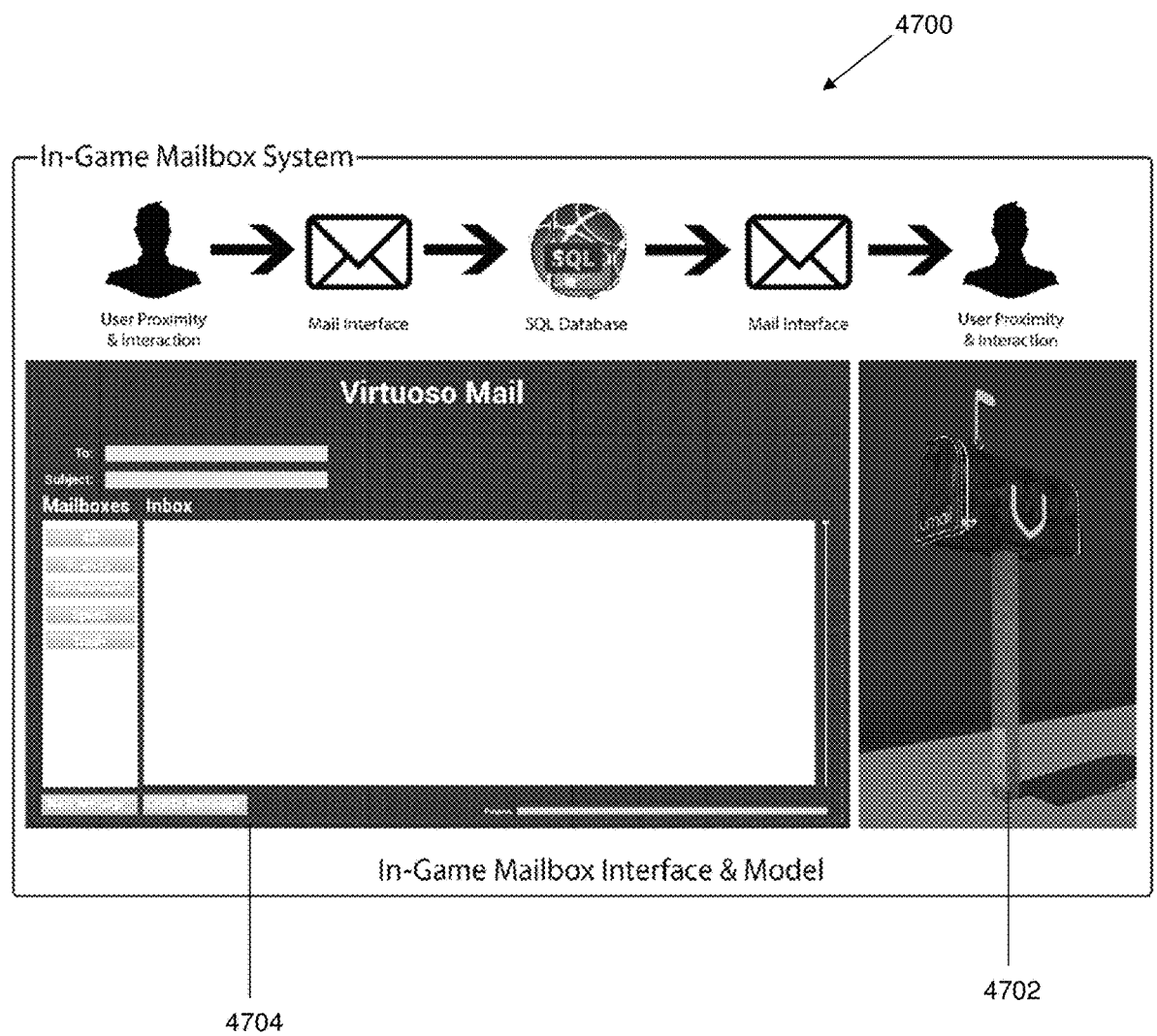
FIG. 47 is a graphical user interface illustrating the digital mailbox system of FIG. 46 and various functionality provided the digital mailbox system.

The system 100 may also include a virtual/digital mailbox 4702, such as in shown in FIG. 47. The virtual mailbox 4702 may have a graphical user interface 4704 when accessed by the user in the virtual world. In certain embodiments, the virtual mailbox 4702 may enable users to send mail to other users of the system 100 and may be rendered at the front of their virtual home, much like a real mailbox in front of a real physical home. In certain embodiments, the virtual mailbox 4702 may be accessed via a menu in the virtual phone interface or via any menu provided by the client application. The virtual mailbox 4702 may include images, videos, links, various types of digital media content, GIFs, text, virtual business cards, websites, and more. In certain embodiments, advertisers and event organizers can send advertisement mail to user's virtual mailboxes 4702 at their virtual homes as part of subscription packages. In certain embodiments, users gain may gain passions points for sending and receiving mail. In certain embodiments, system wide messages and/or updates (e.g. updates for updating the client application and/or virtual worlds) generated by the system 100 may be sent to each user's virtual mailbox 4702. Each message in a user's virtual mailbox 4702 may be stored in the database 155 and may be retrieved from the database 155 when the user wants to view the message. In certain embodiments, the virtual mailbox 4702 may be rendered as a 3D model of a mailbox with animations that open and close the virtual mailbox 4702 as the user accesses or closes the virtual mailbox 4702 in the virtual world. In certain embodiments, when a user walks up to the virtual mailbox 4702 using their avatar and interacts with it, an interface will pop up allowing the viewing, composing, and sending messages.

Figure 42:
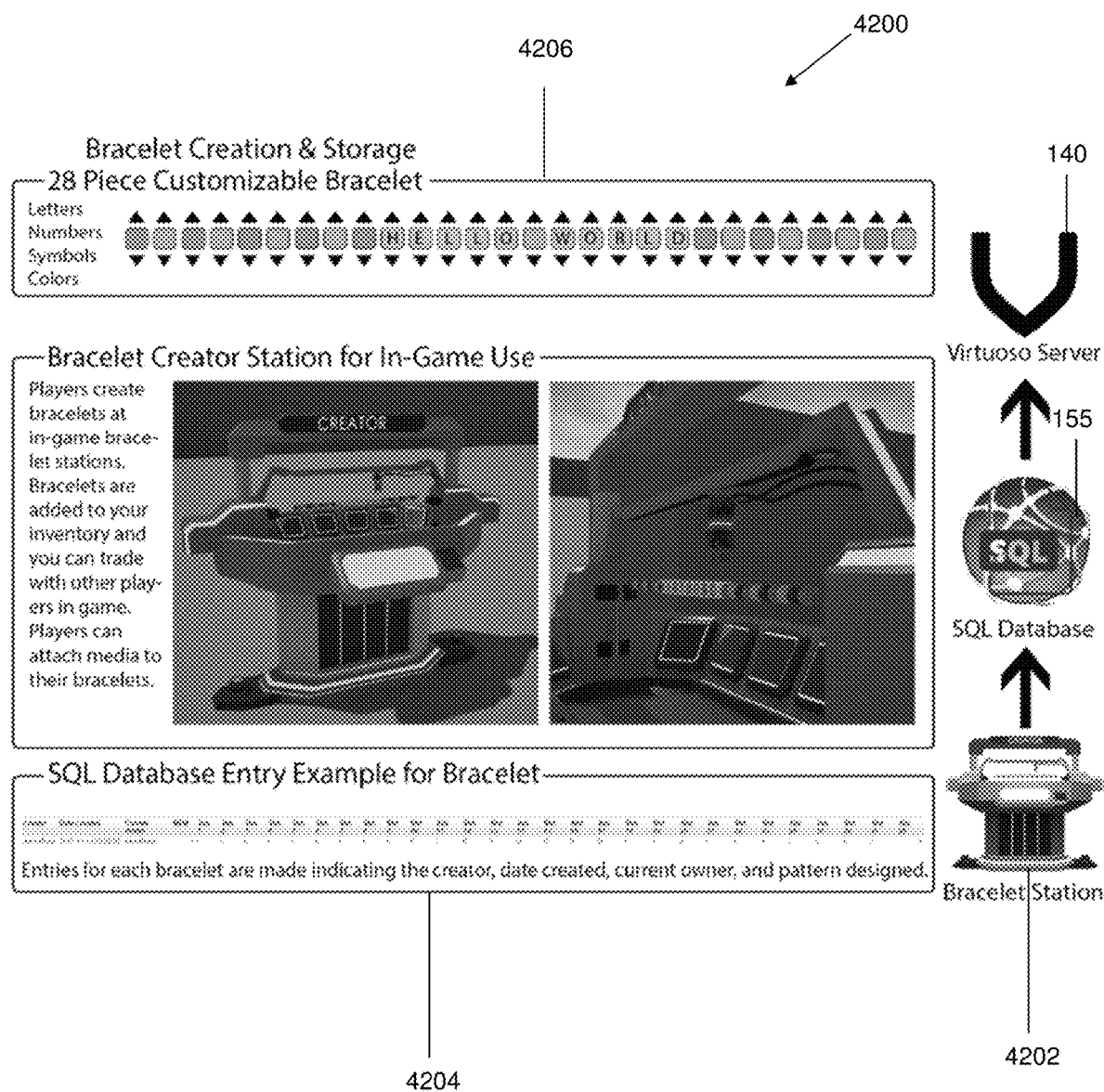
FIG. 42 is a diagram illustrating a virtual 3D printer for creating digital bracelets in the virtual world generated by the virtual reality system of FIG. 1.

In certain embodiments, the system 100, such as via the client application, may enable users to create digital or potentially real physical pony-bead bracelets using an in-game editor, which may be represented by a virtual 3D printer 4202, as is shown in FIG. 42. In certain embodiments, a virtual bracelet 4206 may be created by enabling the user to select up to 28 (or any other desired number) virtual beads via the 3D printer/bracelet station 4202 rendered in the virtual world. The user may do this by walking the user's avatar up to a virtual world object (e.g. 3D printer 4202) and selection an option via an interface of the 3D printer 4202 to create the virtual bracelet 4206. Each virtual bead may have and/or include color, letter, design, preset symbol, blank space, anything, or a combination thereof, that may be inserted into a slot of the virtual bracelet 4206. In certain embodiments, users may attach links, images, GIF sequences, music tracks (e.g. streaming music tracks), and/or video content (e.g. streaming video content) to the virtual bracelets 4206. In certain embodiments, the virtual bracelets 4206 may be traded between users of the system 100, users can view them in a personal virtual inventory in the virtual world, and users may gain passion points for creating and/or trading the virtual bracelets 4206. When a user decides to view a virtual bracelet 4206 that the user created or owns, the user may be presented with an up-close rendering of the virtual bracelet 4206, along with any attachments to the virtual bracelet 4206. In certain embodiments, database entries 4204 may be stored in the system 100, which may indicate information associated with the virtual bracelet 4206, such as, but not limited to, the creator of the virtual bracelet 4206, the date the virtual bracelet 4206 was created, the current owner of the virtual bracelet 4206, the pattern designed for the virtual bracelet 4206, any other information, or a combination thereof. In certain embodiments, designed virtual bracelets 4206 may be transmitted to a manufacturer and the manufacturer may create a real physical bracelet with an appearance matching the virtual bracelet 4206. The physical bracelet may then be sent to the user that created or owns the virtual bracelet 4206, or to a friend as a gift.

In certain embodiments, the system 100 may include one or more types of currencies to foster transactions in the system 100, exchanges between users, savings, and/or for other purposes. As a first example and as Currency Idea A, the system 100 may create multiple tiers (e.g. two tiers) of points and/or credits for use within the client application. The tiers, for example, may be a first tier (passion points ("PP")) and a second tier (virtuoso points ("VP")). In certain embodiments, passion points may be easy to come by, can add up quickly, and can serve for many simpler functions in the game aspects provided in the virtual world. Users may earn passion points by completing interactions within events (e.g. virtual events simulating/emulating live events), interacting with other users in the virtual world, and participate in brand activation experiences. In certain embodiments, passion points cannot be purchased. In certain embodiments, virtuoso points can only be purchased or won within the virtual world or otherwise. Virtuoso points may serve as a means for entry to events, perks, upgrades, merchandise, and other experiences that have real-world value. In certain embodiments, virtuoso points may be purchased using any traditional online payment method via the client application.

In certain embodiments, the system 100 may include another type of currency to foster transactions in the system 100, exchanges between users, savings, and/or for other purposes. As an example of Currency Idea B, the system 100 may utilize passion points as a cryptocurrency that the system 100 uses to value all of its assets (virtual, digital, physical, and/or otherwise), transferable, redeemable, or status based. In certain embodiments, when users take place in group activities, brand activation, obtaining, creating, selling, or trading items on the market place in the virtual world, they may interact with the system's 100 blockchain, which may be based on passion points. In certain embodiments, a highly exclusive in-game cryptocurrency watch will allow users to mine the entire time a user plays as well as view and track information about the system's 100 blockchain usage, trading, and value. In certain embodiments, all transfers may be viewed by all users in game in the virtual world, or by the public on a website associated with the system 100, along with points, items, downloadable content, music, merchandise, in-game items, or subscriptions.

As discussed above, the system 100 may incorporate blockchain and/or cryptocurrency technology within the system 100 and via the client application. In certain embodiments, rather than using a classic database (e.g. database 155) for data exchange, the system 100 may use blockchain verification to strengthen security and integrity of the data exiting, entering, and/or generated within the system 100. In certain embodiments, all items, tickets (e.g. tickets to virtual events rendered in the virtual world), perks, and upgrades may be assigned a value and may be programmed in the form of cryptocurrency. In certain embodiments, all transactions, items, database checks, and trade within the game (e.g. in the virtual world) provided by the client application may be verified by other users and may be utilized to prevent false alterations, hacking, or cheating in the virtual world generated by the system 100. In certain embodiments, flags indicating failure in the blockchain verification process may reverse any actions made by users and may trigger timed bans that will lead to permanent bans of such users from the virtual world and/or the client application of the system 100.

The system 100 may include game items and a marketplace within the virtual world rendered by the system 100 via the client application. Game items (i.e virtual/digital items rendered in the virtual world) may include anything from avatar clothing, in-game house designs, vehicles, custom vehicles, SDK items, avatar items, totems, flags, farming material, furniture and more. The in-game marketplace may allow users to sell and trade items from the entire game using passion points. A user can attach special content to a digital item, alongside a virtuoso point. This is a way to buy virtuoso points with passion points. If a user sells an item with a Virtuoso point, the user can invest money (e.g. $4.00) into a virtual stock market of the virtual world by utilizing the system 100. In certain embodiments, the virtual marketplace items may be backed with value using passion points. In certain embodiments, database 155 may be eventually be superseded by a blockchain method (e.g. as described above) that may be responsible for verifying transactions, item inventory of users, and prevent cheating in the system 100 by users.

In certain embodiments, the system 100 may enable merchants (e.g. online capable merchants) to sell products to users in the virtual world. Each merchant may create and/or receive an account with a portal to the system's 100 inventory system. From here, the merchants may add business or artist biography, information, as well as merchandise. In certain embodiments, any physical or digital merchandise may be rendered in 3D by the system 100, and may be added into the virtual for display in virtual merchandise tents. Users may purchase merchandise in the virtual world/game using either passion points or virtuoso points. In certain embodiments, each merchant account may have a cryptocurrency address to receive funds from the system 100 to handle users making transactions with branded experience, merchandise, subscriptions, or retail items. In certain embodiments, the system 100 may include an advertising website that may communicatively link with the client application. The website may allow merchants to sign up to participate in marketing within the virtual world. In certain embodiments, subscription packages may be made available, in which define quantity and location of advertisements in the digital world across all servers, for how long, what types, and whether local or worldwide. Advertising accounts can be created by any company and may include the ability to track analytics associated with their merchandise inventory, sales, views, and/or any other analytics. Merchants who choose a local package may input their address or city and corresponding advertisements may be targeted toward users in that area to display advertisements that promote local businesses. In certain embodiments, within the virtual world, users can view an inventory and quantities of merchandise uploaded by any merchant or brand using the merchant account. Merchant accounts may provide access to adding items to the database 155 in which is received by the system 100 and integrated into each virtual world. Each merchandise item may be created in 3D rendering and have a high quality representation of the product. Clothing or prop items may be worn by the user's avatar to demo out merchandise items, for example. If a user makes a purchase of an item within the virtual world using the client application, it may reflect the price of the real product, and the user may also receive the product in real life. With each purchase, the system 100 will send an order receipt to the merchant from the merchant account and/or accompanying website and all necessary information to send the item to the user that purchase an item.

In certain embodiments, the system 100, such as via the client application, may include a balance system, which may be a visual representation of all ratings generated in the system 100. In certain embodiments, users of the system 100 may have a 7-part balance system. The 7-part balance system may include the components of Life, Order, Wisdom, Love, Power, Imagination, and Understanding, which may be influenced by karma points. For example, completing virtual world challenges, completing experiences, interacting with other users, as well as being kind to other users will boost a user's karma points. Reviews from other users can also influence karma points. Being rude or inappropriate for others can risk deducting your karma points. In certain embodiments, professors, activists, presenters, performers, analysists, researchers, branding Experiences, live shows, and other acts can grant crowd points, and can initiate activities that give points in certain categories to users. In certain embodiments, every user, state, region, country, and earth may have a heptagon virtual representation of their behavior system. Each of the 7 parts may have their own points, which is given or taken based on in-game interactions conducted by the users. In certain embodiments, points statistics can be viewed on a virtual map by state, region, country, continent, as well as all of earth (accessible via the rendered in the in-game phone interface phone example). In certain embodiments, in order to obtain a complete behavior system, users may need to complete challenges and achieve awards from a large variety of experiences experienced by users in the system 100. If a user attains a full behavior system, the user may receive a virtual or actual token of appreciation. In certain embodiments, losing a selected number of points (e.g. 1000 points) in any category in one session will result in a timed account ban for the user. In certain embodiments, a user can obtain legacy roles by reaching higher experience levels through awards and challenges, which allow them to grant karma points to others at a multiplied rate. In certain embodiments, karma points may be reset for each user every year.

The system 100 may also include an awards and challenges index. For example, the system 100 may provide awards in the system 100 for users completing tasks, exploring new areas, and reaching cycle and turn based achievements. In certain embodiments, there may be challenges (e.g. games or a series of actions to be performed in the virtual world) in the system 100 for users to complete for passion points. In certain embodiments, users can also initiate challenges between users. Each challenge may be given a designated duration, award, time limits, set of rules, proximity, group, and scheduling settings. In certain embodiments, challenges can be chosen from a challenges index, or a user can challenge others to a challenge. If both parties complete a non-competitive challenge, both users may be rewarded multipliers for their reward.

The system 100 may further include an analytics system. The system 100 may include a static raycast system that shows how many time people look at brand signs of merchants and for how long. In certain embodiments, user analytics may help brands develop products for use in the virtual world generated by the system 100. In certain embodiments, user choices, experiences, duration of experience, and further data will help the system 100 reorganize to be more efficient for brands and create statistics information for real-time viewing and public release within the system 100. In certain embodiments, a revenue "click" is determined by a user stepping into a brand activation experience within the virtual world. In certain embodiments, there the system 100 may include a feedback system within the user interface, where users can report bugs, or issues occurring in the virtual world or with the client application itself. The system 100 may create a message and icon of the location for developers of the system 100 to see in a feedback queue.

In certain embodiments, the system 100 may include a local food service application programming interface (API), which may allow interfacing between the users of the client application and a restaurant and/or food vendor tent in the virtual world and to applications of the restaurant and/or food vendors. The user may order food from the virtual restaurants and food vendors in the virtual world and an actual order for the actual food may be transmitted to the actual restaurant and/or food vendor corresponding to the virtual versions of the restaurant and/or food vendor. The actual food vendor/restaurant may then deliver the actual food item corresponding to the virtual food item to the user's physical address as obtained from the user's profile/account with the client application. In certain embodiments, the user's physical address may define what local restaurants and/or food vendors appear virtually in the virtual world for ordering purposes. In certain embodiments, users may select their items and/or meal of their choice and the system 100 will send and send the order to the physical restaurant using the application in which the API is linked to.

The system 100 may also enable group mode functionality in the system 100. Group mode may allow users of the client application to join up with friends and replace proximity voice chat with a fixed chat involving all users in the group. A host of the group can view, invite, set member invite rules, mute, or kick members. Users in the group can view, invite other users if the host has allowed it, or mute members. In certain embodiments, users can engage in certain group activities which are not bound to proximity restrictions and complete activities with group members in their group, even if users are in other virtual worlds of the client application at those times. The system 100 may also allow for group activity functionality in the system 100. Group activity mode allows users to initiate (host) or join group activity sessions for passion points. Information will appear about a challenge to perform and the users in the group. If a user hosts an activity, the user will instruct the challenge, some which may have minimum member quantities required to perform. In certain embodiments, if the user sees another player initiating a group challenge, users can go up to them in the virtual world and join the activity. Participate and/or completing of group activities may award passion points, perks, and/or discounts to users. Group activities can have promotion special times in which their awards are multiplied for set amounts of time in certain embodiments.

As indicated above, the system 100 may enable users to participate in live events remotely via the rendered version of the live event in the client application program. For example, the user may purchase a ticket for the event, but may participate and experience the virtual version of the event using the client application. Once a ticket is purchased and/or obtained, the user may be transported to the virtual version of the venue for that specific event in the virtual world. Users may see other users via the client application who are also at that specific event and may partake in event specific activities. In certain embodiments, brand activation experiences and merchandise will be available at live events rendered in the client application. In certain embodiments, brand activation experiences may be decided by either specific sponsors of the actual live show/event, or if none, brands experiences from an advertiser database of the system 100 will show up based on company subscriptions. Merchandise may be determined by the live event's merchant account on file with the system 100, which may grab the inventory of that event, which will commonly consist of organizer and artist/performance merchandise.

The system 100 may also livestreams of events, such as by providing a 360 degree livestream of the real world event in the virtual world of the client application. A 360 degree camera 117 may be set up on site (e.g. location 115) and may be connected to the internet (e.g. communications network 135) to stream, and content recorded at the location 115 may be recorded for future viewing. Within the virtual world, there may be camera icons, which present a live feed of that replicated location within the real world. The camera icons may be placed within the digital location of the virtual world that corresponds to the same position that they are placed in the real world location 115. In certain embodiments, for each camera 117, a virtual sphere may be generated where the inner surface of the sphere may be texture-mapped with the livestream or recorded footage from the cameras 117 at the real world location 115 (e.g. sphere 1704 from FIG. 17). In certain embodiments, footage from a 360-degree camera (e.g. cameras 117) will be streamed into inverted spheres (e.g. sphere 1704 from FIG. 17), which are used to immerse the user in a classic 360-degree video that shows that spot in a location corresponding to the real world location. When a user interacts with the camera icon, the user's perspective may be detached from the view perspective of the avatar in the virtual world and attached to a stationary camera 117 in the direct center of the sphere, which will provide the user with a 360 degree video viewing space within the virtual world. When a user decides to leave the 360 degree video viewing space, their viewing perspective may be detached from the camera 117 view and reattached to the avatar camera view (e.g. first or third-person view when viewing the virtual world). In certain embodiments, there will be installations (e.g. via kiosks or computing devices) at the real event where the attendees can see, communicate, and interact with the virtual users using the client application. In the virtual world, there may also be virtual versions of the installations in the same spot where users can see, communicate, and interact back to the real-world attendees of the event. In certain embodiments, a merchandise purchase may result in receiving the 3D model of the item for use with their avatar, and the merchant would receive an order copy and ship the same physical item to the user's address as listed in the user's account.

For large scale events, such as sports games or plays, sensors 125 at the real world event may retrieve, capture, and record real-time player or performer positions. The tracking data may be sent to a computer on site (e.g. computing device 120), which then sends the data over the internet (e.g. communications network 135) to be received and/or processed by the system 100. This data may be replicated across all clients connected to the event and the system 100 may display the appropriate data to each player or performer it is designated to. In certain embodiments, additional sensors 125 may be used for items such as the ball (e.g. for a basketball game) or other external objects and props. In certain embodiments, an avatar of every player or performer 1302, alongside all animations necessary (e.g. animations for dribbling a ball in a basketball game, animations for running, animations for walking, any type of animations, etc.), may be generated and assigned to the designated performers 1302 in the event. In certain embodiments, 3D objects in the event may also assigned to any props included, such as the ball or props. In certain embodiments, the positions of each performer 1302 may be retrieved from sensors 125 at the real world event and the system 100 may determine where their retrospective avatars will constantly follow in the virtual world accordingly. As the avatars move around in the virtual world, their translation is displayed by the proper animations, such as jukes, shoots, blocks, running and jumping, etc. For example, a basketball ball or other props will follow their exact position and rotation determined by the sensor 125 on the object in the real world retrieved from sensors 125 at the real world event.

In certain embodiments, for large scale performance events, such as a basketball game for this example, sensors 125 and/or tracking nodes 1304 at the real world event may retrieve, capture, and record player or performer tracking data to be sent to the system 100 servers 140, 150, 160 to replicate and define the positions of players and the ball. A 3D avatar of every player or performer 1302, as well as the specific ball are assigned to the designated players in the event. Each player or performer at the real world event may have a wearable device 130 that serves as a motion capture device that sends data to a computer on site, such as computing device 120. The player or performer 1302 may have motion capture sensors (e.g. tracking nodes 1304 and/or sensors 132) on their chest, waist, shins, feet, arms and hands, and head, which all send motion data to the wearable device (e.g. device 130) to capture their real world movement. Each wearable device 130 may send its data to a computer on site (e.g. computing device 12) which is streamed and recorded to an event server (e.g. servers 140, 150, 160). The tracking nodes 1304 and/or sensors 130 may track any type of movement of a performer 1302 and may be placed on any number of body parts of the performer 1302. Each avatar rendered in the virtual world may actively follow the movement of the real world player or performer 1302.

The system 100 may also allow for private meetings. For example, a user can join a private chat room in the virtual world and use their avatar or 3D camera for representation in the chat. In certain embodiments, the private chat rooms can be used for personal chat, group chat, and also be used for meetings, consulting and more. Documents, webpages, videos, audio and images can be viewed in the meetings and synchronized with everyone participating. In certain embodiments, the system 100 will include preset environments loaded such as high-rise offices, conference rooms, home theaters and more for the users to conduct their meetings. Within certain experiences, users can use this mode to meet certain talent like actors or artists in the form of a virtual reality meet and greet. In certain embodiments, users can share what's displayed on their screen of their device (e.g. first user device 102) with others in the virtual private meeting room.

As indicated above, the client application of the system 100 may generate by using the functionality provided by the system 100 one or more virtual worlds for rendering on a device of a user. In certain embodiments, virtual worlds may be developed environments in which represent common grounds for users who exploring the same interests. Each virtual world may have a specific theme and goal in mind alongside specific database properties, activities, features, and user interaction systems in place. In certain embodiments, some virtual worlds are for entertainment, social gathering, self-awareness or philosophical activities, education, and even real world integration such as philanthropy, and stock trading. Every experience in every virtual world may have rating response systems in which users can provide their influence on each other in the behavior system. Each virtual world may contribute to varying parts of the challenges and award system, which may increase a user's experience within the system 100.

In certain embodiments the virtual worlds may be utilized to render real estate existing in the real world virtually and/or render virtual real estate that may not exist in the real world. For example, the system 100 may render commercial buildings, properties, homes, and private properties in the virtual world. In certain embodiments, users will be able to view existing properties for sale in the virtual world. In further embodiments, users will be able to design and create virtual homes (i.e. corresponding to actual physical homes they may want to buy or construct) as well as pre-configure furniture and décor layouts using the inventory system to order home construction or house furnishing and detailing services. In certain embodiments, pre-configured items can be ordered and sent to a user's home and be placed accurately, or be included with a new home purchase on arrival. In certain embodiments, the virtual worlds may be utilized to render clubs and other venues. For example, nightclubs for music experiences may be rendered or even livestreamed into the virtual world. In certain embodiments, sit down venues for acts such as standup comedy, and studio or set venues which allow for talk shows and interviews may also be rendered. In certain embodiments, actual performers at such venues may be represented as avatars or be stream into the virtual world using 3D cameras. In certain embodiments, performers at the live events can interact with the crowd participate via the client application in the virtual world.

In certain embodiments, the system 100 may render and/or facilitate music festivals in the virtual worlds as well. In certain embodiments, the system 100 may enable users to be able to pay for livestream events and share the experience with other users of the system 100. Data such as audio, video, lighting sequences, and effects may be replicated in the digital festival to provide accurate experience corresponding to the actual live music festival. In certain embodiments, performers may be streamed on a virtual stage using 3D video or motion captured avatars. If the festival is a camping festival, users can sleep in a virtual tent, which may temporarily change the log-in location of that user to their specified tent for the duration of the event. In certain embodiments, the system 100 may render expos and announcement events in the virtual worlds. For example, phone releases, technology launches, and public service announcements may be performed within the virtual worlds. Additionally, political debates and rallies may be conducted within the virtual world. Candidates and participants may be represented in the same methods used for live performances. In certain embodiments, the system 100 may render and/or facilitate conventions, comic conventions, and/or art-based gatherings in the virtual world. For example, users may be able to check out new technology and art in the virtual world without having to drive to the actual physical location where the convention is being held. In certain embodiments, presenting companies can explain their technology and products in presentation panels and booths alongside 3D replications of the product if applicable. Users can suggest, interact, comment, and learn about products and art pieces, and can purchase available technology and art pieces for sale.

In certain embodiments, the system 100 may include news services within the virtual worlds generated by the system 100. For example, users can go to a rendered News Communication Plaza and receive local, federal, and global news from many sources. In certain embodiments, users can discuss among each other to speculate the journalism, as well agree or debate opinions. In further embodiments, live shows can take place in Communication Plaza, such as talk shows, political rallies, debates, conferences, and meetings. The system 100 may also include a digital library. In such embodiments, users can search through a catalog of e-books, which they can read. In certain embodiments, users can listen to solo or group audiobook sessions with voice chat. In certain embodiments, users can have the ability to dim or turn off their display to reduce long-use eye strain. In certain embodiments, special book announcements, as well as meet and greet events can take place in the virtual library. The system 100 may also render zoos and safaris in the virtual world. For example, users may see a recreation of zoos and digital versions of the animals programmed with artificial intelligence of the system 100. In certain embodiments, the system 100 may include information, facts, images, and videos about the animals, including the real animals' names, birth information, and unique traits. In certain embodiments, the virtual zoo and/or safari may serves as an avenue to adopt pets, such as cats, dogs, fish, snakes, lizards, and other domesticated animals from rescue shelters.

In certain embodiments, the system 100 may include orchestras (i.e. virtual orchestras or livestreams of real orchestras, for example) within the virtual worlds generated by the system 100. In certain embodiments, the system 100 may generate avatars or 3D Video that may be used to represent real orchestras. In certain embodiments, many large theater venues may be available by show if on a remote set, or may be presented in the venue local to that show. In certain embodiments, the system 100 may include circuses (i.e. virtual circuses or livestreams of real circuses, for example) within the virtual worlds generated by the system 100. For example, the system 100 may generate live replicas of circuses and multi-performer applications. In certain embodiments, avatars or 3D Video may be used to represent circuses. In certain embodiments, many large theater venues may be available by show if on a remote set, or may be presented in the venue local to that specific show. In certain embodiments, the system 100 may include lottery arcades and casinos (i.e. virtual lottery arcades and casinos or livestreams of lottery arcades and casinos, for example) within the virtual worlds generated by the system 100. In certain embodiments, users can go to the virtual lottery, which may be an arcade and casino hybrid in which holds many chance games and gambling. In certain embodiments, users buy-in on games with passion points and may have the chance of a positive or negative return based on their gameplay. In certain embodiments, the system 100 may generate group lotteries with jackpots, where users can buy-in on ticket to fill a jackpot. The winner of the jackpot may get all of the points from all users who participated in that round. Users can earn timed multipliers and perks in the virtual lottery, which may allow them to earn points at a multiplied rate for a specified amount of time.

In certain embodiments, the system 100 may include comic conventions (i.e. virtual comic conventions or livestreams of conventions, for example) within the virtual worlds generated by the system 100. In certain embodiments, avatars or 3D Video may be used to represent live attendees. In certain embodiments, the system 100 may generate an interactive exposition booth or themed world toe exist in the virtual comic grounds, in which will provide a world with a very multi-faceted and themed experience. The system 100 may also include virtual races (e.g. virtual NASCAR races or other types of races) that may include viewing the race in 3D environments with the user's avatar. In certain embodiments, the users can activate a drone mode to get better views of the venue. In certain embodiments, the system 100 may provide real world 360 degree streams from the view of the drivers and stream them into the virtual world for viewing by the users. In certain embodiments, sponsorship events may go on around the virtual racetrack alongside the race. The system 100 may also generate virtual courses and/or lectures within the virtual worlds. For example, users can join in on live and past performances of TED Talks, lectures, professor discussions, etc. Virtually rendered courses and lectures may provide one-sitting explanatory experiences that aim to teach and instruct users. In certain embodiments, courses and lectures may be separated by categories and populated by users. Examples range from beliefs, culture, technology, biology, Earth-Space science, and art from different regions of the world. The system 100 may also allow users to enroll into virtual formal education classes. For example, users can enroll in courses that span over various time lengths, in which the user can be taught college level courses. In certain embodiments, users can view and submit work in the experience, or on a website running on the system 100. In certain embodiments, campus, classroom, and student hall environments corresponding to actual locations may be rendered in the virtual worlds. The system may utilize avatar or 3D stream representations of teachers and professors. Teachers and professors can interact with users and hold class discussions with a hand raise, choose, and speak system. In certain embodiments, content can be presented by the teacher to all students in synchronized fashion. In certain embodiments, educators can initiative virtual reality educational experiences via the system 100 and/or client application.

In certain embodiments, the system 100 may include users to pursue trade degrees within the virtual worlds generated by the system 100. For example, users can learn technical & vocation skills, as well as take tests to apply for specialized careers. Users can enroll in courses that span over various time lengths, in which the user can obtain trade degrees. Users can view and submit work in the experience, or on an education website running in the system 100. The system 100 may render campus, classroom, representations of field work scenarios, and student hall environments. Avatars or 3D stream representation of teachers and professors may be generated and provided in the virtual worlds as well. In certain embodiments, the system 100 may include a virtual trade center within the virtual worlds generated by the system 100. Users can look discover and review realtime data and news about the stock market and involved companies. Stock market analysts can present themselves in the form of an avatar or 3D video presentation to relay to users their opinions and predictions. Users can mingle with each other among this space about shown review data, news, and opinions. Users can buy and sell stock using virtuoso points, and can join in on group investments to team up in making larger stock investments, in risk for a higher reward. In certain embodiments, the system 100 may include virtual museums within the virtual worlds generated by the system 100. Recreations of museums around the world with high accuracy recreations of the exhibits, art and information may be rendered in the virtual worlds. In certain embodiments, real images, videos, audio, and documentation about the exhibits can be viewed in the experience. In certain embodiments, the system 100 may include rendered aquariums within the virtual worlds generated by the system 100. Recreations of aquariums around the world with high accuracy recreations of the exhibits, and information may be rendered in the virtual worlds. Users may see digital versions of the animals programmed with artificial intelligence. Real images, videos, audio, and documentation about the exhibits can be viewed in the experience. The system 100 may also include information, facts, images, and videos about the animals, including the real animals' scientific names, birth info, and unique traits. Users can buy and name fish, which may appear in their marketplace inventory and will display for their virtual house and boat aquariums. In certain embodiments, the value of the fish would be in order of scarcity. Users can sell and trade virtual fish to other users.

In certain embodiments, the system 100 may include virtual planetariums within the virtual worlds generated by the system 100. For example, users may simultaneously be able to view the night sky and data collected about space. Users can zoom into the sky to view extreme high definition imagery and can outline constellations, planets, stars, galaxies, and other information. Planetarium guides may guide users on a journey to learn about different topics in space and view the imagery together. Global positioning satellite data and rotation data may determine which direction is north so all users can face the same cardinal directions in the physical world together while interacting in the virtual world. In certain embodiments, live stream real telescope footage may be streamed into a virtual reality headset by attending a live presentation. Users can pay to buy a star in real life, and always track its location. In certain embodiments, the system 100 may include virtual theme parks (corresponding with real theme parks or entirely new theme parks, for example) within the virtual worlds generated by the system 100. Users may go to virtual theme parks in which have branded ride experiences, and users can buy merchandise from gift shops and kiosks. Rides in the theme park virtually rendered and the user may participate in the rides, much like in a video game. Small and large scale team-based mini games, competitions, and challenges may be rendered and displayed for users to interact with and play. The virtual theme parks may include games that allow people to participate in passion point lotteries and challenges. In certain embodiments, the system 100 may include virtual movie theaters (i.e. new or virtual versions of real theaters, for example) within the virtual worlds generated by the system 100. Users can purchase movie tickets to watch new and old releases of movies with other users, friends, or alone. Many environments may be available such as home theaters, a house, IMAX theaters and CineDome experiences within the virtual world. In certain embodiments, users can purchase 360 degree cinematography projects and view them as well in the virtual world.

In certain embodiments, the system 100 may include providing virtual fishing within the virtual worlds generated by the system 100. In certain embodiments, users can fish with other users on a variety of different rendered boats, ranging in size from small boats, to fishing yachts and mega yachts. In certain embodiments, an interactive fishing rod and controls may be placed along the boat. The virtual fishing may take place as a minigame and a user can store fish the user caught on a fish tank on your boat or in the virtual home of the user. Users can customize their boats with colors, graphics, and imagery, can buy and sell boats with points, and can trade boats. In certain embodiments, the system 100 may generate virtual outdoor areas within the virtual worlds generated by the system 100. Users can enter an outdoor playground in which there are an assortment of vehicles and activities to choose from. Users can camp in the virtual outdoor areas, which may temporarily change their log in location tied to their account. In certain embodiments, the system 100 may include generating virtual shows (e.g. Broadway shows, etc.) within the virtual worlds generated by the system 100. For example, the system 100 may generate live replicas of theater shows and multi-performer applications. Avatars or 3D video may be used to represent characters in the show. In certain embodiments, many large theater venues may be available by show if on a remote set, or may be presented in the venue local to that specific show. In certain embodiments, the system 100 may include a flight simulator within the virtual worlds generated by the system 100. Users can choose from an assortment of aircraft to pilot around solo or with friends. The simulator may include a simple mode to enjoy flight, or realistic mode to have a true simulation of flight. Users can customize their planes with colors, graphics, and imagery, can buy and sell aircraft with points, and can trade aircraft. In certain embodiments, the system 100 may include generating a cruise ship vacation emulator within the virtual worlds generated by the system 100. For example, the system 100 may create full virtual recreation of created or existing cruise ships. Users can hang out on the virtual cruise ship, and can experience venues and experiences on the ship, such as clubs, water slides, jet ski around the ship, para sail, hang glide, horseback ride, use Jeeps, and four-wheelers. In certain embodiments, the system 100 may include generating a skyship idea center within the virtual worlds generated by the system 100. This functionality may allow users to chat with other users about deeper topics such as physics, philosophy, religion, product ideas, and market ventures. Users can partake in industrialization, manufacturing, and programming workshops. In certain embodiments, the system 100 may include generating virtual malls and shopping centers within the virtual worlds generated by the system 100. For example, users may explore virtual malls and shopping centers of different styles in which are composed of any retailers who join the merchant system of the system 100. In certain embodiments, every store will be accurately branded and look like real-world retail design replications. In certain embodiments, inventory of 3D items may be displayed, customizable by users, and ordered physically, and for the user's avatar. In certain embodiments, the system 100 may generate courses that explain all of the functionality provided by the system 100 and its inner workings.

In certain embodiments, the system 100 may include a SDK modification kit and allow for the generation of custom virtual worlds. Since the functionality of the system 100 may be implemented via a software engine, this may allow users to create their own words and share such worlds with other users of the system 100. In certain embodiments, anything created, imported, and programmed within a software engine editor with a mod kit and can be brought into the client application and used privately without permission. Users also may have the ability to submit their virtual worlds for public use. Submitted worlds may undergo a quality and rating check, and, if suitable, may be added to part of system's 100 virtual world collection. In certain embodiments, all basic in-game systems already created in the system 100 will work within these virtual worlds automatically, and additional programming can be added on top.

In certain embodiments, the system 100 may enable users to host their own shows as virtual lobbies to share with friends and other users, and may enable users to be stage designers. The system 100 may enable users to invite, join, or select from a list of active custom shows to view. Users can select from an array of basic stages, or design their own using the level editor. Users may be provided the ability to the either input sound from their computer (e.g. first user device 102) to use live disc jockey equipment, or select songs from a media content provider. In certain embodiments, users performing on the virtual stage may be represented as avatars or by using content generated from the use of 3D cameras. The amount of users in the crowd may follow over to media content providers outside the system 100 to track extra analytics. Users can like or comment the song that is playing using their assigned social media accounts for that service using their in-game phone interface. Users may use a level editor on a personal computer (e.g. first user device 102) or console, and select and place from an array of pre-made items, change their materials and colors, and import to place 3D models of their own. The system 100 also enable the creation of light shows, and users can select trussing of different lengths and angles, which may hold light fixture points.

In certain embodiments, the system 100 may include an anti-harassment system and user ban system. For example, if another user is annoying a user, the user can highlight and block them, which will mute them, and make them invisible to the user going forward in the virtual world. This will flag them in the database 155 for a specified time to recognize further harassment by such a user. If a user feels truly uncomfortable about another user within proximity to the user, the user can flag the user in the virtual world and it will alert nearby users. If a second user feels harassed by the same user, a virtual flag may be placed above the head of the avatar of the offending user. Nearby users in the virtual world will be able to opt in to agree on the flag. This will encourage the harassing user to move elsewhere in the virtual world or to another virtual world. In certain embodiments, if four (or any other desired number) users agree on the harassment, the initial reporting user may be required to submit an initial incident report, and the harassing user may be forced to enter private mode for a selected period of time, such as 45 minutes. If a user is forced into private mode more than a threshold number of times, the user may receive a timed account ban from the system 100. If the user is banned on a subsequent occasion, the user may be banned permanently from the system 100 and can only be overturned by appeal and a valid reason through support. The system 100 may also include, in certain embodiments, a donation and care system. Users can send each other any quantity of points in a form of a random act of kindness or donations. Users can set up causes (e.g. charitable causes) in the system 100, which allow the posting of fully customizable listings in the client application. Each listing may allow users to set a price goal and accurately describe their intentions for funding, alongside any supporting multimedia content, and even include websites.

The system 100 may also include an immersive avatar bundle/kit, which may include a virtual reality headset, wireless smart watch (or system) and gloves combination, and 3D cameras (e.g. cameras 117). The immersive avatar bundle can be bought with passion points or virtuoso Points. A second tier version of the kit may also include a processor unit, in which can run the client application at the highest optimal performance rates. The smart watch may have sensors with the ability detect the user's heart rate, vitals, SpO2, oxygen levels, stress, blood pressure, glucose, and other metrics. The watch system may also include a vibration-based subwoofer to immerse users into the auditory aspects of the system 100. The system 100 may also include an exercise system. For example, if the user has the immersive avatar bundle, the system 100 may detect if the user is doing exercise based on the user's avatar position and may reward users with points by doing exercises. Inside the virtual world generated by the client application of the system 100, users can join live exercise programs, in which users are rewarded passion points while performing the exercises. This allows the user to discover new exercises, do programs like yoga, meditate, and promote a healthy lifestyle. In certain embodiments, user synchronicity (users working out together, for example) may give all users more passion points.

The system 100 may also include a safety check system. If users opt into the safety check system, an automatic emergency notification service activated. If user's vitals begin to dwindle, the system 100 will test to detect the user's movement and if they idle out, the system 100 will generate a report containing the user's data from the past hour. Metris and movements of the user may be detected using the device 130, the sensors 132, and/or any other sensors. If an idle notification is sent, the user may be contacted, to confirm or deny an emergency. This data can help doctors by showing statistical and accurate data to prepare for a possible solution from previous knowledge.

In certain embodiments, light fixture points may be provided by the system 100. Each light fixture point may allow users to select different light sets, such as strobe, LED tube small, LED tube large, Gobo fixture, etc. Users can place LED wall tiles by size, i.e. 1×1, 2×2, 4×4, 8×8, etc to display video from online media content providers or visual patterns analyzed by the system 100. The system 100 may listen to frequency bands of the music played to automatically generate a lightshow in the virtual world and corresponding visuals if there is only audio content available. In certain embodiments, during a live event, which may be replicated in the virtual world, equipment (e.g. computing device 120) will send OSC, MIDI, ArtNET or other possible forms of communication protocols to a server (e.g. server 140) over a TCP, UDP or other network protocols, in which relays and records data from real stage sequenced lighting plots or performance data. In certain embodiments, all the commands from the equipment may be received from the server. Within the software of the system 100, each light or fixture at an event may be assigned a label in which it is constantly listening for its specific commands to undergo a desired or replicable function from the live event. For example rendered lights and fixtures from the live event in the virtual world may listen for commands, which may cause the rendered lights and fixtures to replicate what is happening with the actual lights and fixtures at the live event so that they may be outputted in the virtual world.

In certain embodiments, the users of the system 100 and/or client applications may be provided with the option to connect to social media networks through functions in the virtual world rendered by the client applications. For example, each user may have the ability to connect their social media accounts to their system 100 account through a website or game client. In the virtual phone user interface, the user can select the social media application and corresponding account associated with another user that a user wants to connect to, and the system 100 will initiate a phase to connect, add, or follow the other user on the other user's corresponding social network. In certain embodiments, a user in the virtual world may open a social media application via the client application, and it may prompt: "Please stand nearby the person you would like to add in the virtual world." The user can move his or her avatar in proximity to the avatar of the other user and the other user may be added as a friend to their social network. In certain embodiments, if two users hold down a social media application icon near each other on the phone menu user interface, the social media applications may ask for confirmation to follow them, prompting a message with that user's name or handle: "Would you like to follow @Aero4Real?" The user may then follow the other user if the user selects the option to follow the other user.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, logging the users into the system 100, generating the digital world and digital versions of events and activities in the digital world; rendering a performer at an event or activity into the digital world; causing the rendered digital performer (or avatar) to track the movements of the actual performer at the event or activity; processing and handling content streams or other streams obtained from various devices at the event or activity; storing media content associated with an event or activity; generating avatars for the users (e.g. first and second users 101, 110); causing digital lights, devices, and fixtures to track actual lights, devices, and fixtures at the live event or activity; generating and displaying virtual merchandise corresponding to actual merchandise; generating an in-game phone user interface that is rendered within the digital world; connect and share content with various social media applications; generating and displaying virtual advertising; generating and providing functionality of a digital mailbox in the digital/virtual world; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIG. 1 illustrates specific example configurations of the various components of the system 100, the system 100 may include any configuration of the components, which may include using a greater or lesser number of the components. For example, the system 100 is illustratively shown as including a first user device 102, a second user device 111, an event location 115, cameras 117, an on-site computing device 120, sensors 125, a communications network 135, a server 140, a server 150, a server 160, and a database 155. However, the system 100 may include multiple first user devices 102, multiple second user devices 111, multiple event locations 115, any number of cameras 117, multiple on-site computing devices 120, any number of sensors 125, multiple communications networks 135, multiple servers 140, multiple servers 150, multiple servers 160, multiple databases 155, or any number of any of the other components inside or outside the system 100. Furthermore, in certain embodiments, substantial portions of the functionality and operations of the system 100 may be performed by other networks and systems that may be connected to system 100.

Figure 2:
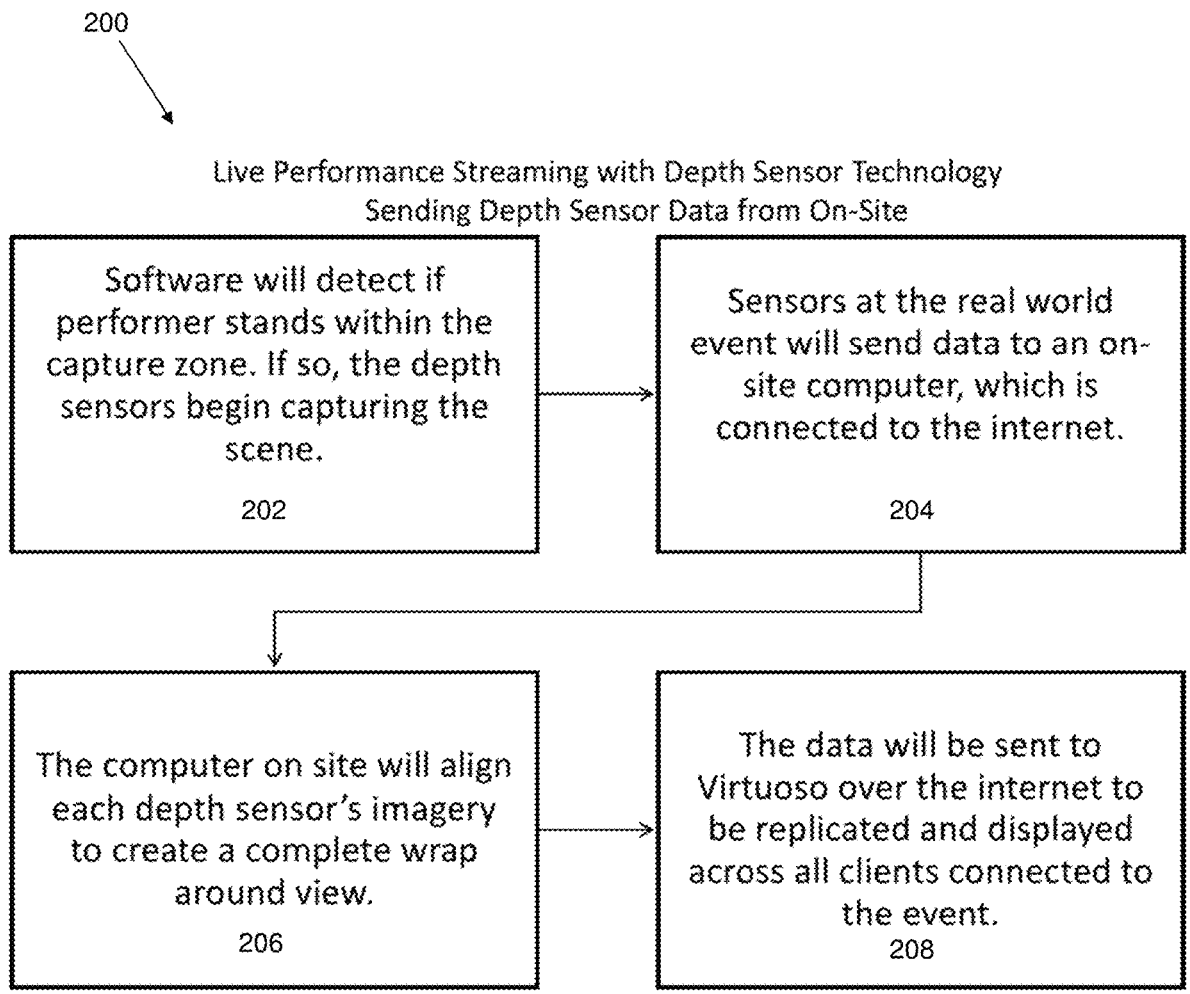
FIG. 2 is a flow diagram illustrating a sample method for enabling live performance streaming by utilizing depth sensor technology using the virtual reality system of FIG. 1.
Figure 3:
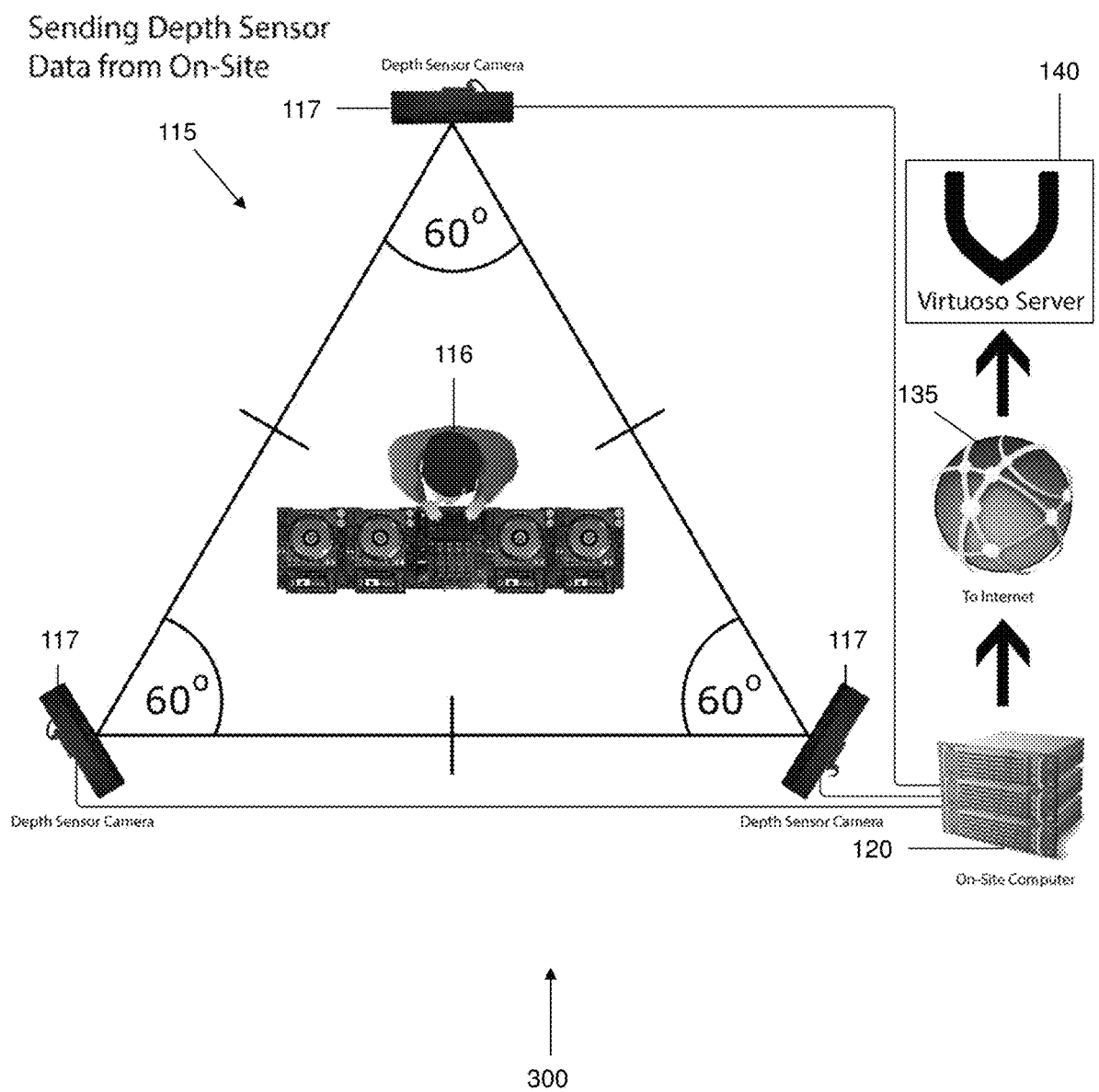
FIG. 3 is a schematic diagram of a portion of the virtual reality system of FIG. 1, which illustrates capturing and sending of depth sensor data from an on-site computing device to a server for processing.

Operatively, the system 100 may operate in accordance with the methods as illustrated and described in FIGS. 1-48. The methods shown in FIGS. 1-48 and any other methods may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. Referring to FIGS. 2-3 initially, a method 200 and accompanying portion 300 of the system 100 are schematically illustrated. In method 200, a user, such as first user 101, may desire to participate and/or view a concert being performed by a performer 116 (e.g. user 123 from FIG. 1), however, the first user 101 may not be able to physically attend the concert. As a result, the first user 101 may utilize the functionality provided by the system 100 to remotely experience the concert via a client application executing on the first user device 102 that renders a virtual world including a rendered version of the concert. To that end, the method 200 may include, at step 202, utilizing software of the system 100 to detect if the performer 116 at the concert is standing within a capture zone at the location 115 in the real world. The capture zone may be a zone in which the sensors 125 and/or cameras 117 are able to capture measurements, content, and/or data associated with the location 115 and/or performer 116. For example, the capture zone may correspond to a viewing range of the cameras 116 and/or physical detection range that the sensors 125 are able to operate within in. In FIG. 3, depth sensor cameras 117 are placed in a triangular configuration with 60 degree angles and in a direction towards the performer 116, however, any suitable configuration of the cameras 116 may be utilized. In certain embodiments, the detection may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

At step 204, the method 200 may include transmitting sensor data from the sensors 125, sensors 132, or a combination thereof, and media content recorded by the cameras 117 to an on-site computer (e.g. computing device 120), which is connected to the internet (e.g. communications network 135. The sensor data may include motion capture/tracking information and/or depth information for the performer 116 and the location 114, and the media content may include video and/or audio content of the performer 116 at the concert. In certain embodiments, the sensor data and/or media content may be transmitted to the servers 140, 150, 160 for further processing. In certain embodiments, the sensor data and/or the media content may be transmitted by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 206, the method 200 may include aligning each sensor's 125, 132 imagery (e.g. depth sensor imagery) to generate a complete wraparound view of the performer 116 at the concert. In certain embodiments, the aligning may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 208, the method 200 may include transmitting the sensor data, the media content, and/or the aligned wraparound view of the performer 116 over the communications network 135 to be replicated and displayed across all client applications of users connected to the system 100 that want to experience the event remotely. The wraparound view of the performer 116 and a rendering of the concert venue may be displayed in real-time to each user via a graphical user interface of their client applications so that the users can experience the concert while not being physically at the physical location 115 of the concert.

Figure 4:
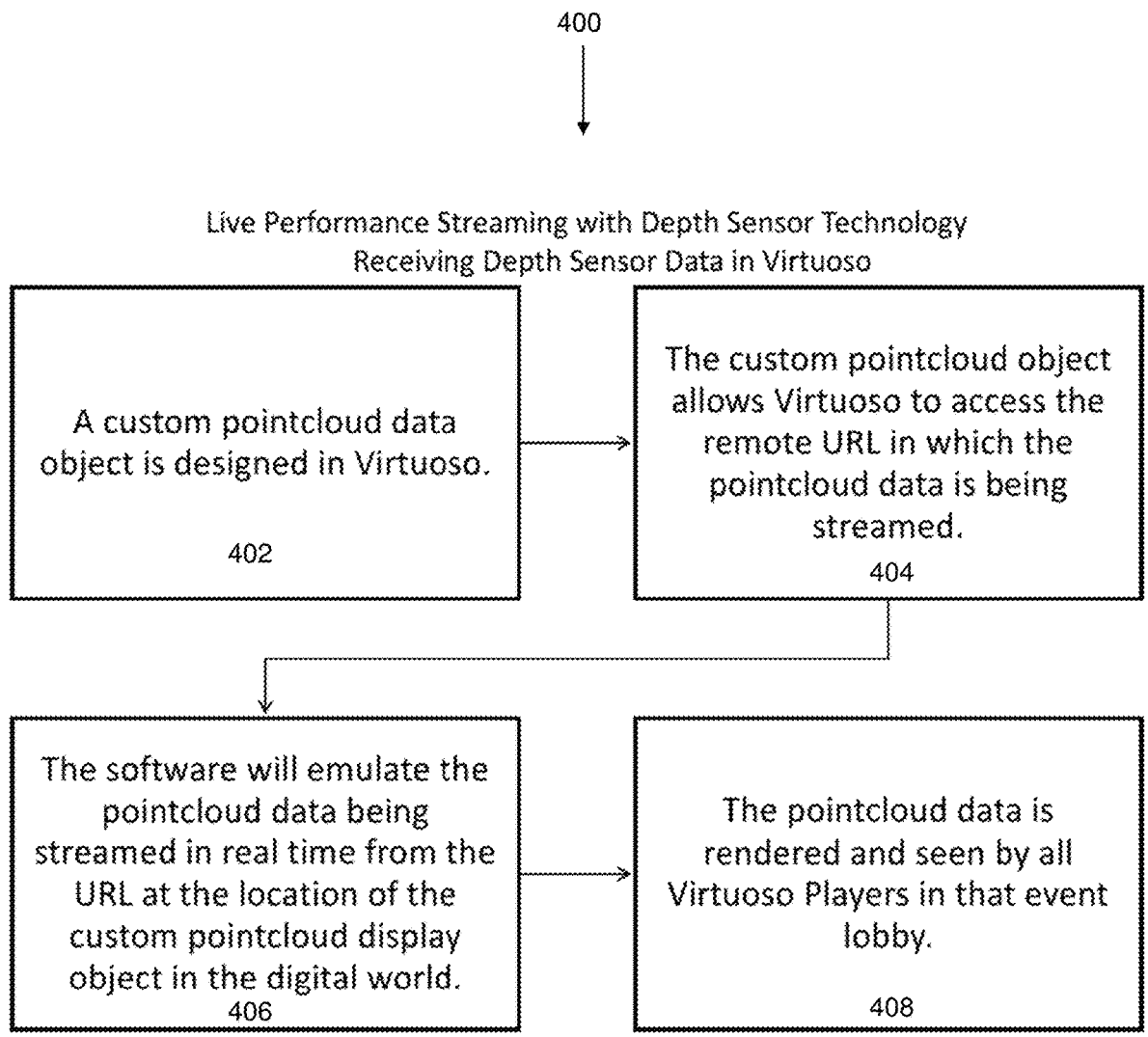
FIG. 4 is a flow diagram illustrating a sample method for facilitating live performance streaming by utilizing depth sensor technology and rendering point cloud data for display to users using the virtual reality system of FIG. 1.
Figure 5:
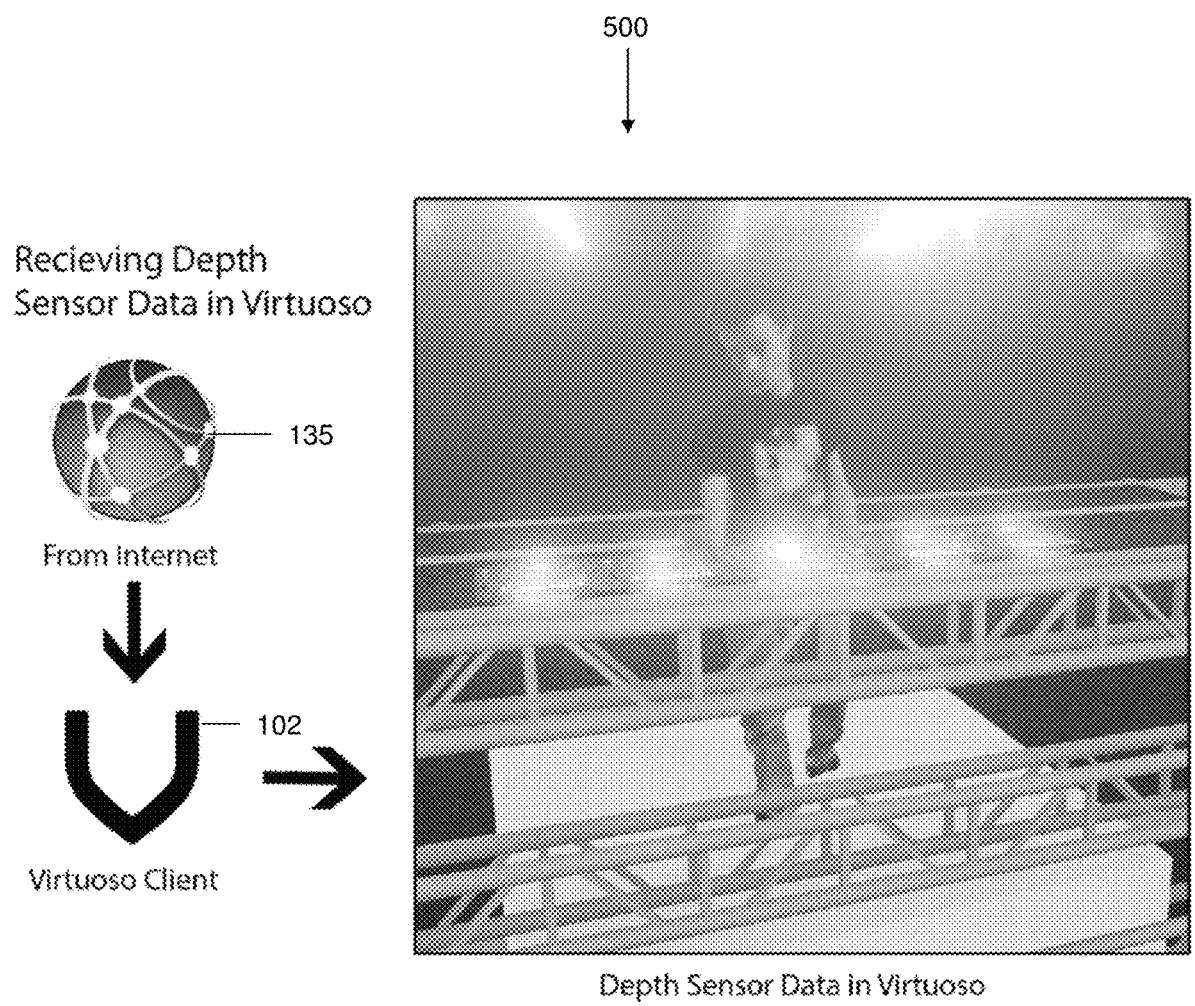
FIG. 5 is a diagram illustrating depth sensor data being received by the virtual reality system of FIG. 1 and depth sensor data being rendered in a graphical user interface of a client application utilized with the virtual reality system of FIG. 1.

Referring to FIGS. 4-5, a method 400 and accompanying portion 500 of the system 100 are schematically illustrated. In method 400, a custom pointcloud data object may be designed in the system 100 at step 402. In certain embodiments, the pointcloud object may correspond to streams and/or recordings of anyone (e.g. performer 116) standing within a performance/capture zone at a live event and/or any object at a live event. In certain embodiments, designing of the pointcloud data object may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 404, the method 400 may include having the custom pointcloud object enable the system 100 to access a uniform resource locator (e.g. a remote URL) in which the pointcloud data may be streamed. In certain embodiments, the enabling may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

At step 406, the method 400 may include having the client application and/or the system 100 emulate the pointcloud data being streamed in real-time from the uniform resource locator of the customer pointcloud data object (e.g. a pointcloud display object) in the virtual/digital world rendered by the client application and/or system 100. In certain embodiments, the emulating may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 408, the method 400 may include rendering the pointcloud data so that it can be seen by all users participating in that particular event via the client application. In certain embodiments, the rendering may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

Figure 6:
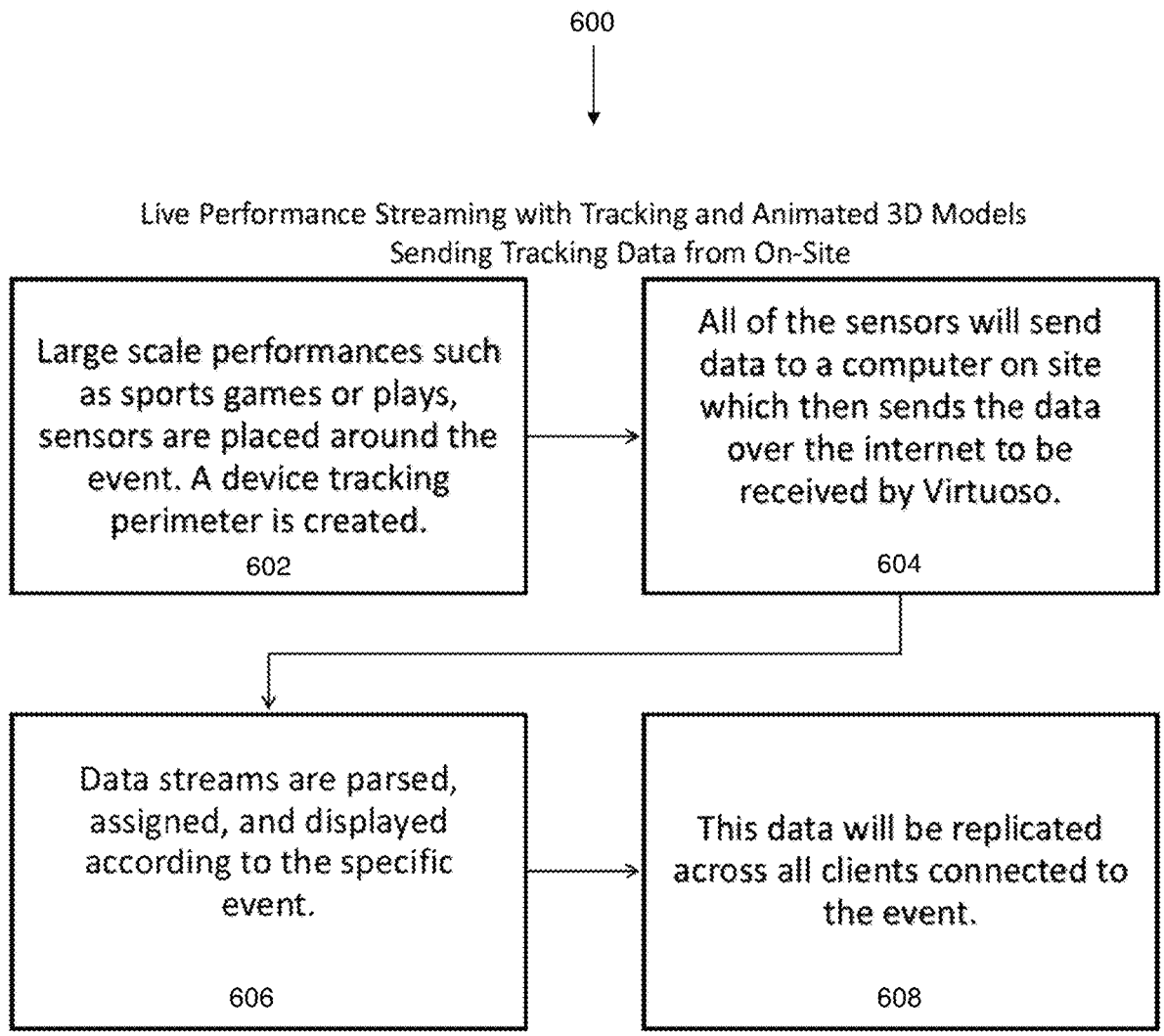
FIG. 6 is a flow diagram illustrating a sample method for obtaining sensor data during an event and displaying data streams from the event to users using the virtual reality system of FIG. 1.
Figure 7:
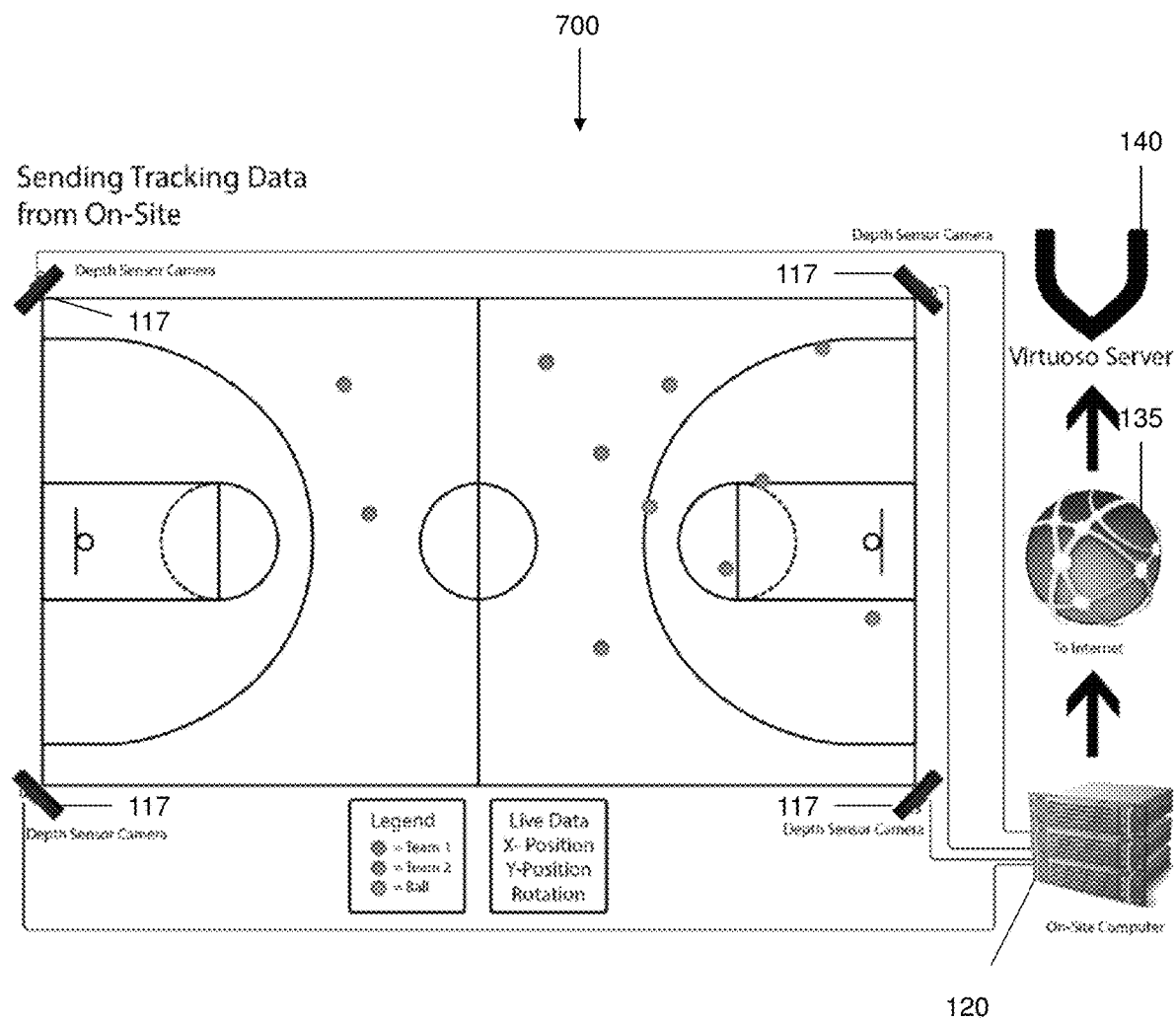
FIG. 7 is a schematic diagram illustrating depth sensor cameras and sensors that obtain data during an event, which are then provided to an on-site computing device.

Referring to FIGS. 6-7, a method 600 and accompanying portion 700 of the system 100 are schematically illustrated. The method 600 may begin at step 602, which may include generating a device tracking perimeter at an event, such as by utilizing cameras 117, sensors 125, and/or sensors 132. For example, in FIG. 7, a tracking perimeter is created by placing depth sensor cameras 117 at the four corners of a basketball court. The depth sensor information may indicate x-y and/or other position data of each object on the basketball court, rotational information, movement information, any other information, or a combination thereof. At step 604, the method 600 may include having each camera 17, sensor 125, and/or sensor 132 transmit their measured data and recorded media content as a data stream to the on-site computing device (e.g. computing device 120), which may then send the data to the servers 140, 150, 160 for further processing. In certain embodiments, the transmitting may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

At step 606, the method 600 may include parsing the data streams, assigning the data streams, and displaying the data streams according to the specific event they are related to. For example, if the data streams are associated with basketball players playing a basketball game, the system 100 may parse and assign the data streams to a basketball-related file and/or uniform resource locator, which may be used to display the data streams. In certain embodiments, media content recorded by the cameras 117 may be displayed within the virtual world rendered by the client application of a user. Additionally, sensor data may be utilized to position avatars corresponding to the performers at the event at virtual locations on a virtual event site rendered in the virtual world that correspond to the actual locations that the actual performers are located in. Additionally, movements of the performers may be similarly replicated into the virtual world as well. In certain embodiments, the parsing, assigning, and/or displaying may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 608, the method 600 may include replicating the data streams across all client applications connected to the event. In certain embodiments, the replicating may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

Figure 8:
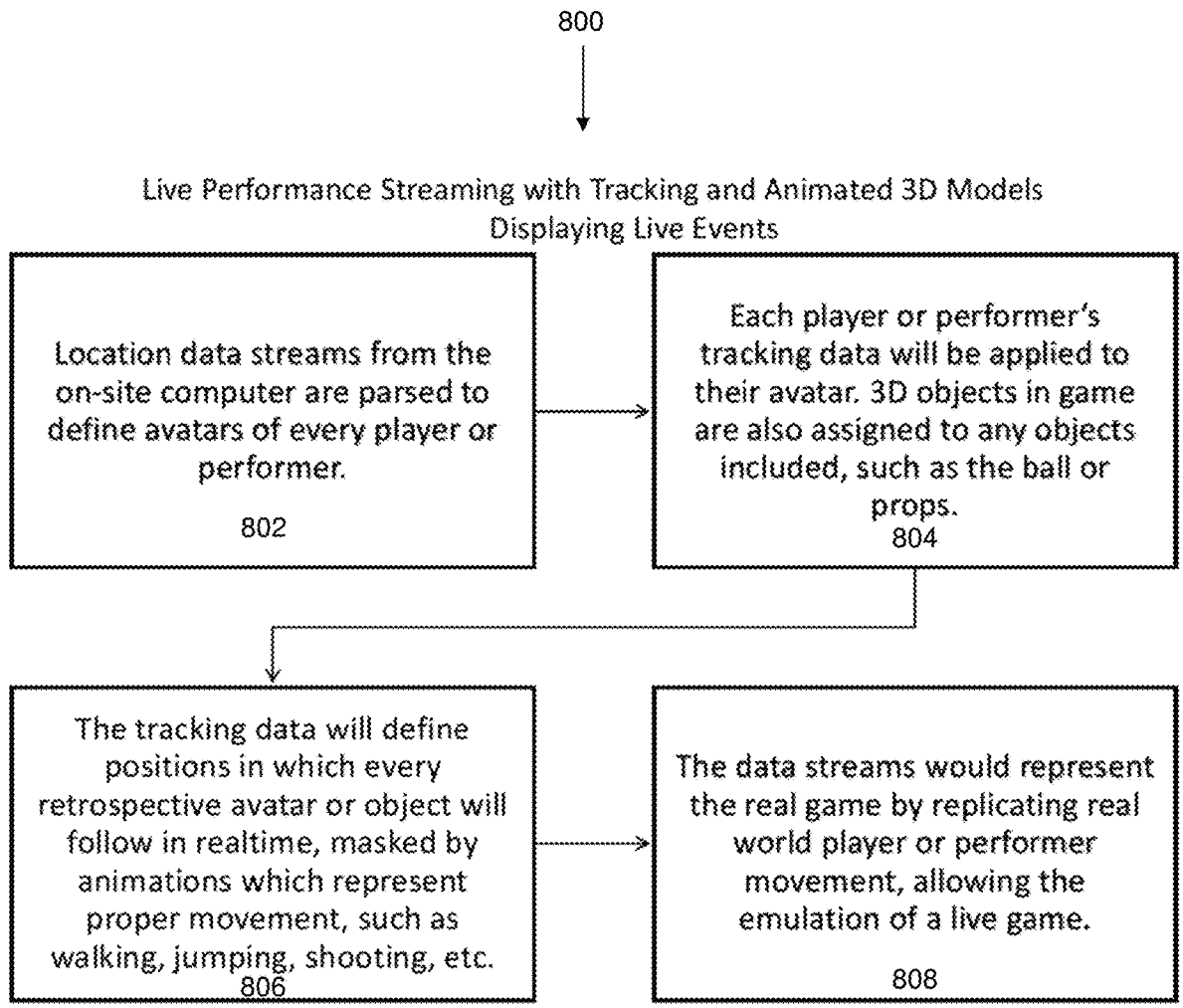
FIG. 8 is a flow diagram illustrating a sample method for defining avatars for a performer during an event, tracking the performer, defining positions of the performer for their corresponding avatar, and replicating the performer's movement through animations to allow for emulation of the live performer during the event.
Figure 9:
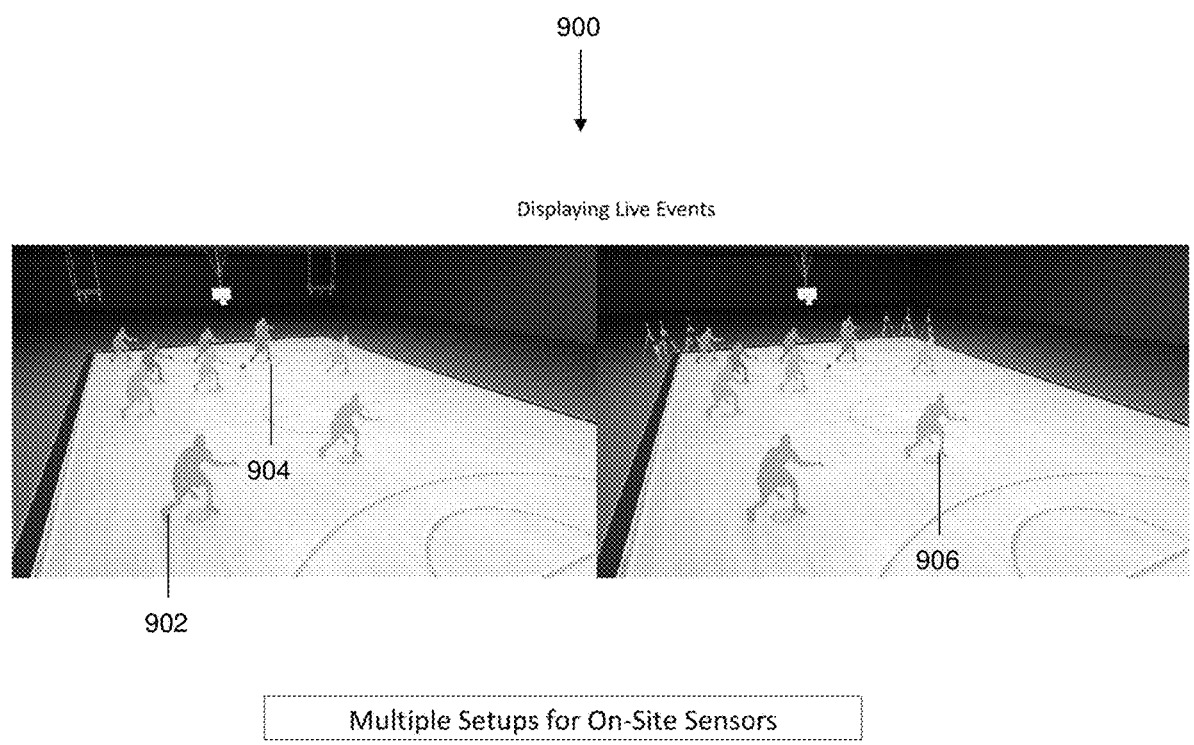
FIG. 9 is a schematic diagram that illustrates sample avatars for various performers performing during a live event that are displayed as moving in synchronized fashion with the live performers to users connected to the virtual system of FIG. 1.

Referring to FIGS. 8-9, a method 800 and accompanying rendering 900 generated by the system 100 are schematically illustrated. The method 800 may begin at step 802, which may include parsing data streams, such as location and/or tracking data streams from an on-site computer (e.g. computing device 120) to define avatars for each athlete or performer at an event. The location data streams may be obtained by the on-site computer via the sensors 125, 132, and/or cameras 117. In certain embodiments, the parsing may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 804, the method 800 may include applying each athlete or performer's tracking/location data to their corresponding avatar. In certain embodiments, 3D objects in the virtual world may also be assigned to any objects at the event. For example, a 3D basketball in the virtual world may be assigned to a tracked basketball at a basketball game. In certain embodiments, the applying may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

At step 806, the method 800 may include utilizing the tracking/location data to define positions in which each respective avatar or object will follow in real-time, which may be masked by animations (e.g. pre-recorded animations simulating the type of movements a performer or athlete would make) which represent proper movement, such as, but not limited to, walking, jumping, shooting, running, dancing, etc. In certain embodiments, the defining may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 808, the method 800 may include utilizing the data streams to represent the real event (e.g. basketball game) by replicating real world athlete or performer movement in the virtual world thereby allowing for emulation of a live event. In certain embodiments, the representing and/or replicating may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

Figure 10:
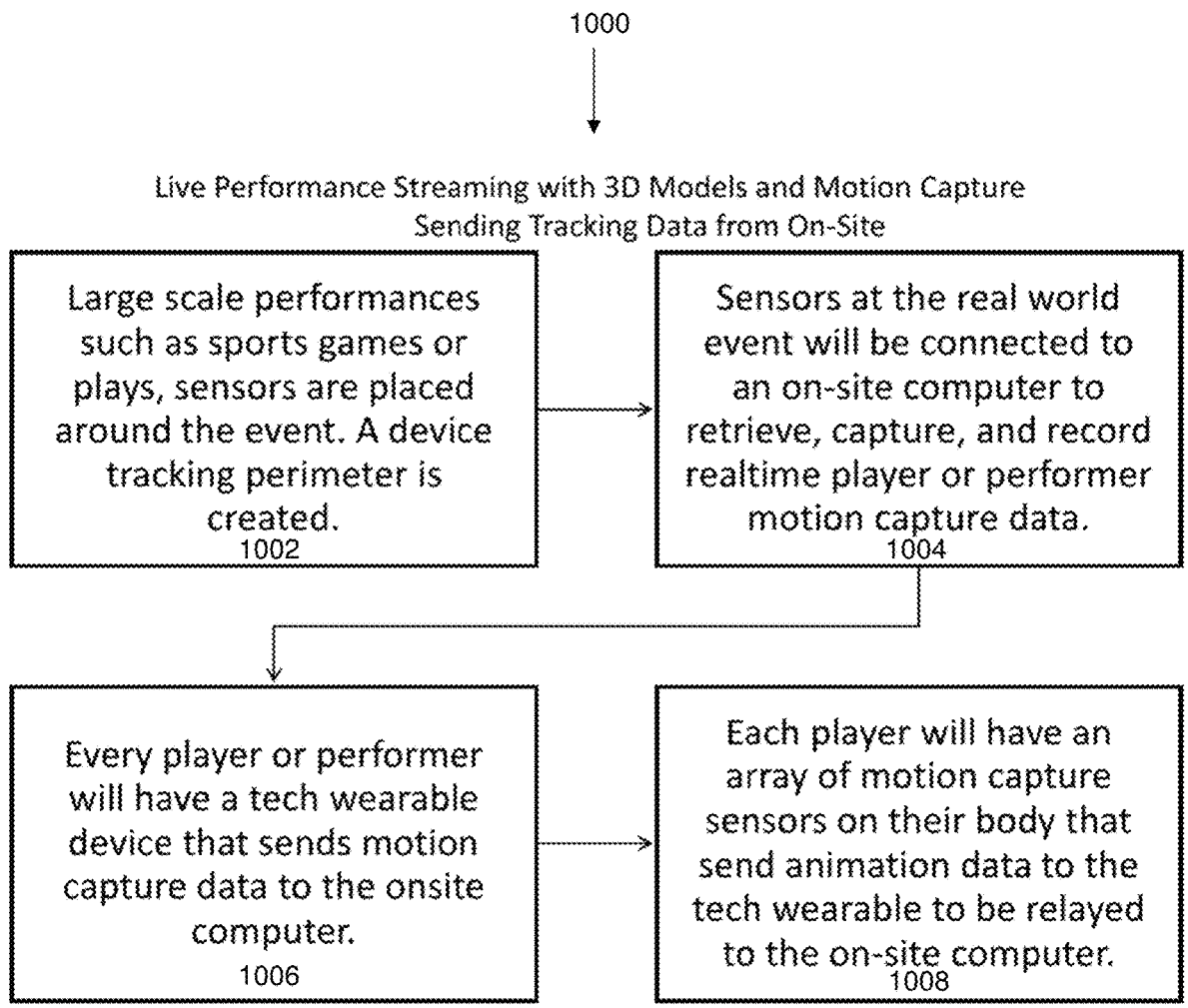
FIG. 10 is a flow diagram illustrating a sample method for obtaining sensor data at an event for capturing and recording real-time performer motion capture data through the use of one or more wearable devices worn by the performer.
Figure 11:
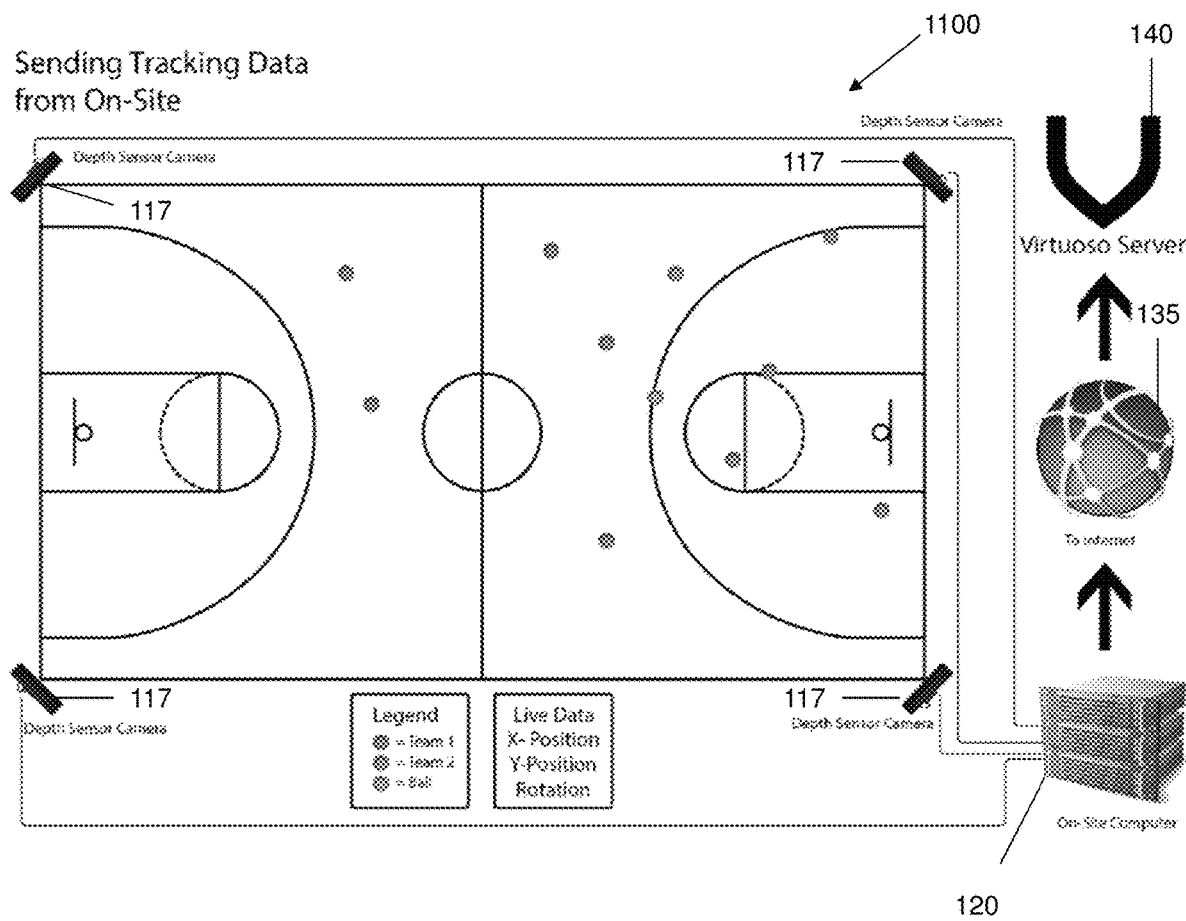
FIG. 11 is a schematic diagram that illustrates motion capture data being obtained from various sensors and cameras located at an event.

Referring to FIGS. 10-11, a method 1000 and accompanying rendering 1100 generated by the system 100 are schematically illustrated. The method 1000 may begin at step 1002, which may include creating a tracking perimeter at an event, such as by placing sensors 125, 132 and/or cameras 117 at corners of the event so that they can track movement and location data associated with objects and/or people within tracking range. At step 1004, the method 1000 may include retrieving, capturing, and/or recording real-time performer motion capture data using the sensors 125, 132, and/or cameras 117, which may be connected to an on-site computer (e.g. computing device 120). In certain embodiments, the retrieving, capturing, and/or recording may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

At step 1006, the method 1000 may include having a wearable device (e.g. device 130) of the performer send captured motion capture and/or location data to an on-site computer (computing device 120) for further processing. In certain embodiments, the transmitting may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1008, the method 1000 may include having sensors 132 on the body of the performer capture motion capture and/or location data for each body part of the user to the wearable device, which may then relay that captured motion and/or location data to the on-site computer for further processing. In certain embodiments, the transmitting of the motion capture and/or location data may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

Figure 12:
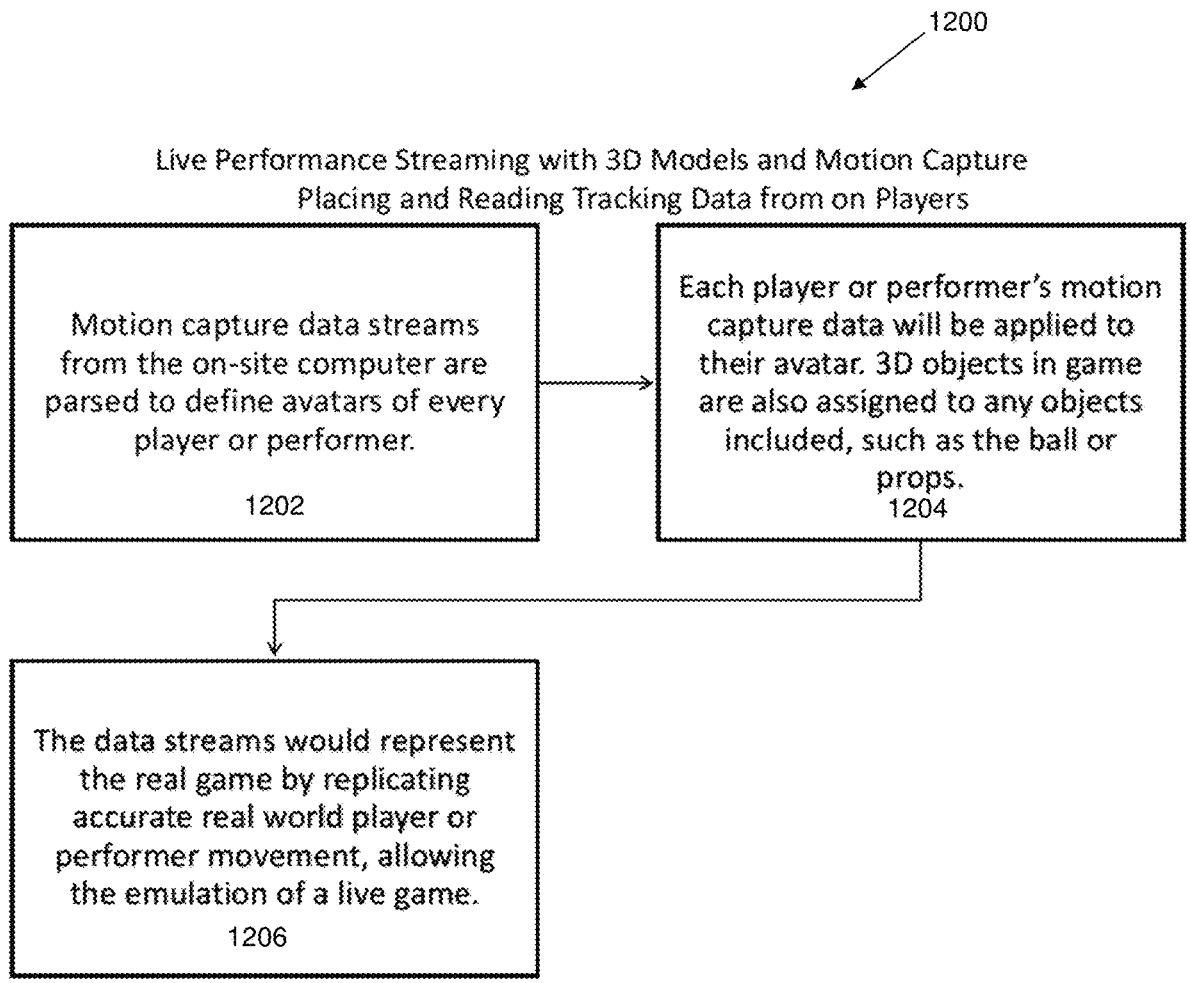
FIG. 12 is a flow diagram illustrating a sample method for parsing motion capture data streams to define avatars of performers at an event, applying the performer's motion capture data to their corresponding avatars, and replicating accurate real-world performer movement to emulate the live performance of the performers at the event.
Figure 13:
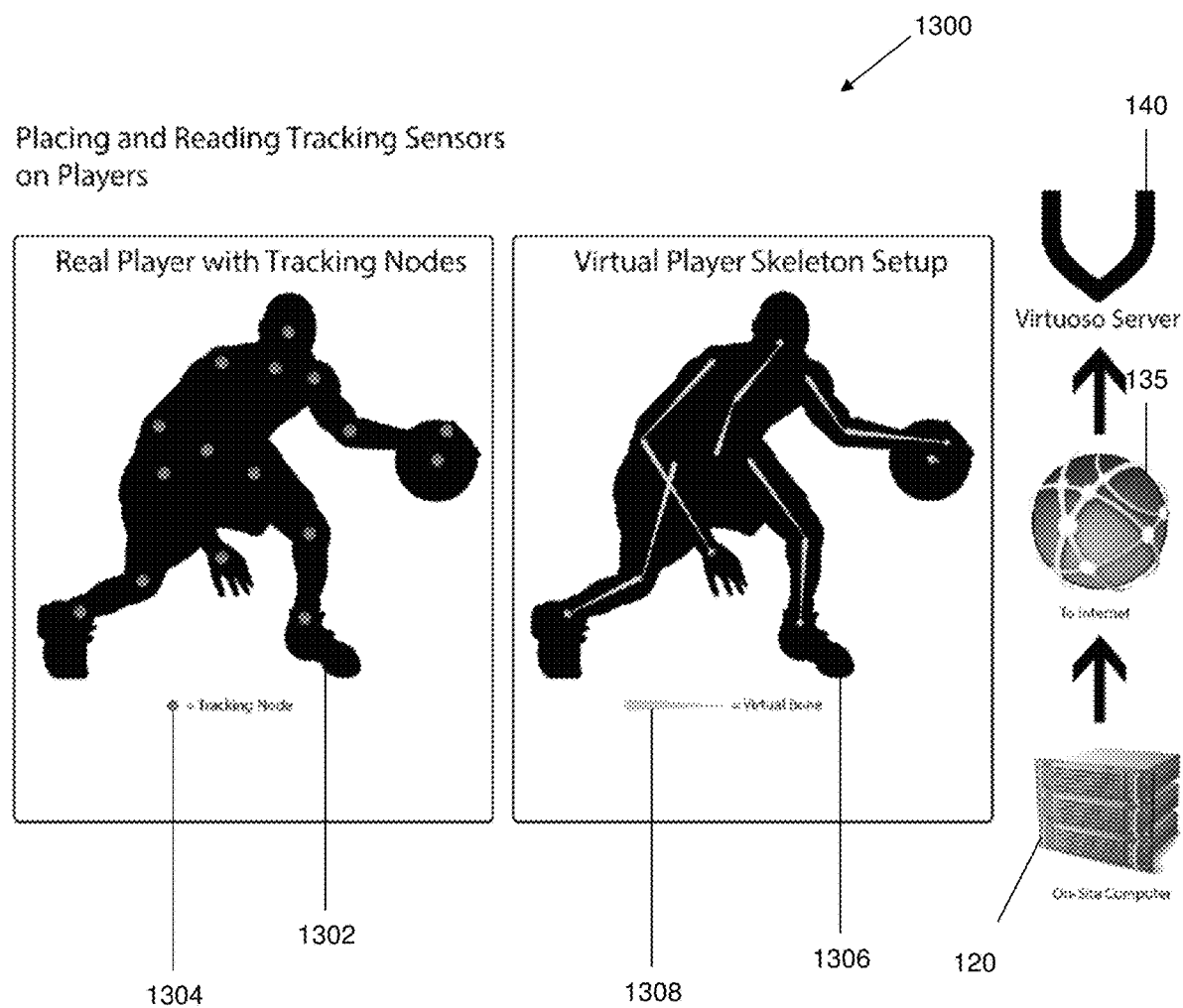
FIG. 13 is a schematic diagram illustrating an actual performer with tracking sensors/nodes and a corresponding virtual performer with virtual bones and body parts that may be displayed to users utilizing the virtual reality system of FIG. 1.

Referring to FIGS. 12-13, a method 1200 and accompanying illustration 1300 are schematically illustrated. The method 1200 may begin at step 1202, which may include parsing motion capture and/or location data streams from the on-site computer to define avatars of each performer at the event. In certain embodiments, the parsing may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1204, the method 1200 may include applying each performer's motion capture/location data to their corresponding avatar. In certain embodiments, 3D objects may be assigned to any objects, such as a basketball or props occurring at the live event. In certain embodiments, the applying may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1206, the method 1200 may include using the data streams to represent the actual event by replicating accurate real world performer movement, thereby allowing emulation of a live event. In FIG. 13, for example, tracking nodes 1304 are placed on an athlete 1302 and the motion capture/location data is transmitted to the on-site computer and/or server 140 for processing. An avatar 1306 corresponding to the athlete 1302 is generated with virtual bones and the avatar 1306 will move in accordance with the movements obtained from the motion capture data from the tracking nodes 1304 on the actual athlete 1302.

Figure 14:
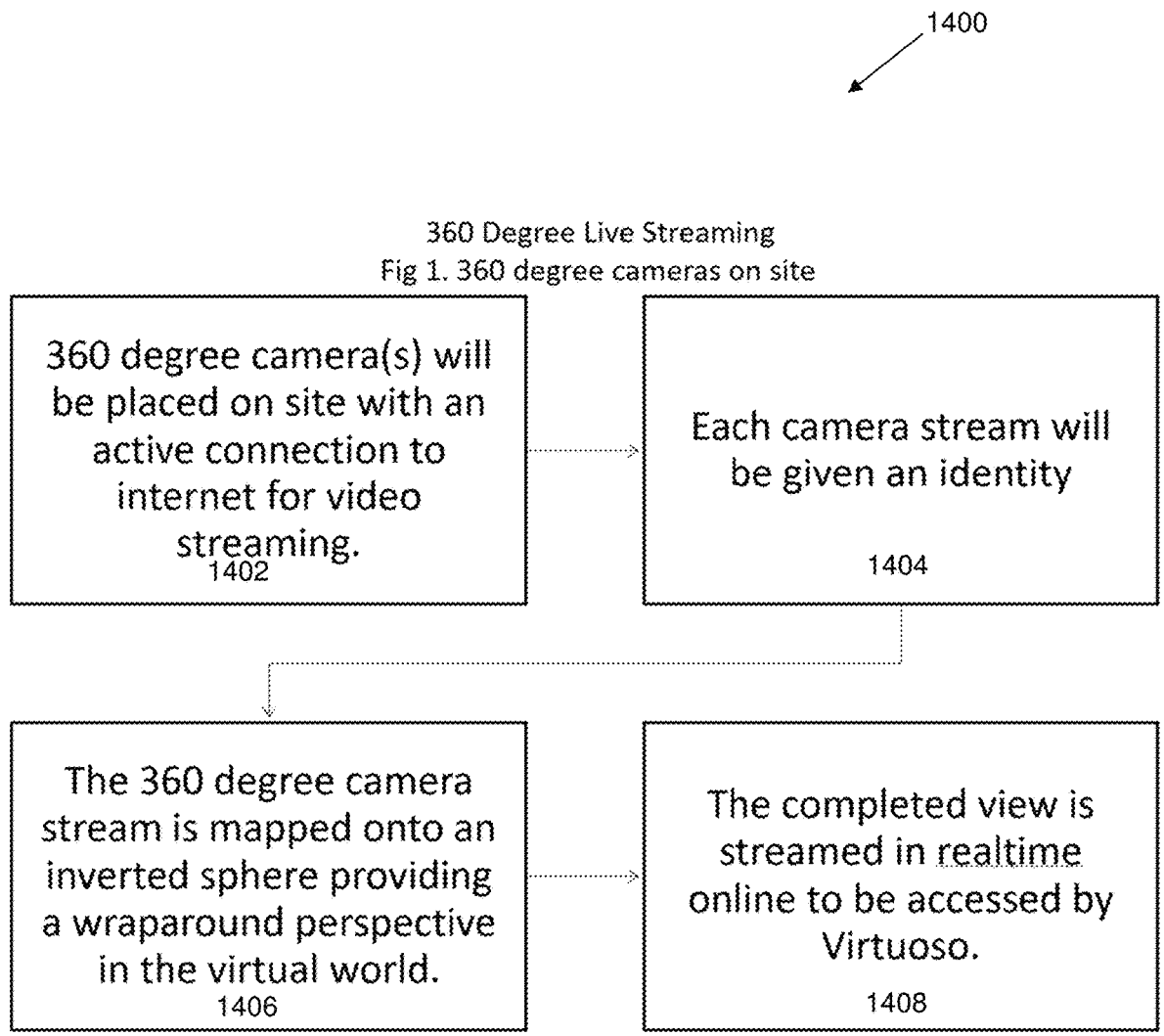
FIG. 14 is a flow diagram illustrating a sample method for utilizing a 360 degree camera located at an event with an active connection to the internet for video streaming, providing an identity to each camera stream, aligning depth sensor imagery to create a wraparound view of the event in real-time, and streaming the wraparound view to users connected to the virtual reality system of FIG. 1.
Figure 15:
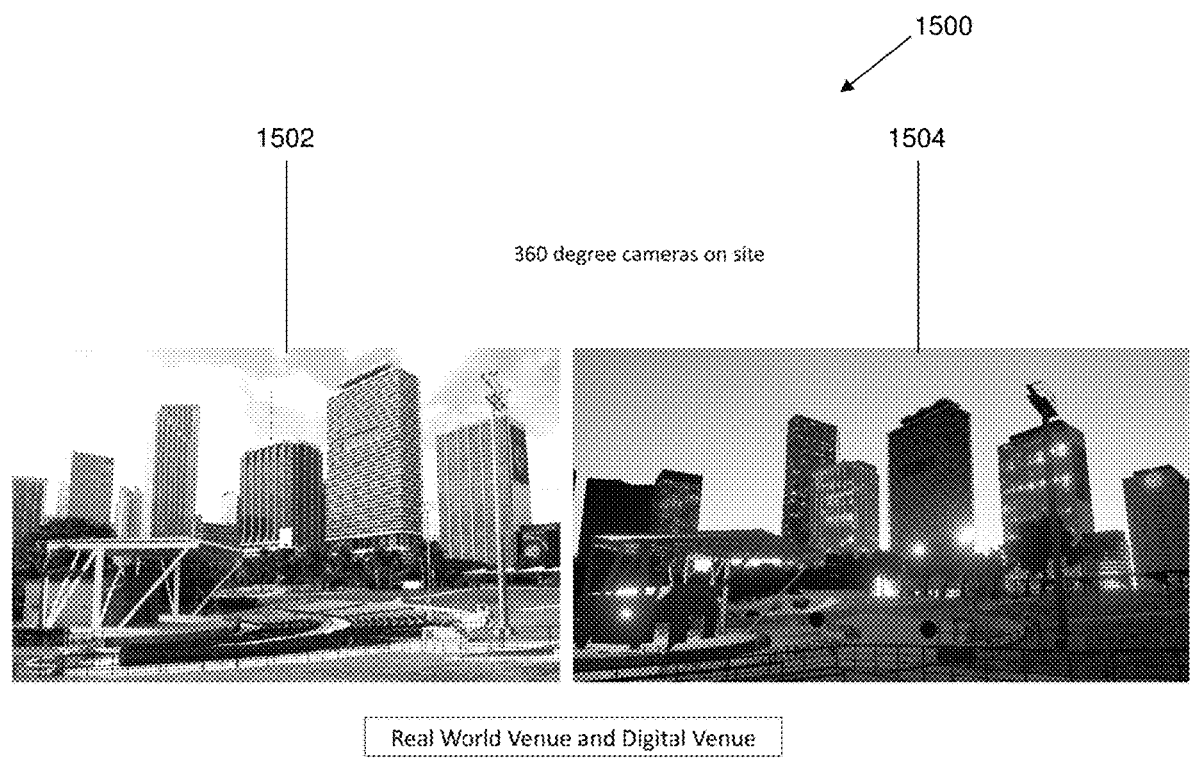
FIG. 15 is a schematic diagram illustrating a real world location for an event and a corresponding virtual version of the real world location that may be streamed to users utilizing the virtual reality system of FIG. 1.

Referring to FIGS. 14-15, a method 1400 and accompanying illustration 1500 are schematically illustrated. The method 1400 may begin at step 1402, which may include placing 360 degree cameras 117 at a venue 1502 with an active connection to the internet for video streaming. At step 1404, the method 1400 may include providing each camera stream obtained from each camera 117 with an identity in the system 100. In certain embodiments, the identify may be provided and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1406, the method 1400 may include utilizing 360 degree cameras for use with streaming into the system. In certain embodiments, the aligning may be performed and/or facilitated by utilizing the camera 117, 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1408, the completed wraparound view may be streamed in real-time online to be accessed by the client applications of the users so that the users may view it. In certain embodiments, the streaming may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. In FIG. 15, the venue 1502 is utilized to create a rendered version of the venue 1504, which may include a wraparound view of the venue.

Figure 16:
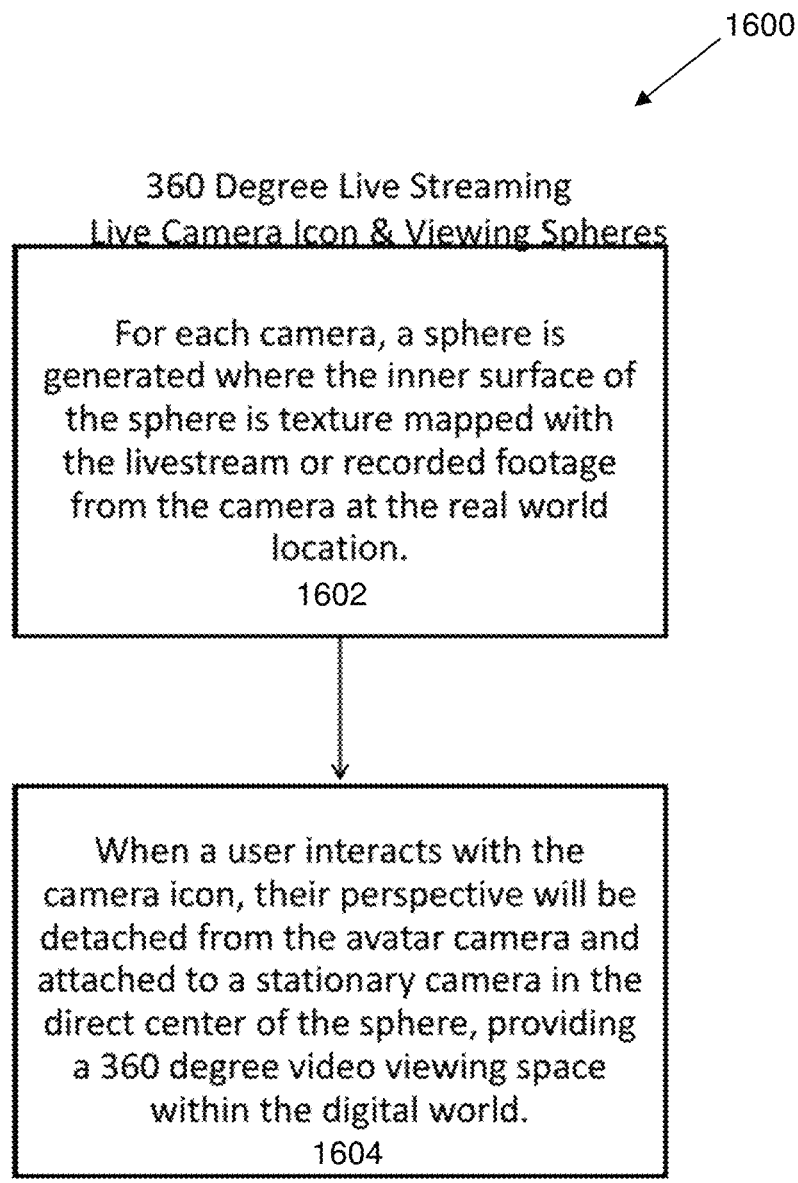
FIG. 16 is a flow diagram illustrating a sample method for generating spheres where the inner surface of each sphere is texture mapped with the live stream footage obtained from cameras located at a live event, and enabling a user to change their perspective in the virtual world so as to view a 360 degree video viewing space within the digital world.
Figure 17:
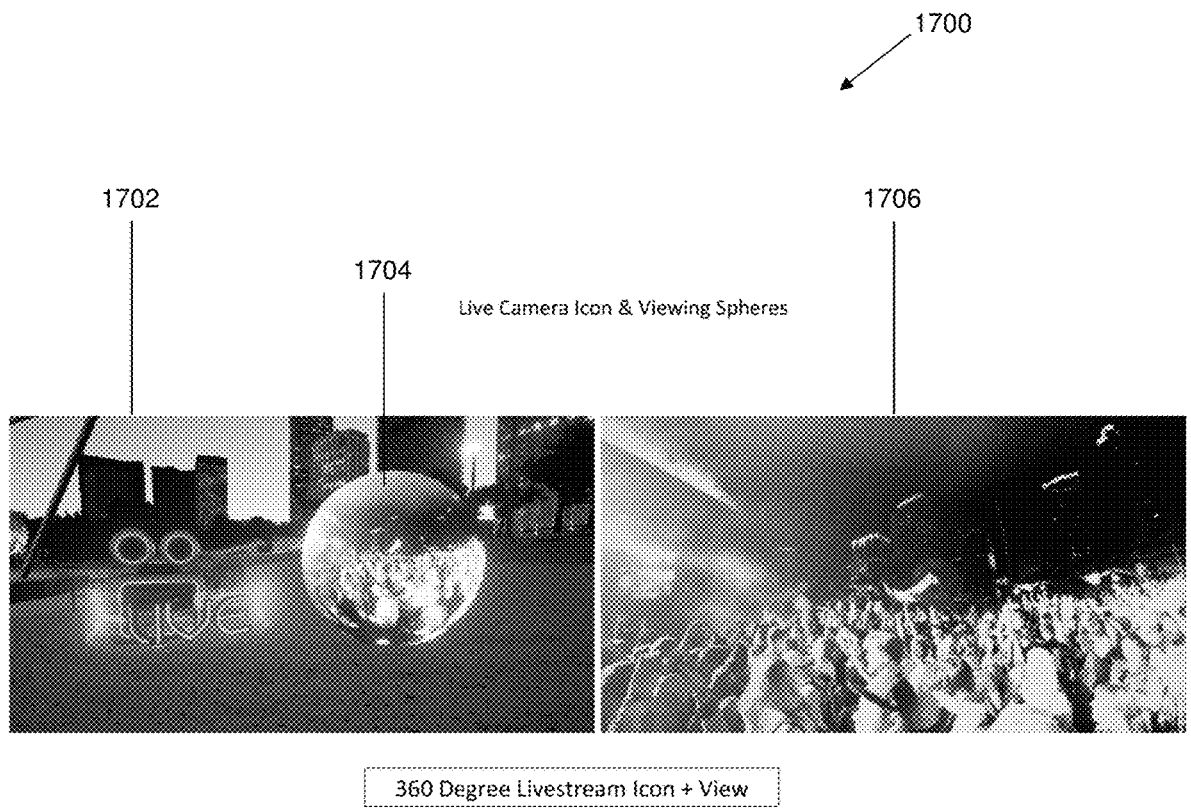
FIG. 17 is a schematic diagram illustrating a sample sphere generated in the virtual world including the live stream footage obtained from cameras located at a live event, and a first-person perspective view of the live stream footage once a user of the virtual reality system of FIG. 1 accesses the sphere in the virtual world rendered to the user.

Referring to FIGS. 16-17, a method 1600 and accompanying illustration 1700 are schematically illustrated. The method 1600 may begin at step 1602, which may include generating a sphere 1704 for each camera 17, where the inner surface of the sphere 1704 may be texture-mapped with a livestream or recorded footage from a camera 117 at a real world event. In certain embodiments, the generating may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device. At step 1604, the method 600 may include when a user interacts with the camera icon and/or the sphere 1704 in a virtual world 1702, their perspective may be detached from the avatar camera in the virtual world 1702 to a stationary camera in the direct center of the sphere, which may provide a 360 degree video viewing space within the virtual world, as shown in video screenshot 1706, which corresponds to the content being streamed in the sphere 1704. In certain embodiments, the perspective change may be may be performed and/or facilitated by utilizing the first user device 102, the second user device 111, the server 140, the server 150, the server 160, the sensors 125, the sensors 132, the device 130, the cameras 117, the computing device 120, the communications network 135, any component of FIGS. 1-48, any combination thereof, or by utilizing any other appropriate program, network, system, or device.

Figure 18:
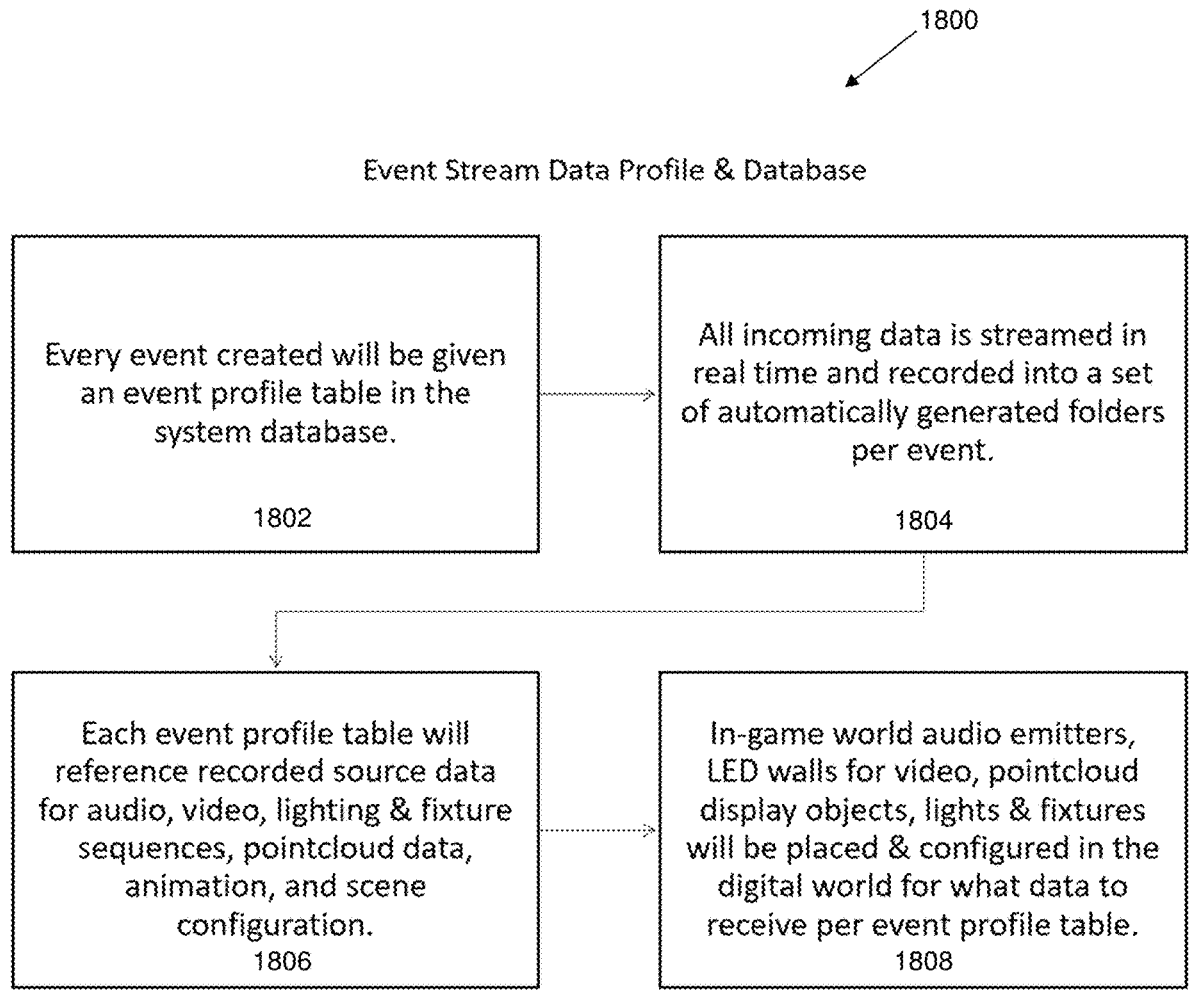
FIG. 18 is a flow diagram illustrating a sample method for providing identity tables for events created in the database of the virtual reality system of FIG. 1, streaming incoming data and recording the data into a set of folders for each event, referencing recorded source data for audio, video, lighting, fixture sequences, point cloud data, animation data, and scene configuration, and configuring virtual world audio emitters, LED walls for video, point cloud display objects, lights, and fixtures for what data to receive per event identity table.
Figure 19:
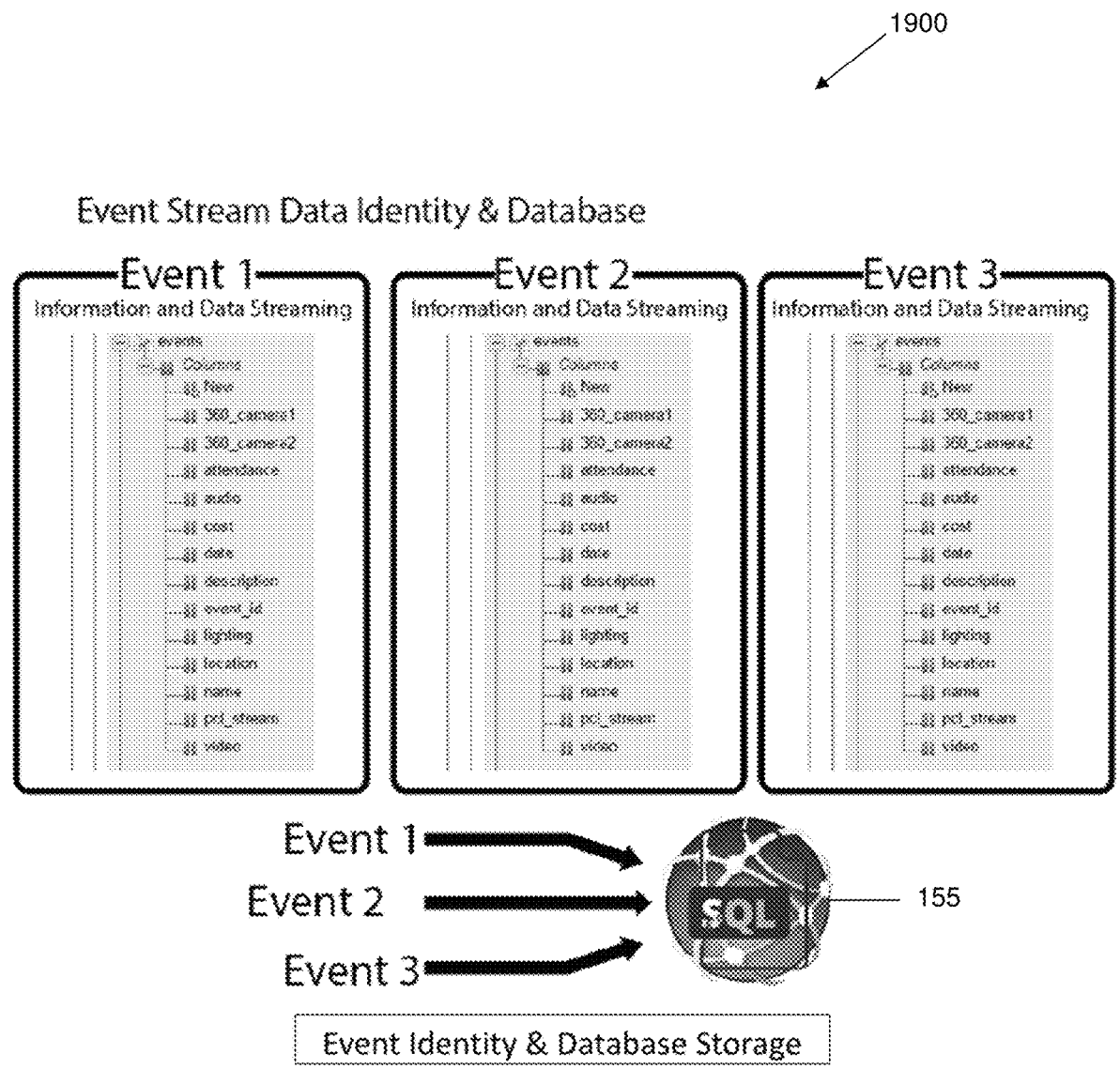
FIG. 19 is a schematic diagram illustrating sample identity tables for events for storing recorded data and content into sets of folders for each event.

Referring to FIGS. 18-19, a method 1800 and accompanying illustration 1900 are schematically illustrated. The method 1800 may begin at step 1802, which may include creating and giving a profile table for each event in the database 155. At step 1804, the method 1800 may include streaming all incoming data from an event (e.g. from cameras 117 and/or sensors 130, 125, etc.) in real-time and recorded into a set of automatically generated folders per event, as shown in FIG. 19. At step 1806, the method may include using each event profile table to reference recorded source data for audio, video, lighting and fixture sequences at the event, pointcloud data from cameras 117, animations to emulate movements, and scene configurations. At step 1808, the method may include placing and configuring, in the virtual world, audio emitters, LED walls for video, pointcloud display objects, lights and fixtures, etc. based on the data received for each event in their corresponding event profile table.

Figure 20:
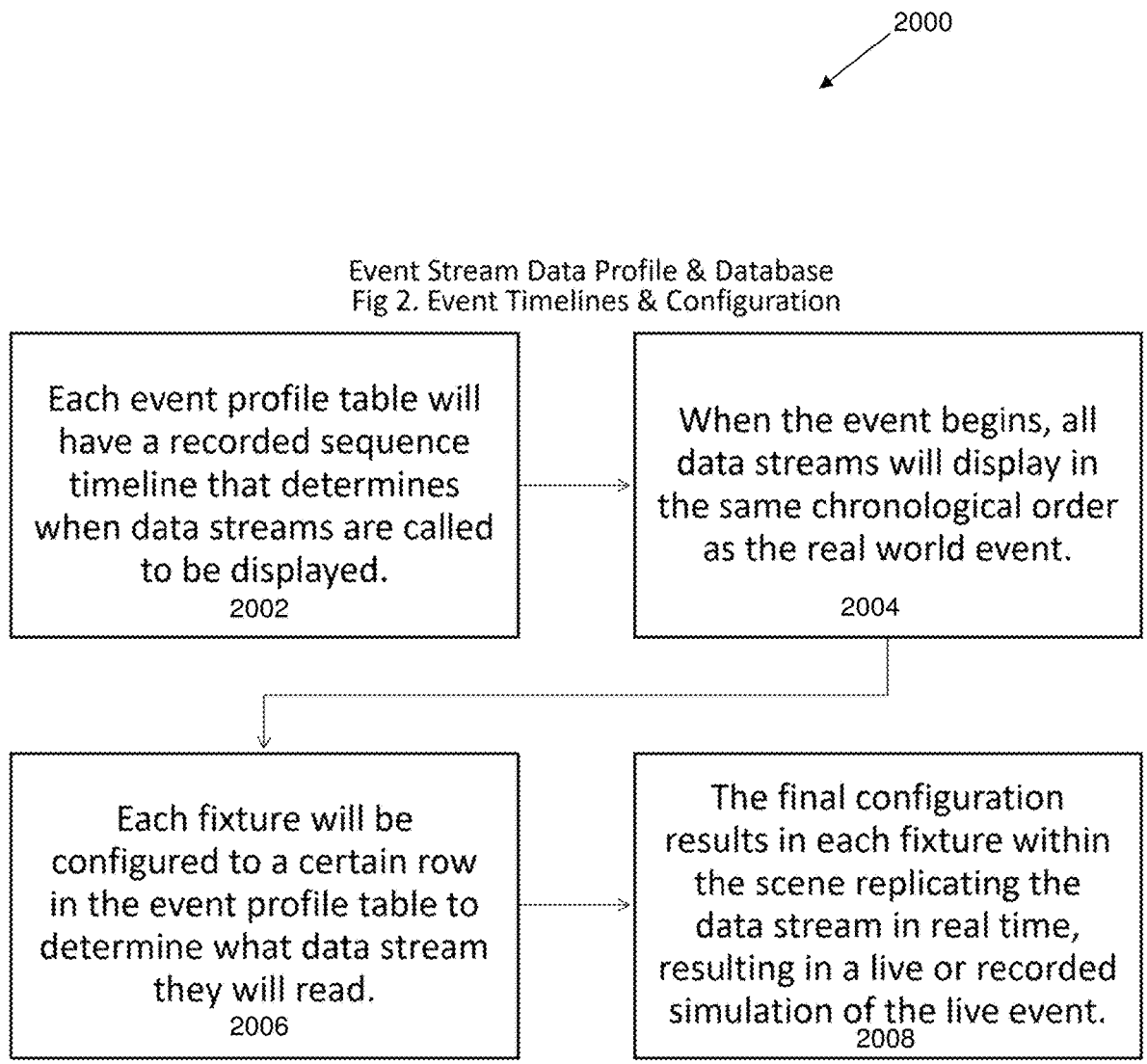
FIG. 20 is a flow diagram illustrating a sample method for providing event identity tables that include recorded sequence timelines that determine when data streams are called to be displayed, displaying data streams in the same chronological order as the real world event, configuring fixtures to determine what data stream the fixtures will read, and having each fixture within a scene replicating data streams in real-time, which results in a live or recorded simulation of a live event.
Figure 21:
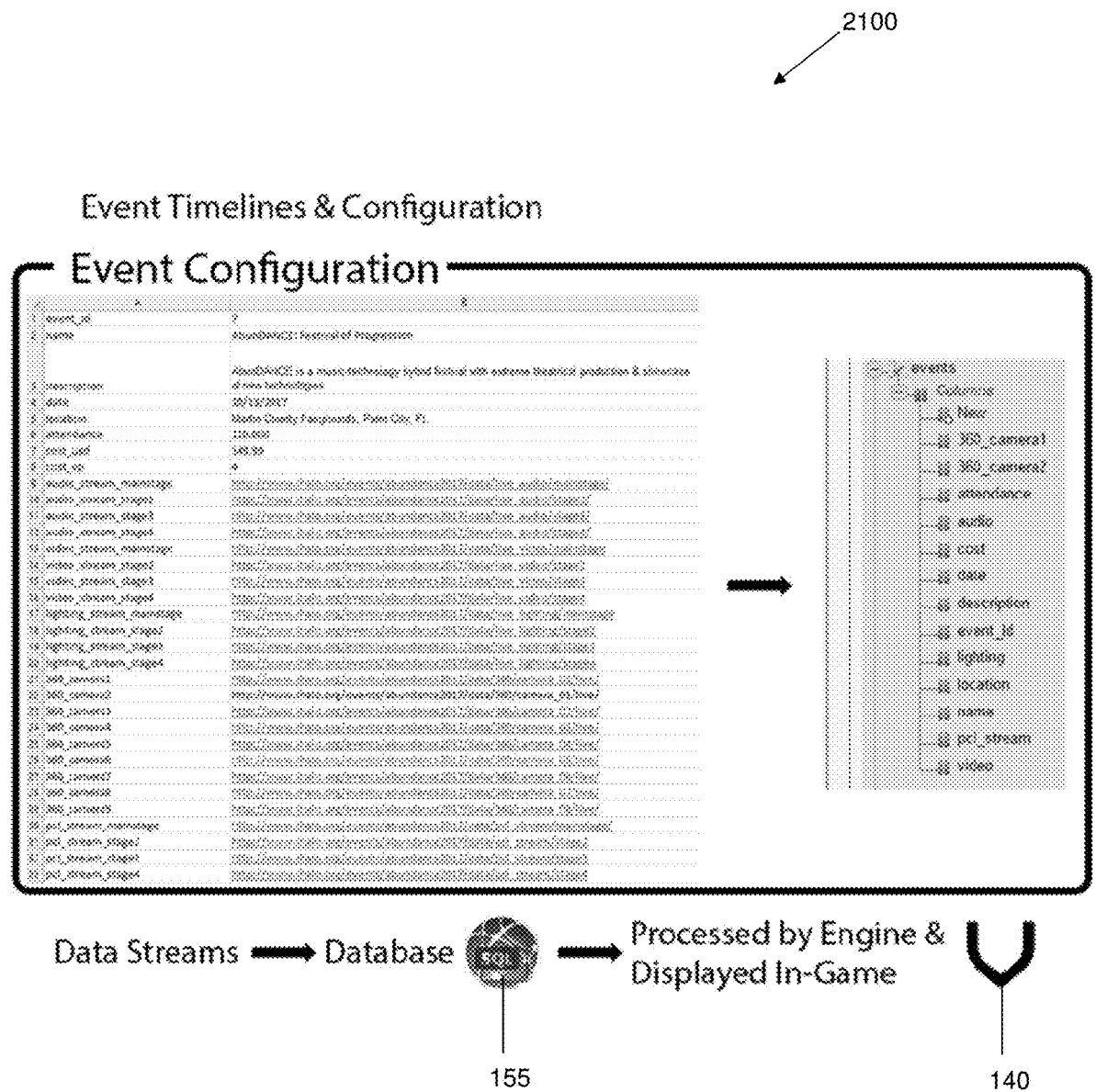
FIG. 21 is a schematic diagram illustrating sample event timelines and configuration for use with the virtual reality system of FIG. 1.

Referring to FIGS. 20-21, a method 2000 and accompanying illustration 2100 are schematically illustrated. The method 2000 may begin at step 2002, which may include having each event profile table have a recorded sequence timeline that determines when data streams associated with the event are called to be displayed to users using the client applications. At step 2004, the method 2000 may include, when the event begins or at another selected time, displaying all data streams in the same chronological order as the real world event. At step 2006, the method 2000 may include configuring each fixture to determine what data stream they will read from the event profile table. For example, a lighting fixture will be configured to display a lighting sequence stream that is received from the live event in the event profile table. At step 2008, the method 2000 may include having a final configuration plot for each fixture within the scene replicating all data streams in real-time, resulting in a live or recorded simulation of the live event.

Figure 22:
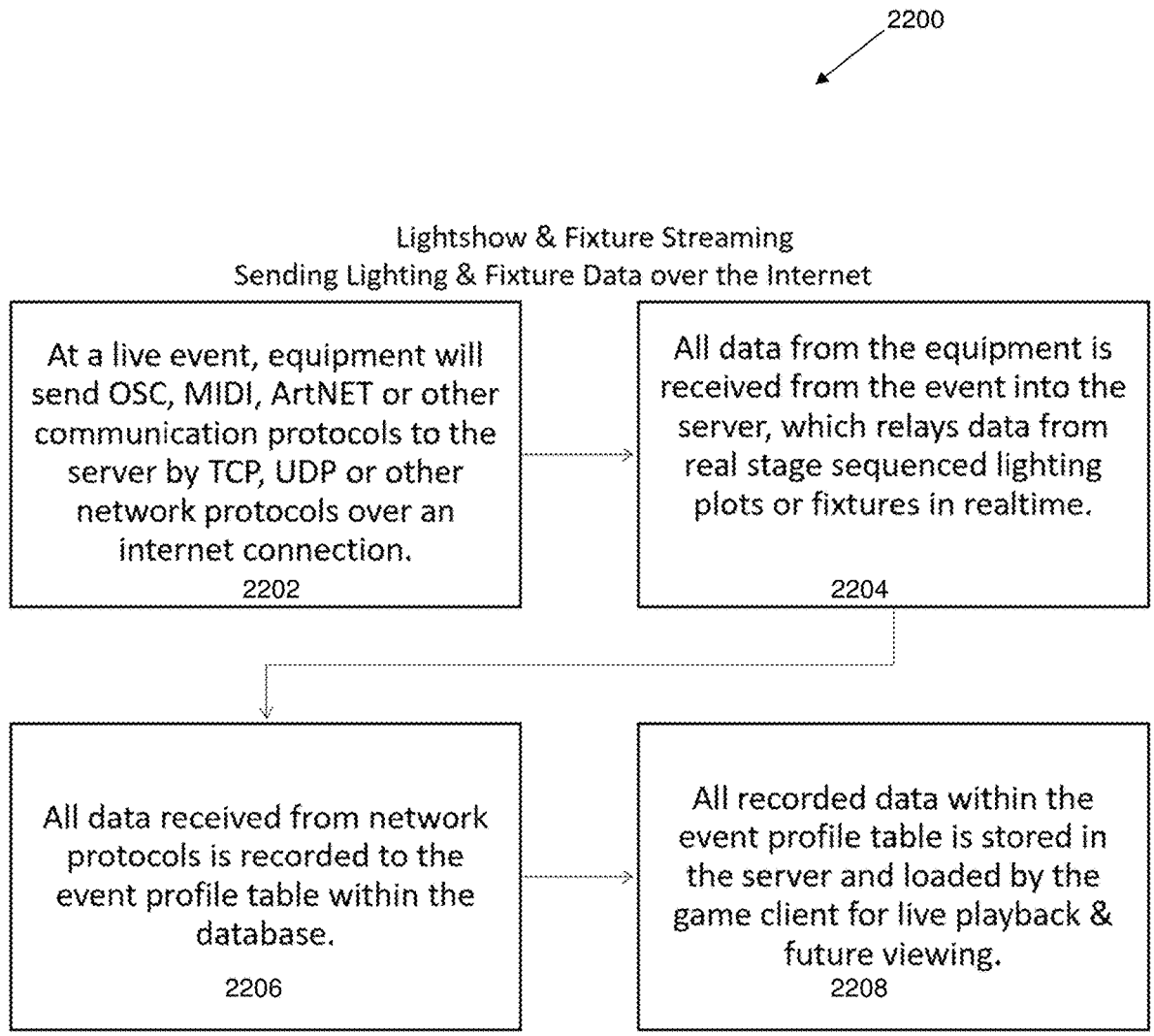
FIG. 22 is a flow diagram illustrating a sample method for sending communication protocols by using network protocols over an internet connection to the virtual reality system of FIG. 1, relaying data from real stage sequenced lighting plots or fixtures in real-time, recording received data to the identity stored for the event, and recalling the recorded data for live playback and future viewing.
Figure 23:
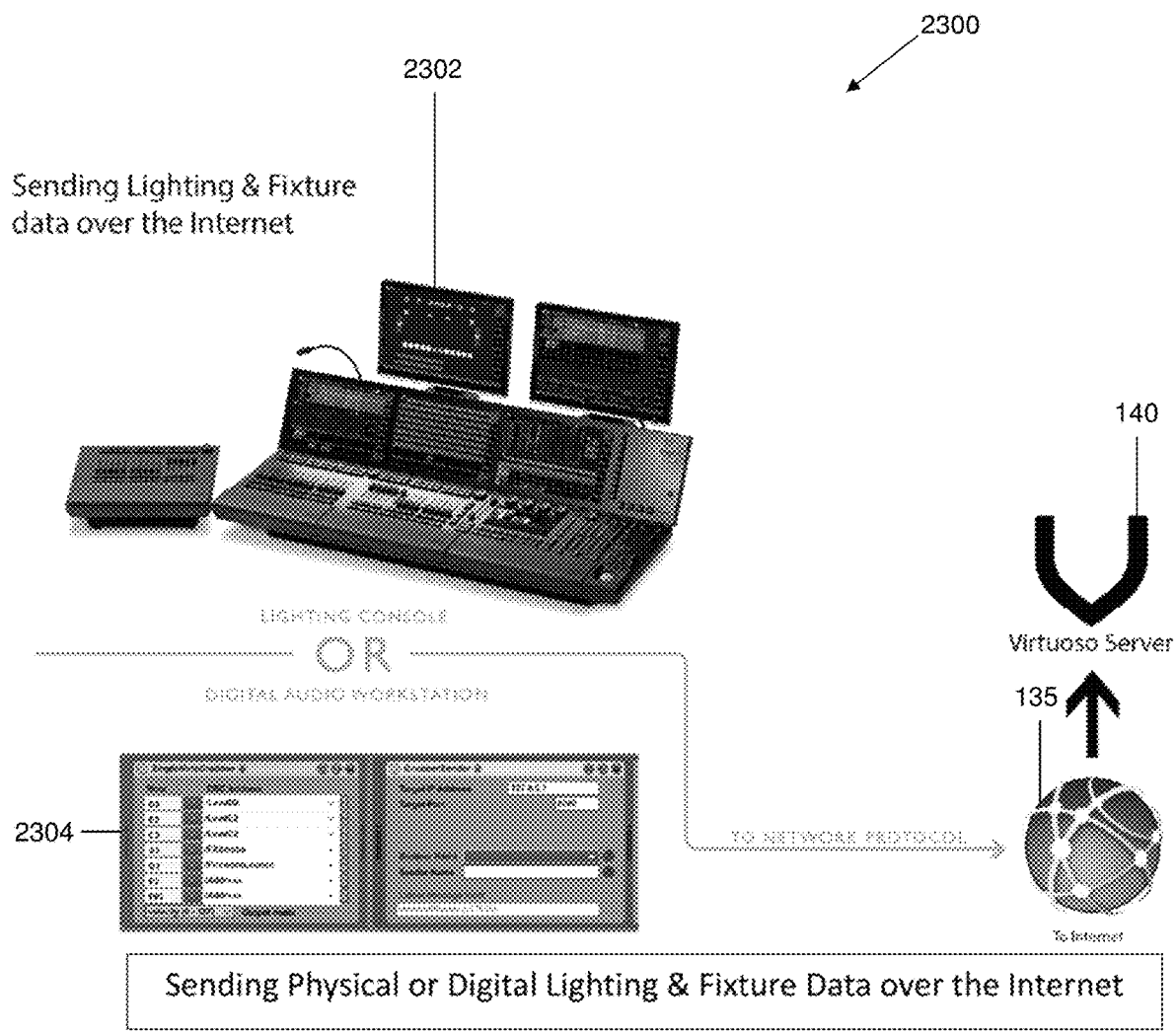
FIG. 23 is a schematic diagram illustrating the sending of lighting and fixture data over the internet using network protocols so that they may be associated with the identities for events and stored in the virtual reality system of FIG. 1 for future playback and use.

Referring to FIGS. 22-23, a method 2200 and accompanying illustration 2300 are schematically illustrated. At step 2202, at a live event, the method 2200 may include having equipment send OSC (as shown in screenshot 2304), MIDI, ArtNET or other communication protocols and/or data to the server 100 via TCP, UDP or other network protocols over an internet connection. The data may be from fixtures (e.g. lighting and fixture equipment 2302), lighting, main audio outputs, performance instruments, disc jockey equipment and/or any other equipment at an event. At step 2204, all data from the equipment may be received from the event into the server 100, which relays audio, video, performers, and stage lighting plots and sequences of fixtures in real-time. At step 2206, the method 2200 may include recording all data received from network protocols to the event profile table for the event within the database 155. At step 2208, the method may include storing all recorded data within the server and for game clients to recall, for live playback and future viewing.

Figure 24:
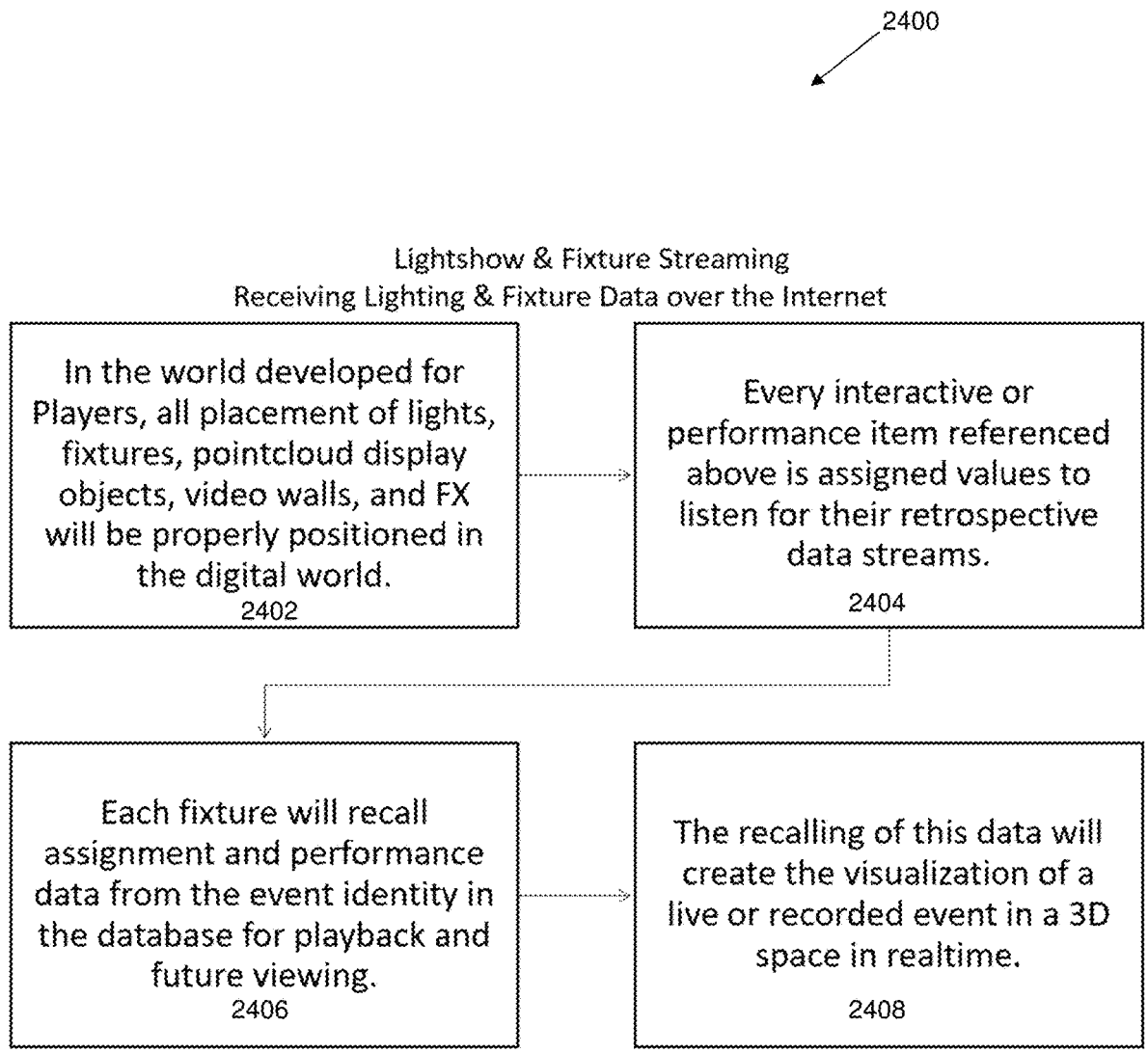
FIG. 24 is a flow diagram illustrating a sample method for positioning virtual lights, fixtures, point cloud display objects, video walls, and visual effects within the virtual/digital world, assigning values to such virtual objects to listen for their corresponding data streams, recalling assignment and performance data from the event identity in the database for playback, and creating a visualizing of a recorded event in a three-dimensional (3D) space in real-time.
Figure 25:
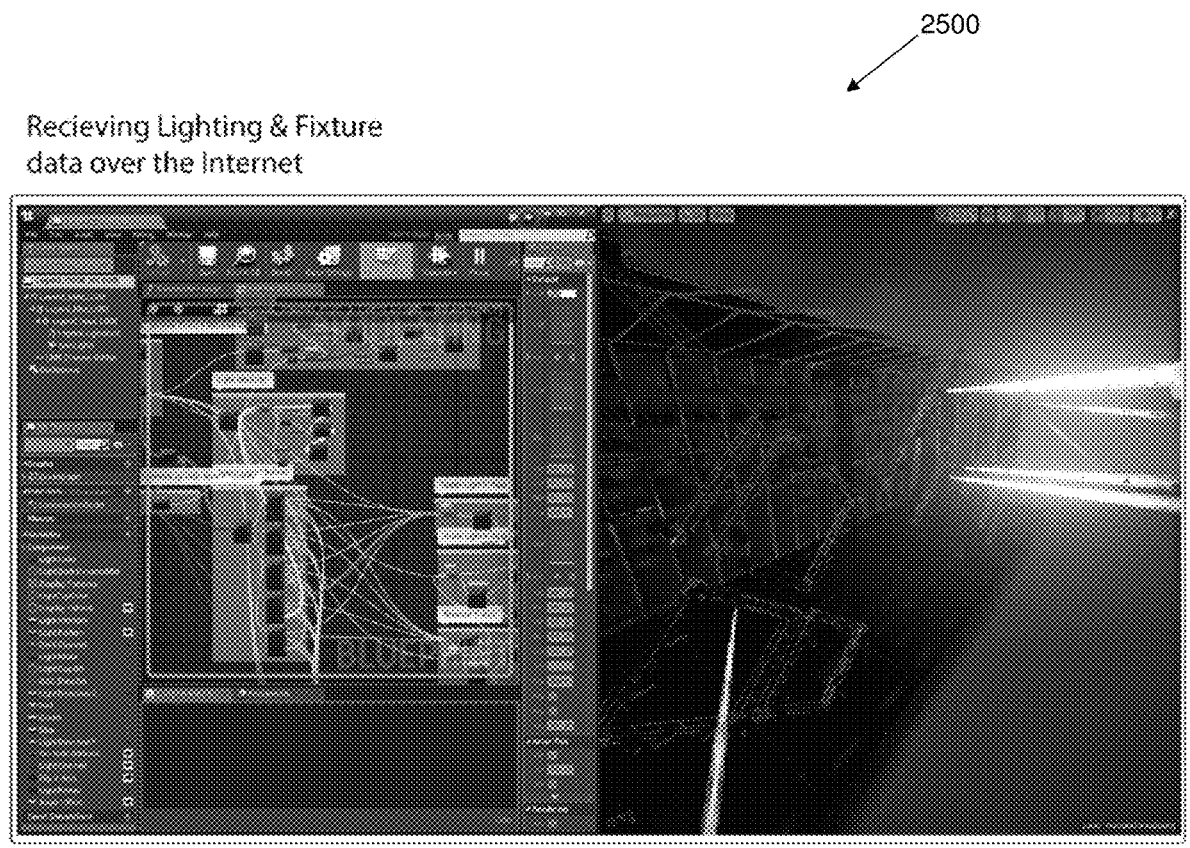
FIG. 25 is a schematic diagram illustrating receiving lighting and fixture data over the internet and virtual world representations corresponding to such data.

Referring to FIGS. 24-25, a method 2400 and accompanying illustration 2500 are schematically illustrated. At step 2402 the method 2400 may include positioning, in the worlds developed for users, all placement of lights, fixtures, pointcloud display objects, rendered video walls, and effects properly. At step 2404, the method 2400 may include assigning values for each interactive or performance item (e.g. lighting, fixture, etc.) referenced in step 2402 to listen for their corresponding respective data streams. At step 2406, the method 2400 may include having each fixture recall assignment and performance data from the event profile table in the database 155 for playback and future viewing. At step 2408, the method 2400 may include recalling the data to create the visualization of a live or recorded event in a 3D rendered space in real-time. For example in illustration 2500, a rendered lighting fixture displays light according to the actual lighting fixtures at a real live event.

Figure 26:
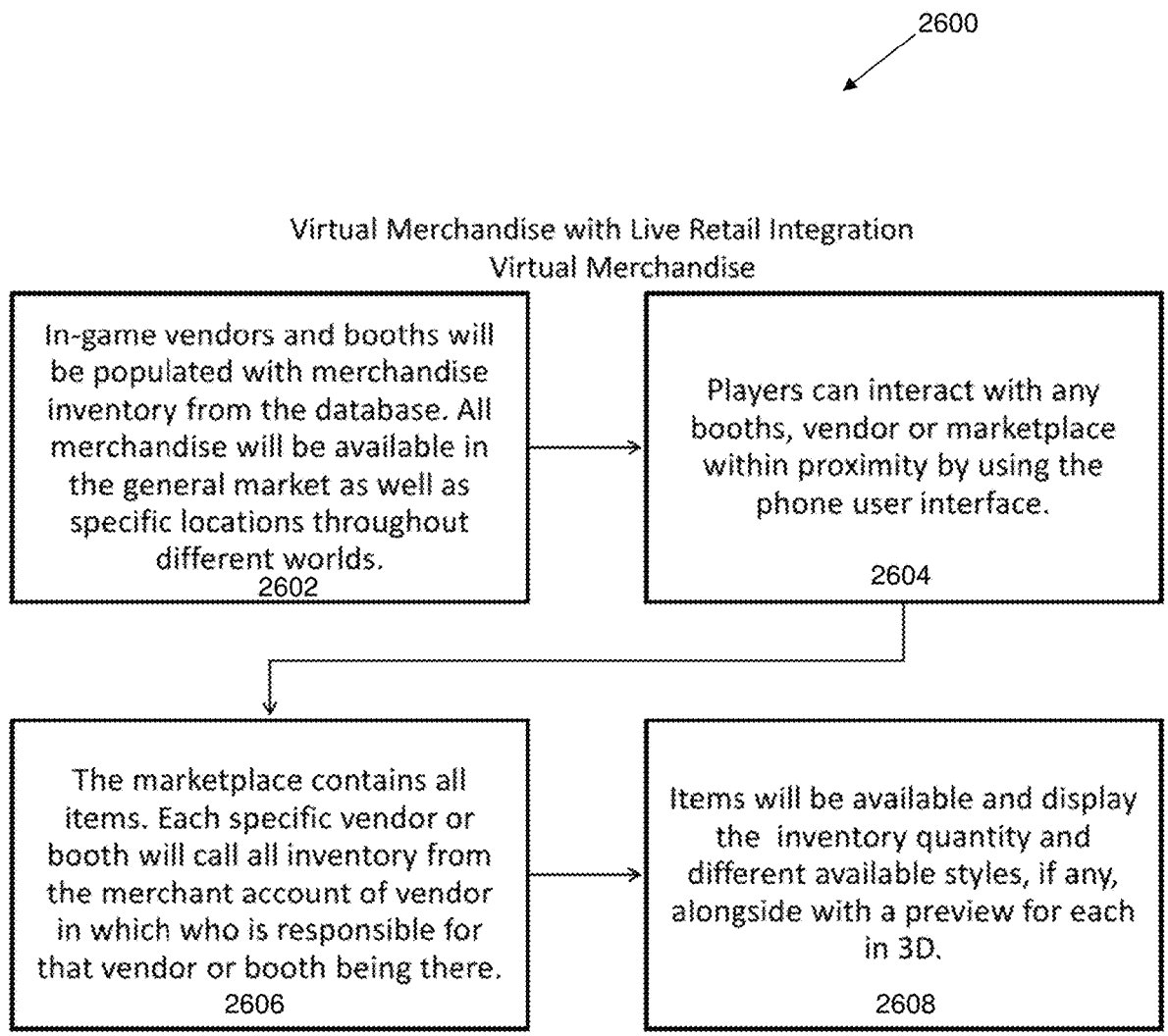
FIG. 26 is a flow diagram illustrating a sample method for populating in-game vendors and booths with merchandise inventory, enabling user interaction with the booths and vendors using a digital phone interface in the virtual world, calling inventory from a merchant account of a vendor, making merchandise available, and displaying the available merchandise with a preview in 3D.
Figure 27:
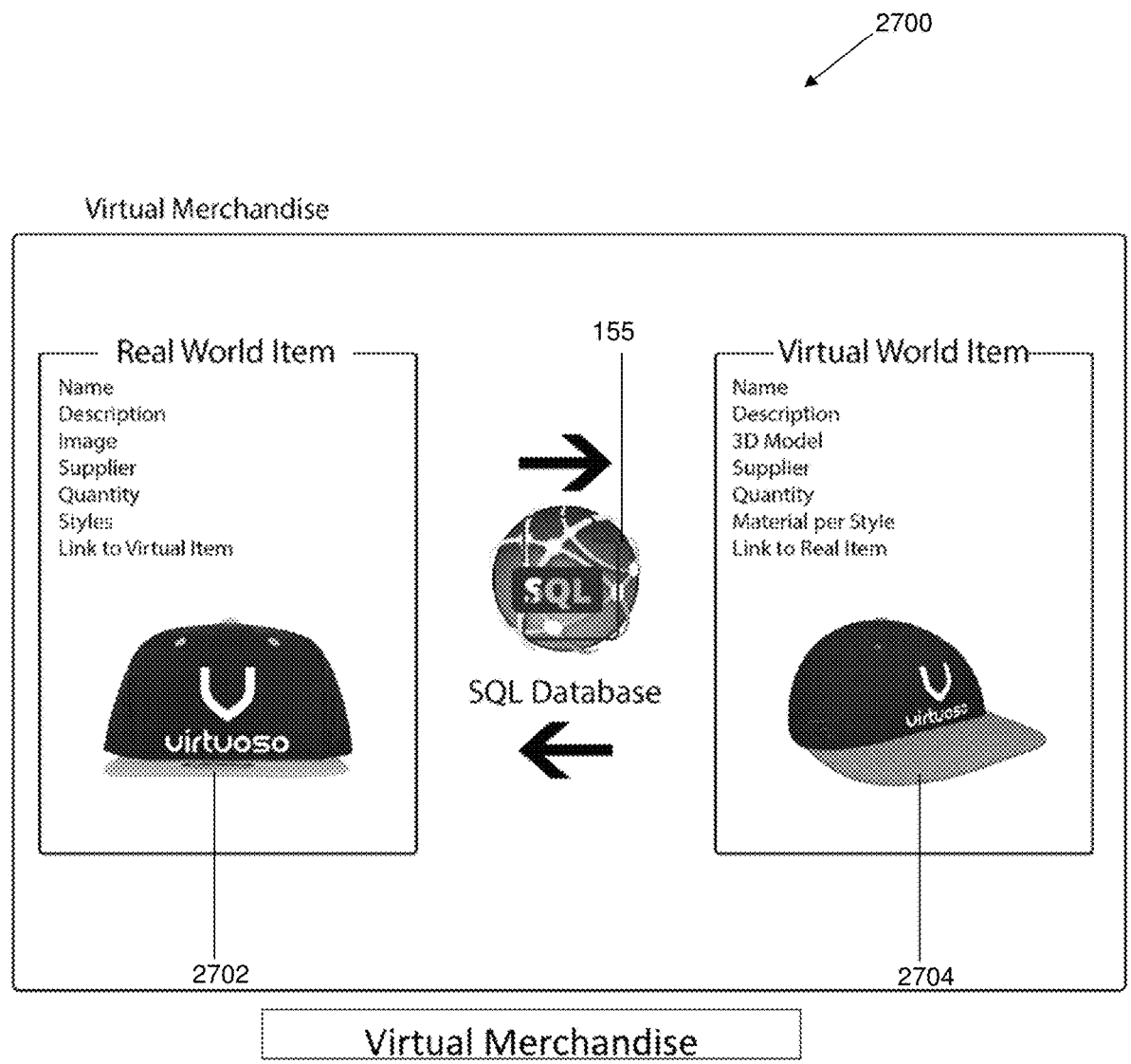
FIG. 27 is a schematic diagram illustrating a real world merchandise item for sale and its corresponding virtual representation that is displayed in the virtual world generated by the system of FIG. 1.

Referring to FIGS. 26-27, a method 2700 and accompanying illustration 2700 are schematically illustrated. At step 2602, the method 2600 may including having in-game vendors and booths be populated with virtual merchandise inventor from the database 155. In certain embodiments, all merchandise may be made available in a virtual general market as well as in specific locations through different virtual worlds. At step 2604, the method 2600 may include having users interact with any virtual booths, vendors, and/or marketplaces within proximity of their avatar by using an in-game phone interface rendered on the users' client applications. At step 2606, the method 2600 may include having each specific vendor or booth call all inventory from the merchant account of the vendor, who is responsible for the booth and/or merchandise being in the virtual world. At step 2608, the method 2600 may include displaying and making available merchandise inventory and quantities and different available versions/styles for the merchandise, if any, alongside with a preview for each in 3D rendering. In FIG. 27, a real world hat 2702 and a rendered virtual version of the hat 2704 that may be displayed in a booth in a virtual world is shown.

Figure 28:
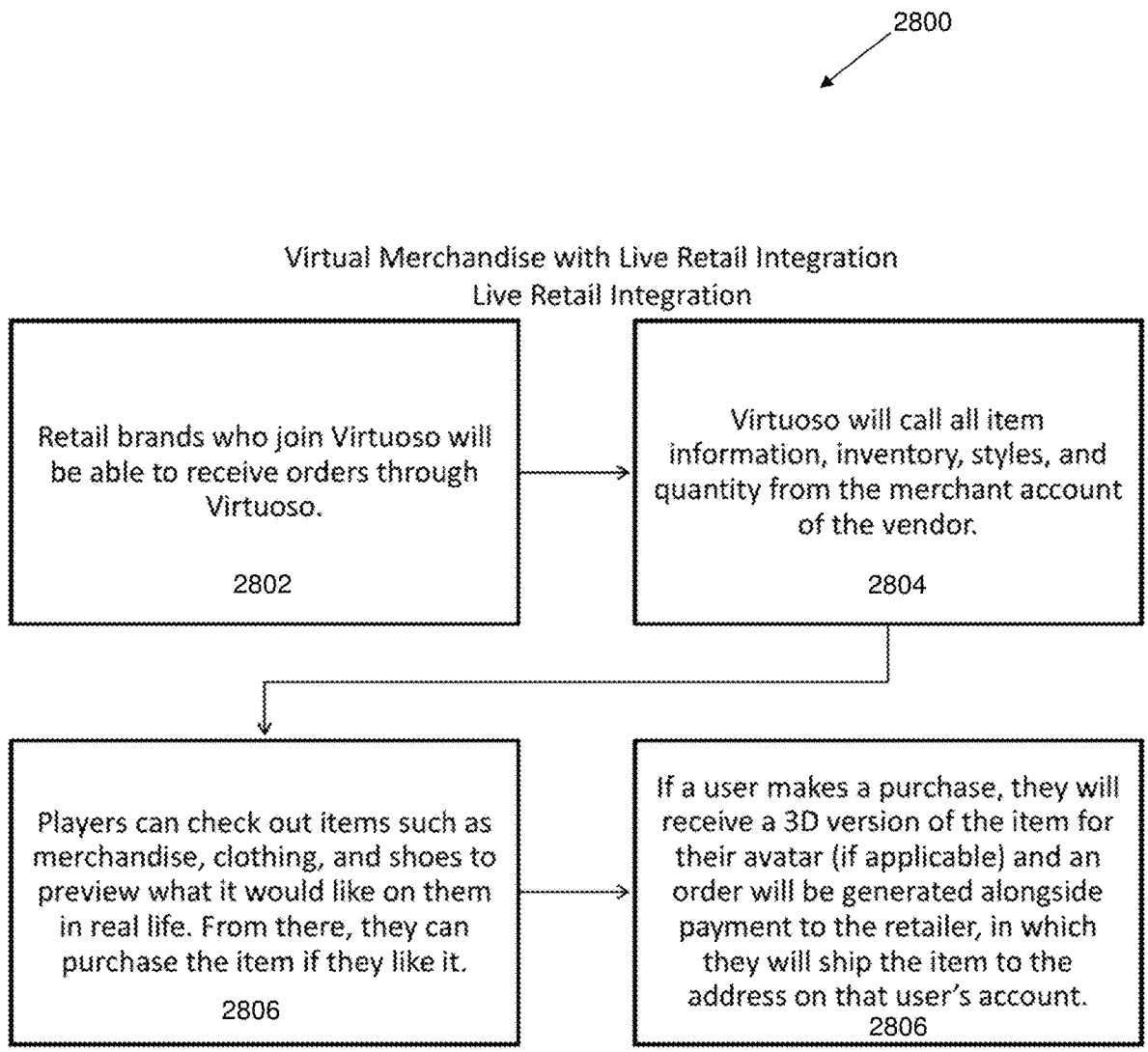
FIG. 28 is a flow diagram illustrating a sample method for receiving orders for merchandise through the virtual reality system of FIG. 1, calling merchandise information from a merchant account, enabling users to check out items in the virtual world, providing a 3D version of purchased merchandise to a user in the virtual world and causing the real-world item to be shipped to the user's physical address.
Figure 29:
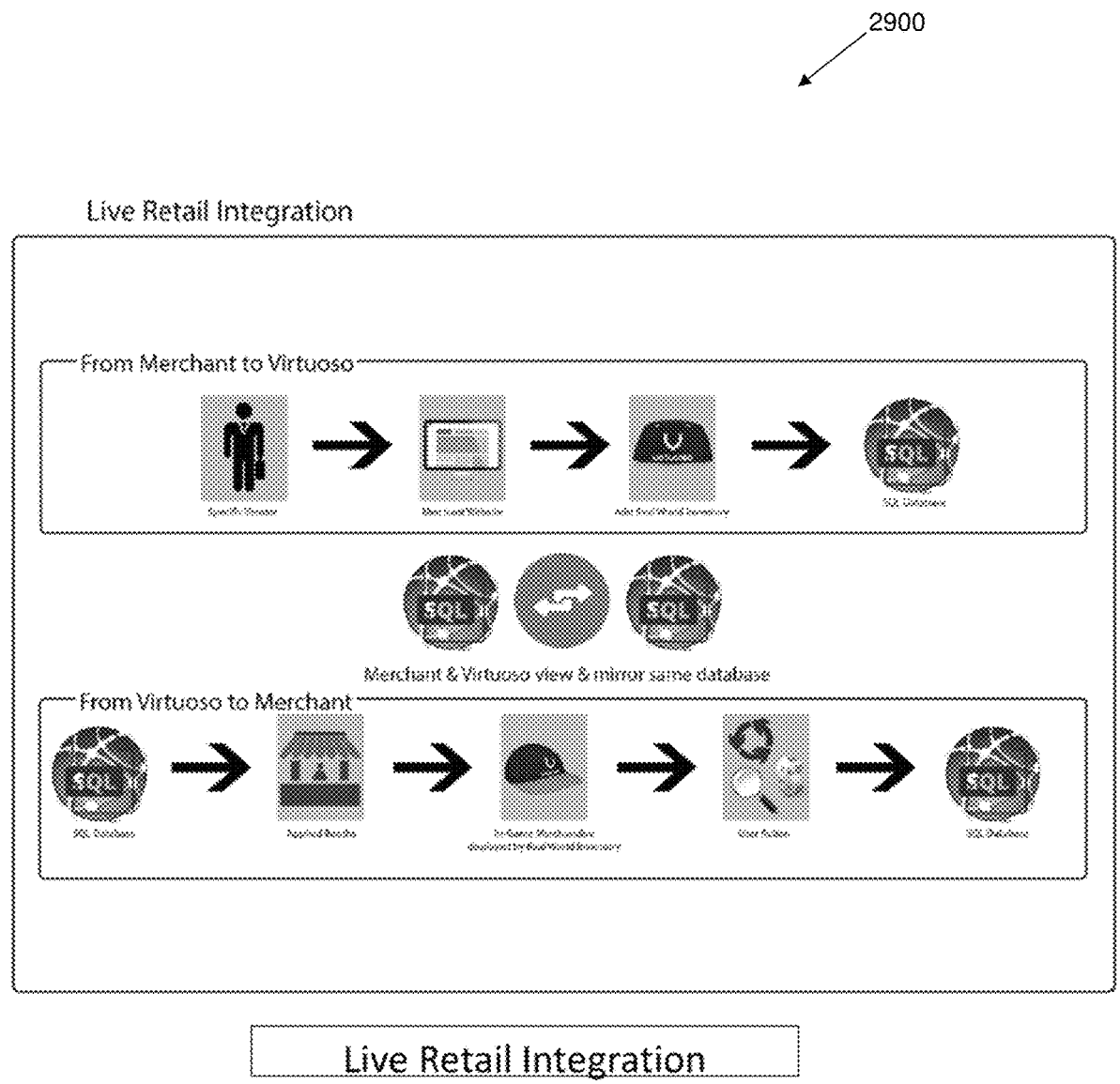
FIG. 29 is a schematic diagram illustrating a merchant's integration and interaction with the virtual reality system of FIG. 1.
Figure 30:
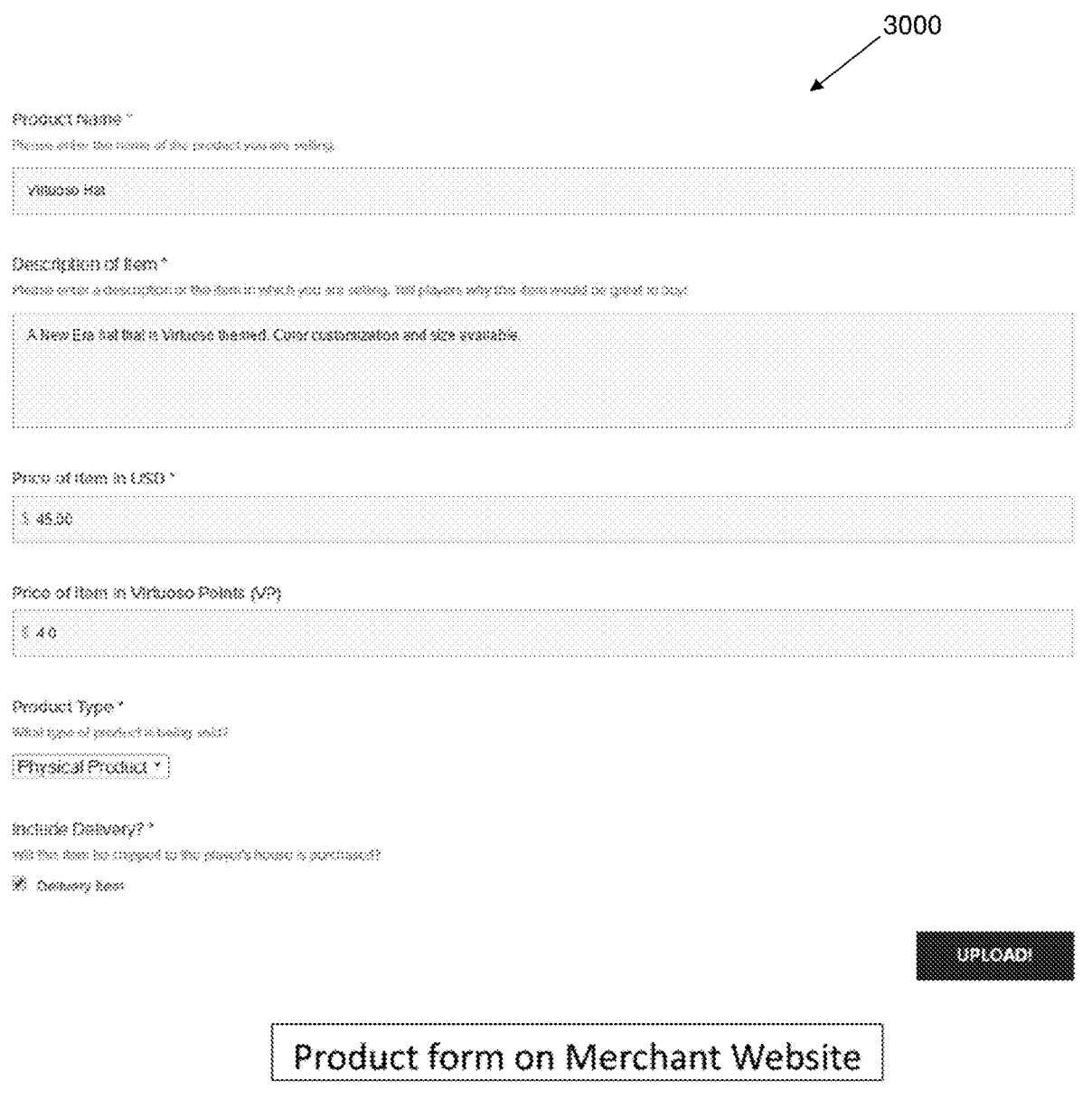
Figure 31:
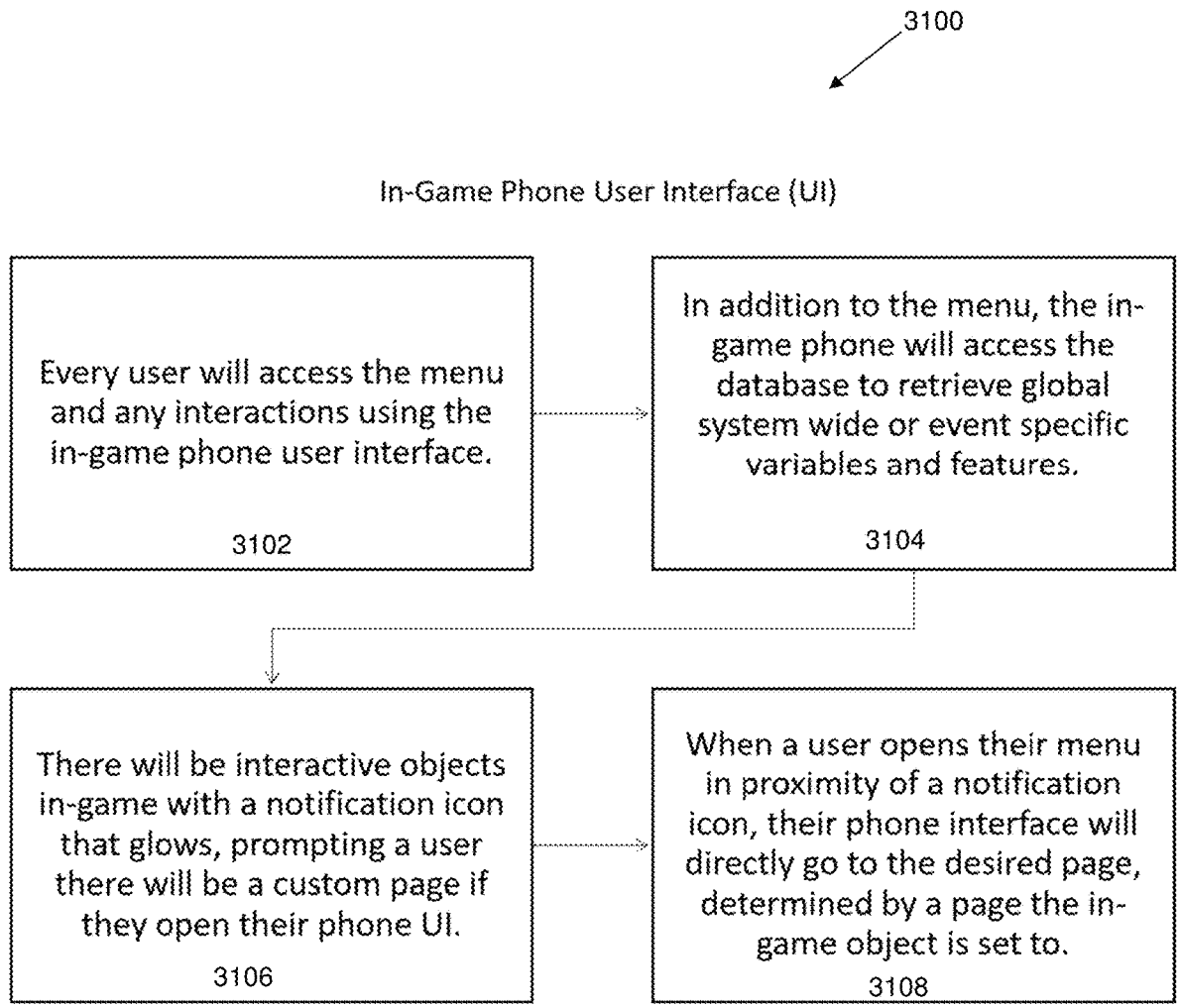
FIG. 31 is a flow diagram illustrating a sample method for enabling user interactions in the virtual world generated by the virtual reality system of FIG. 1 through the use of an in-game virtual phone user interface, enabling database access to retrieve global game or event specific variables and features, using notifications on the in-game virtual phone user interface to notify users of interactive objects in the virtual world, and automatically causing the in-game virtual phone user interface to display content associated with the interactive objects.

Referring to FIGS. 28-30, a method 2800 and accompanying illustration 2900 are schematically illustrated. At step 2802, the method 2800 may include having retail brands who join the system 100 receive orders through the system 100. At step 2804, the method 2800 may include having the system 100 call all item information, inventory, styles, and/or quantities from the merchant account of the vendor. At step 2806, the method 2800 may include enabling users to check out items, such as, merchandise, clothing, and shoes to preview what it would look like on the user in real life. In certain embodiments, such virtual clothing/merchandise may be worn by the avatar of the user. From there, the user can purchase the virtual merchandise and/or actual merchandise corresponding to the virtual merchandise. At step 2806, the method 2800 may include, if a user makes a purchase, receiving a 3D version of the item for their avatar and generating an order alongside payment to the retailer associated with the physical item, who will ship the actual physical item to the address on the user's account with the system 100. FIG. 30 illustrates a sample form 3000 that allows a user to order an item in the virtual world and/or on a merchant's website accessible from the virtual world.

Figure 34:
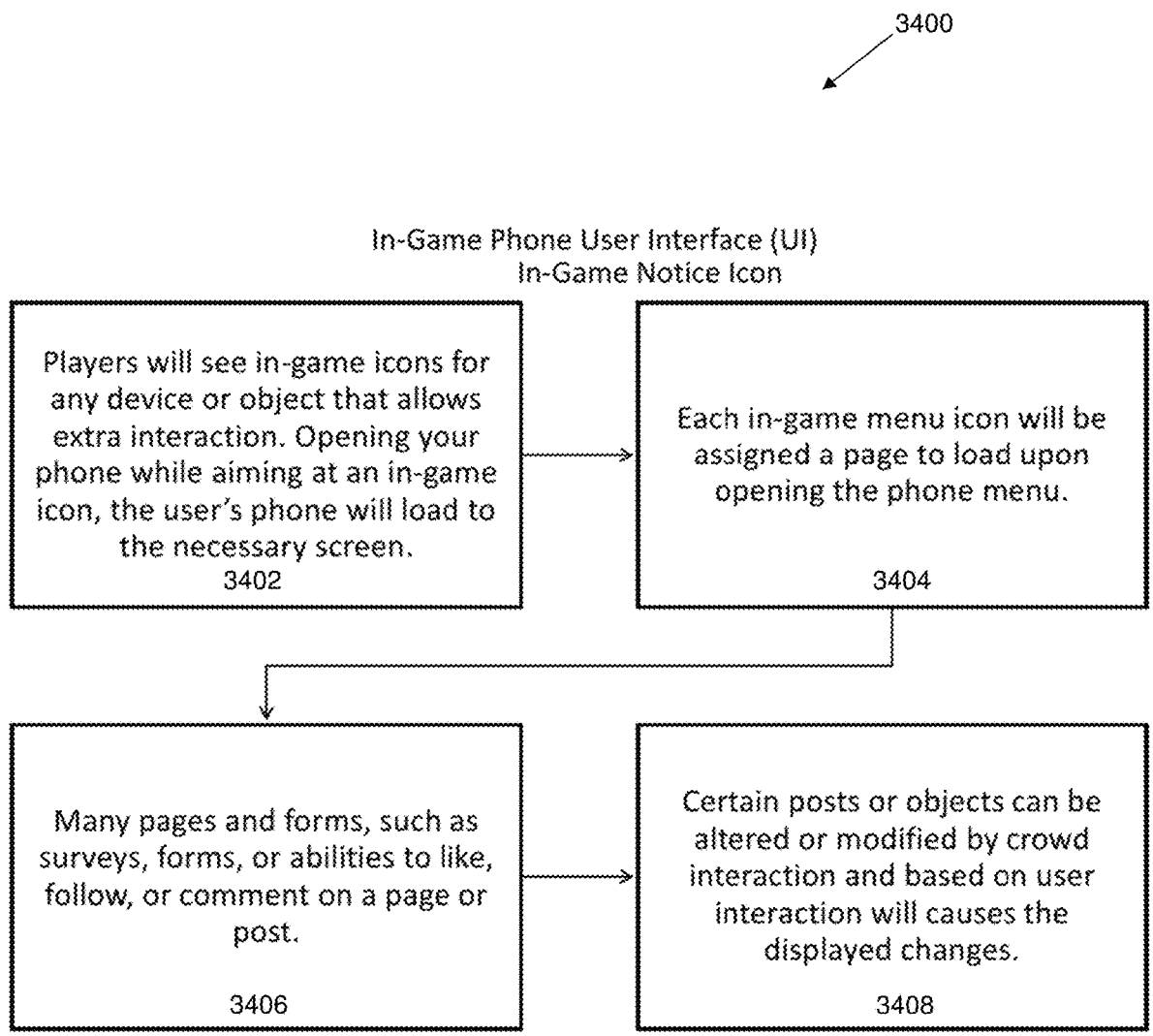
FIG. 34 is a flow diagram illustrating a sample method enabling additional interaction in the virtual word, using in-game menus to load digital pages upon the opening of a virtual phone menu, providing forms and surveys for obtaining input from users of the virtual reality system of FIG. 1, and providing the ability to alter posts or commentary through crowd interaction and based on user interaction.
Figure 35:
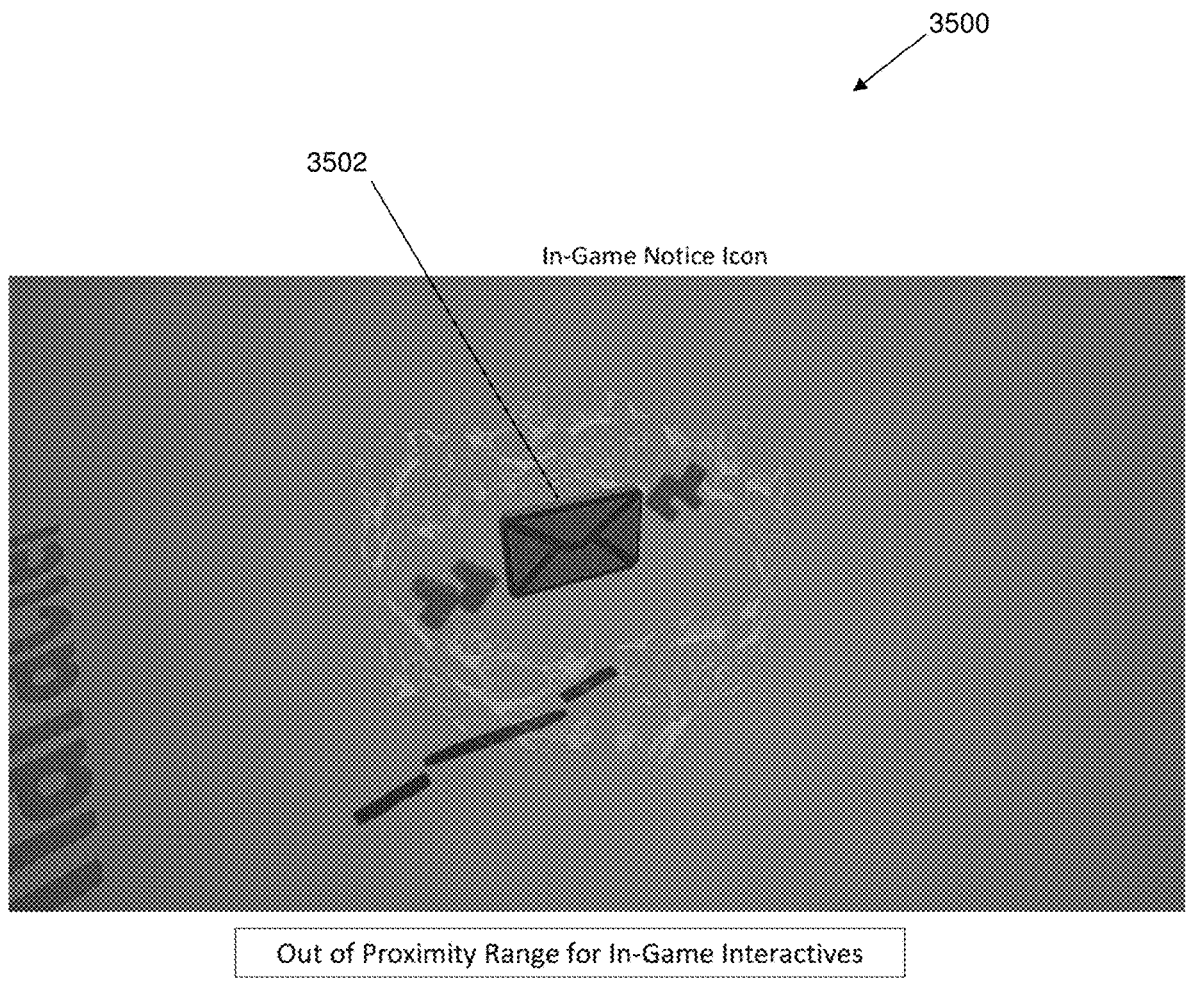
FIG. 35 is a schematic diagram illustrating a sample in-game notice icon that is displayed when a user in the virtual world is out of proximity range to participate in in-game interactive functionality.
Figure 36:
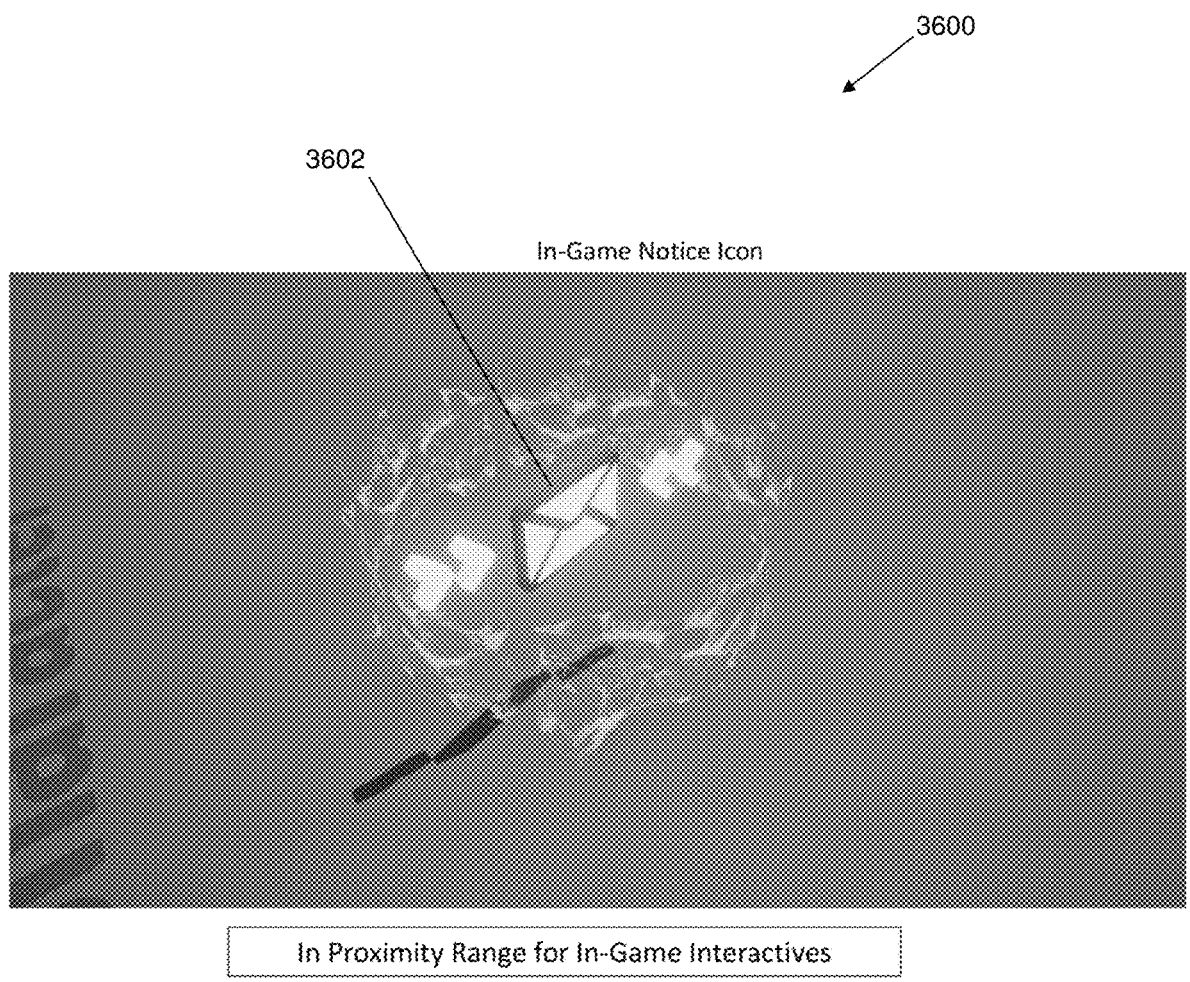
FIG. 36 is a schematic diagram illustrating a sample in-game notice icon that is displayed when a user in the virtual world is within proximity range to participate in in-game interactive functionality.

Referring to FIGS. 31-36, a method 3100 and accompanying illustrations 3200, 3300, 3500, 3600 are schematically illustrated. At step 3102, the method 3100 may include having a user access a menu and conduct any interactions using an in-game phone interface 3202, 3302, which may be rendered to the user in the virtual world. At step 3104, the method 3100 may include utilizing the in-game phone interface 3202, 3302, in addition to the menu, to access the database 155 to retrieve global system wide or event specific variables and/or features. At step 3106, the method 3100 may include having interactive objects in the virtual world that have a notification icon that glows, which may prompt a user that there will be custom digital page rendered if they open their in-game phone interface 3202, 3302 in proximity to the interactive object. At step 3108, the method 3100 may include having the user open their menu in proximity of a notification icon using the in-game phone interface 3202, 3302, so that their in-game phone interface 3202, 3302 will go directly to the page that the notification icon/interactive object is associated with and/or set to. When in proximity, the notification icon 3602 may light up or highlight and when out of proximity the notification icon 3502 may be in an unlighted state, as shown in FIGS. 35-36.

Referring to FIGS. 34-36, a method 3400 and accompanying illustrations 3500, 3600 are schematically illustrated. At step 3402, the method 3400 may include enabling users to view in-game icons 3502, 3602 that allow for extra interaction. For example, opening an in-game phone interface 3202, 3302 at the in-game icon 3502, 3602, may cause the in-game phone interface 3202, 3302 to load a page associated with the in-game icon 3502, 3602. At step 3404, the method 3400 may include having a page to load upon opening the in-game phone interface 3202, 3302 assigned to in-game menu icons. At step 3406, the method 3400 may include having pages and forms, such as surveys, forms, or abilities to like, follow, or comment on a page or post in the system 100. At step 3408, the method 3400 may include altering or modifying certain posts or objects by crowd interaction and based on user interaction in the virtual world, which will cause displayed changes to the posts or objects.

Figure 37:
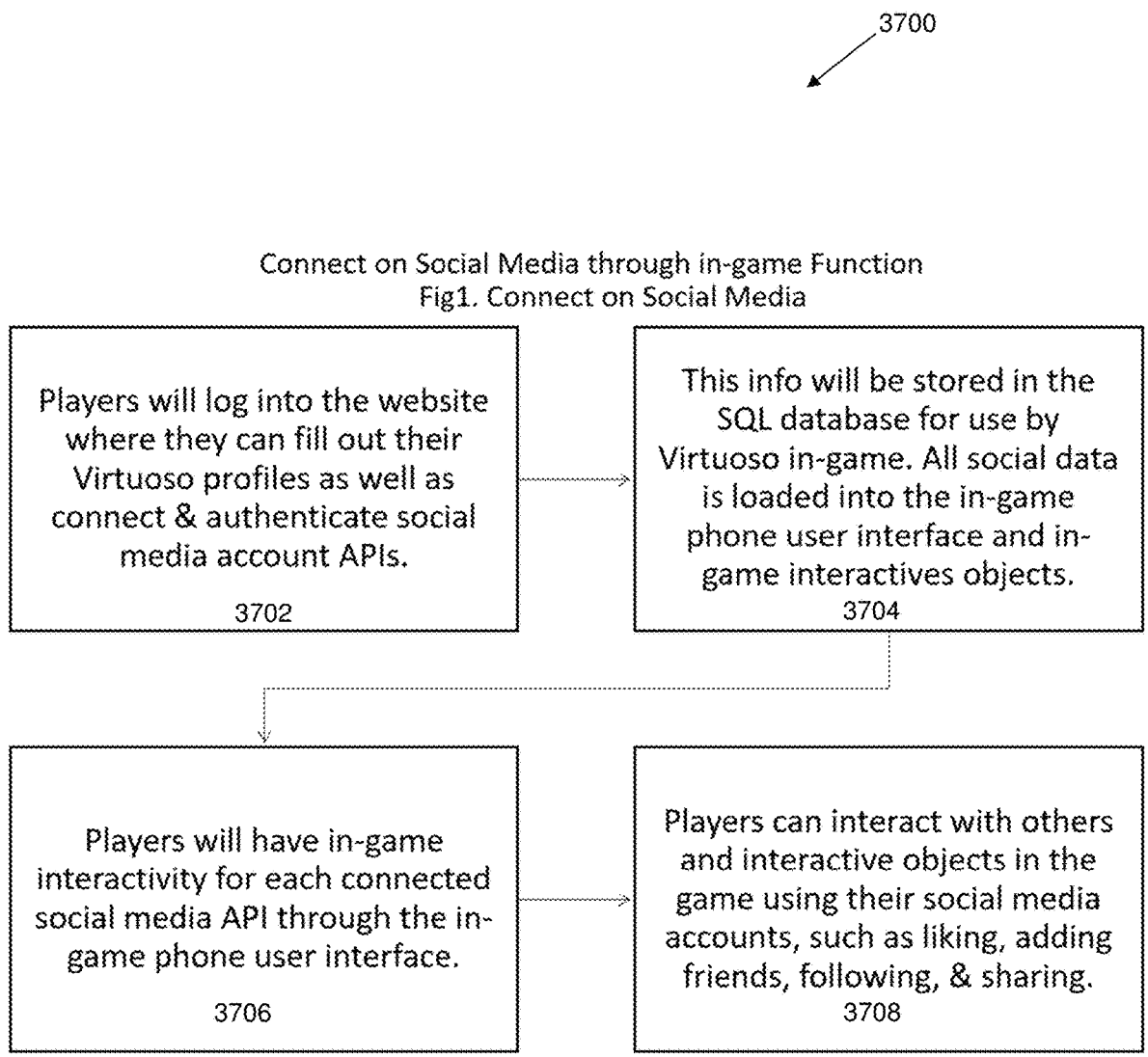
FIG. 37 is a flow diagram illustrating a sample method for enabling users in the virtual world to connect with one another through various social media applications.
Figure 38:
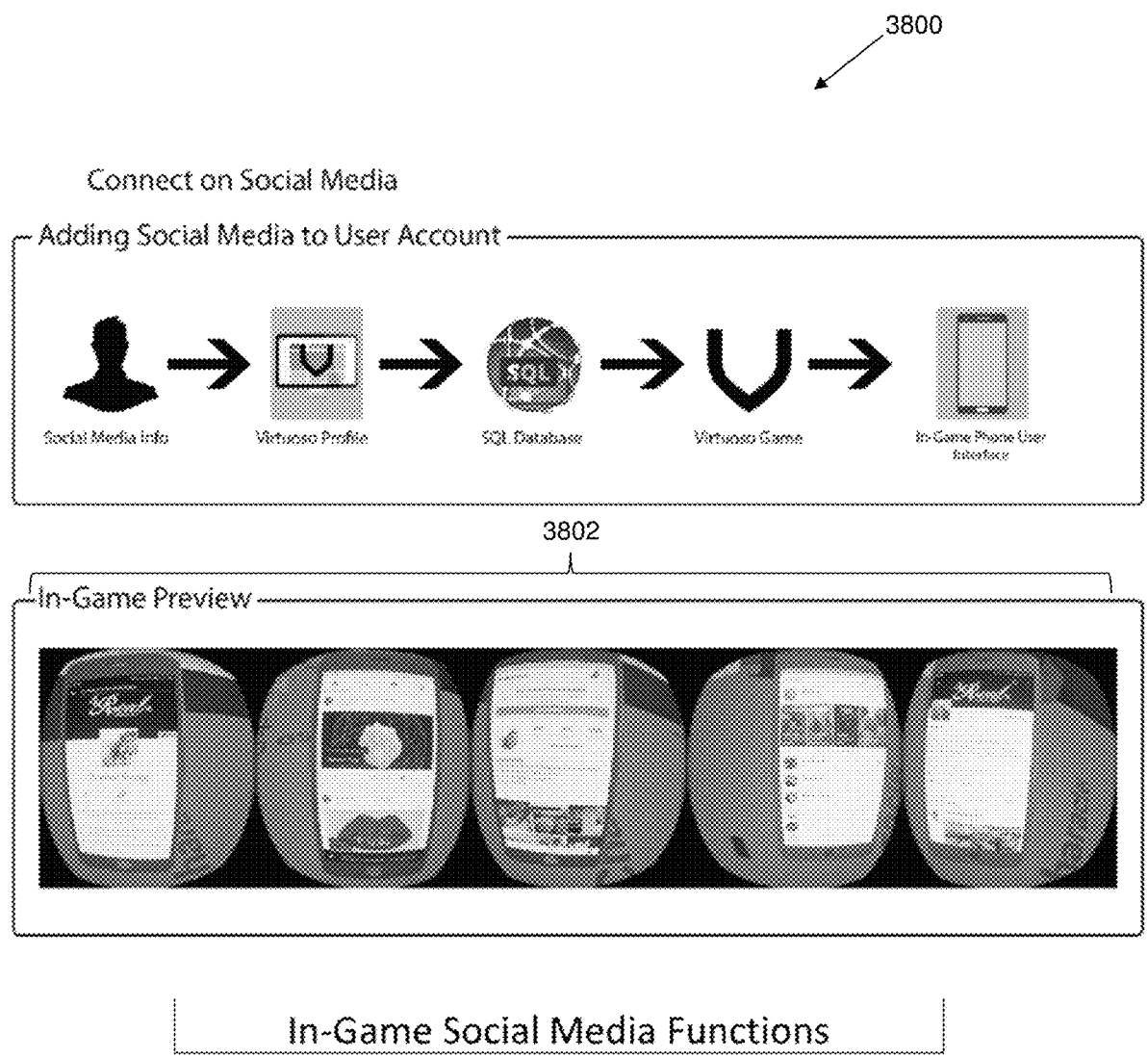
FIG. 38 is a schematic diagram illustrating a sample in-game preview of how users may connect with each other through various social media applications while interacting with each other in the virtual world.

Referring to FIGS. 37-38, a method 3700 and accompanying illustration 3800 are schematically illustrated. At step 3702, the method 3700 may include having users log into the client application and/or website associated with the system 100 so that the users can fill out their profiles as well as connect and authenticate social media account application programming interfaces. At step 3704, the method 3700 may include storing account information in a database 155 (e.g. SQL database) for use by the system 100 and/or client application. All social data may be loaded into the in-game phone interface 3202, 3302 or in other areas of the virtual world, such as in interactive objects. At step 3706, the method 3700 may include enabling users to having interactivity for each connected social media application programming interface using the in-game phone interface 3202, 3302. A virtual world preview 3802 is shown that shows how social media accounts may be displayed in the in-game phone interface 3202, 3302. At step 3708, the method 3700 may include enabling users to interact with other users and interactive objects in the virtual world using their social media accounts, such as by liking, adding friends, following others, and/or sharing content.

Figure 39:
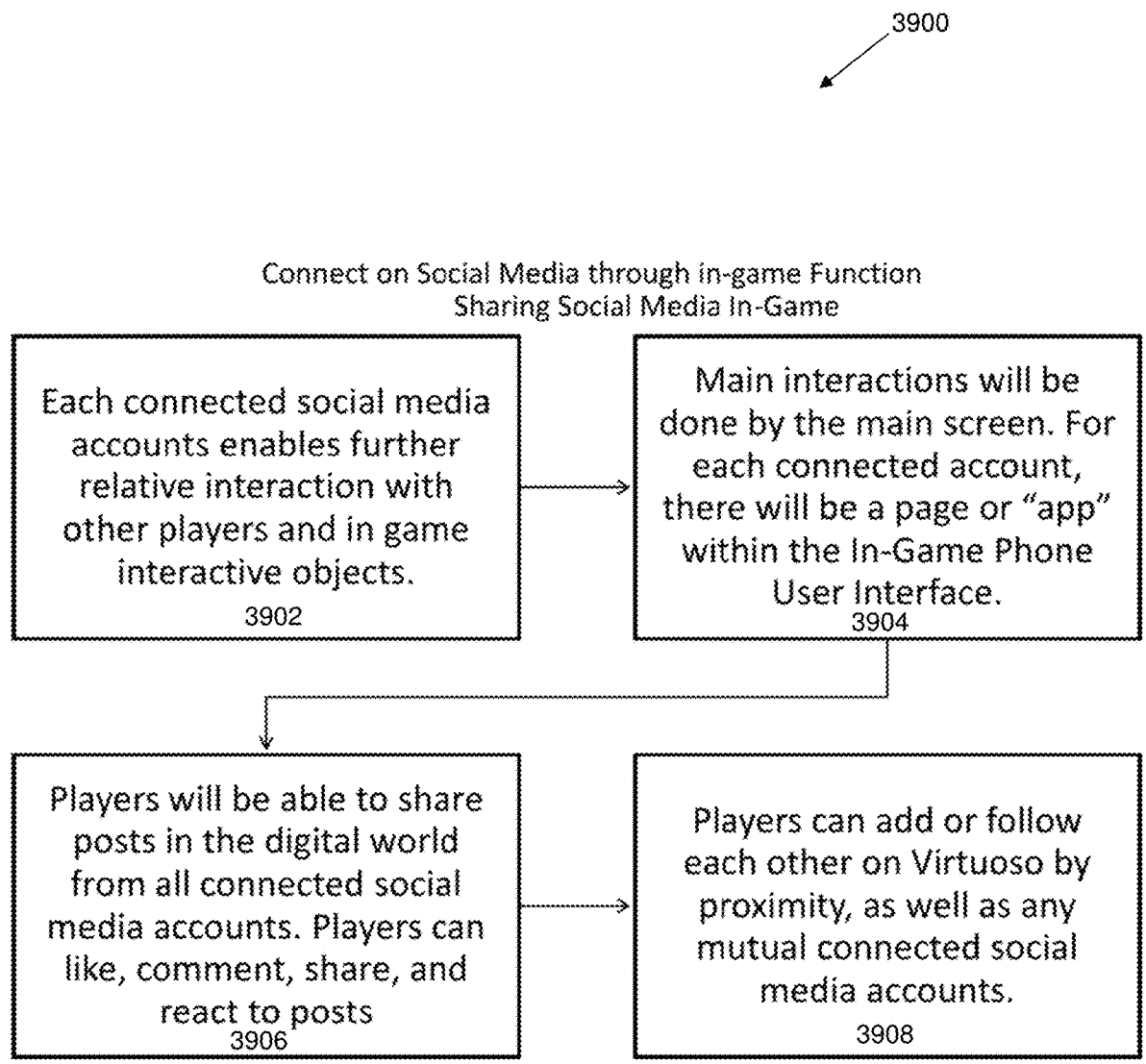
FIG. 39 is a flow diagram illustrating a sample method for sharing social media content between users in the virtual world.
Figure 40:
FIG. 40 is a schematic diagram illustrating various in-game social media functions that users may utilize while in the virtual world generated by the virtual reality system of FIG. 1.

Referring to FIGS. 39-40, a method 3900 and accompanying illustration 4000 are schematically illustrated. At step 3902, the method 3900 enabling each connected social media account to allow for further relative interaction with other players in the virtual world and with interactive objects. At step 3904, the method 3900 may include performing interactions using the main screen 4002. For each connected social media account, there may be a page or application within the in-game phone interface 3202, 3303. At step 3906, the method 3900 may include enabling users to share posts and content in the virtual world from all connected social media accounts. Users can like, comment, share, and react to posts. At step 3908, the method 3900 may include enabling users to add or follow each other in the system 100 based on their proximity in the virtual world to other users (e.g. avatars are in range of each other), as well as any mutually-connected social media accounts.

Figure 41:
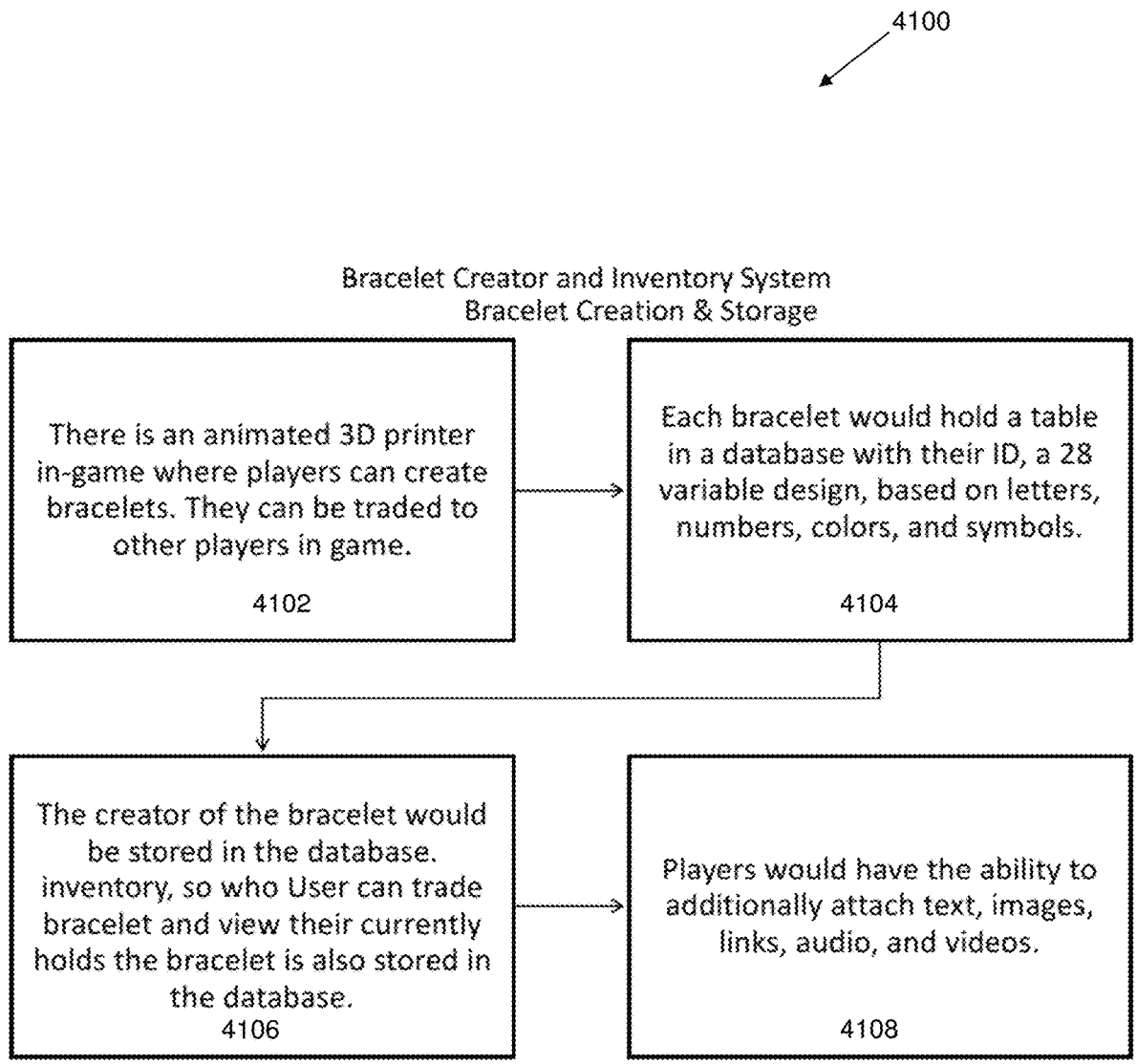
FIG. 41 is a flow diagram illustrating a sample method for creating digital bracelets while in the virtual world generated by the virtual reality system of FIG. 1.

Referring to FIGS. 41-42, a method 4100 and accompanying illustration 4200 are schematically illustrated. At step 4102, the method 4100 may include enabling users to create virtual bracelets 4206 using an animated 3D printer/bracelet station 4202. Created virtual bracelets 4206 may be traded to other users in the virtual world. At step 4104, the method 4100 may include, for each created bracelet, holding a table in a database 155 with a corresponding identifier, and a 28 variable design based on letters, numbers, colors, and symbols (e.g. database entry 4204). At step 4106, the method 4100 may include storing the identity of the creator of the bracelet 4206 in the database 155 inventory so that users can trade the bracelets 4206 and view who currently holds the bracelet 4206. All of this information may be stored in the database 155. At step 4108, the method 4100 may include enabling players to have the ability to attach text, images, links, audio, and video to the bracelets 4206.

Figure 43:
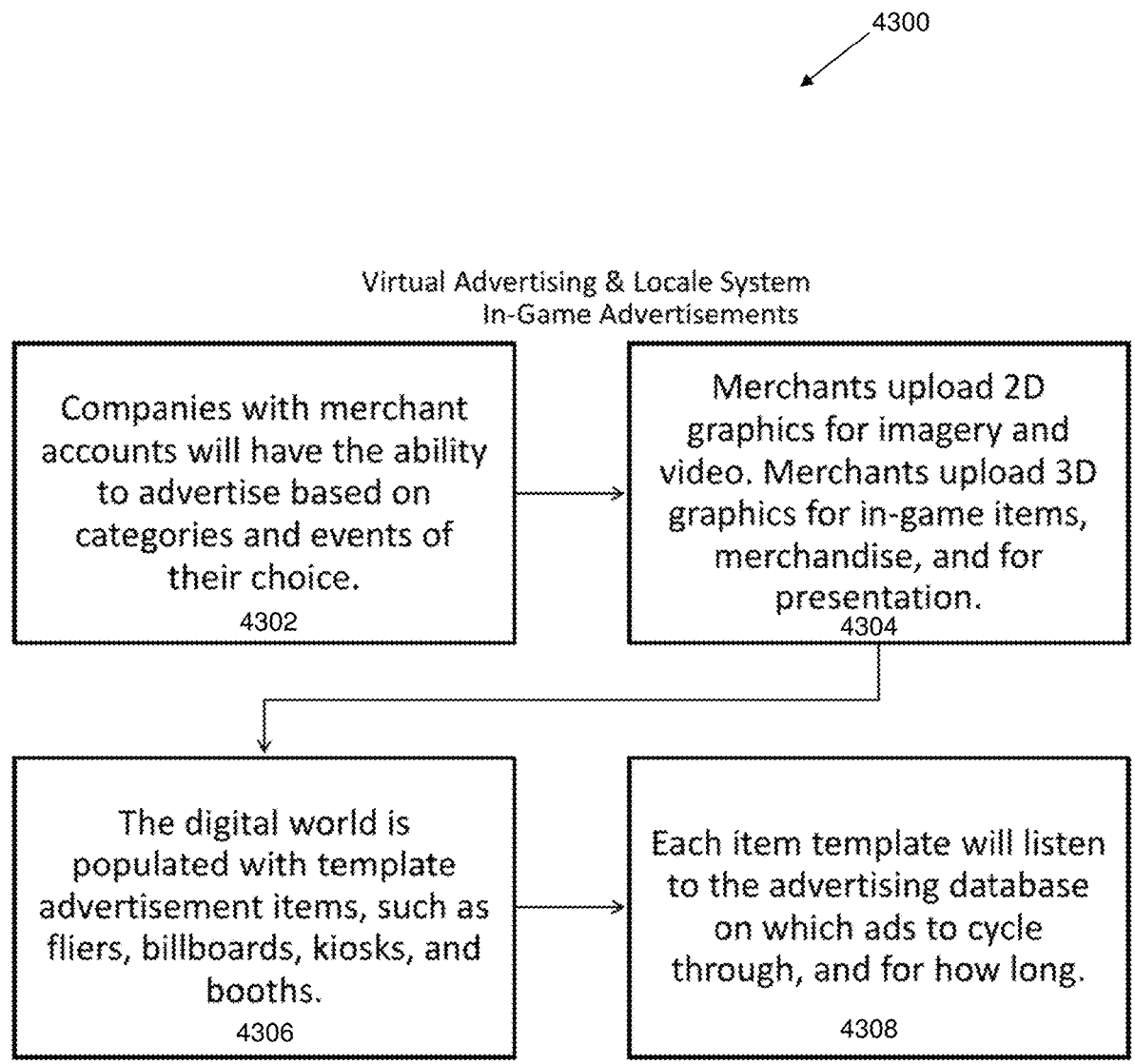
FIG. 43 is a flow diagram illustrating a sample method for providing in-game advertisements in the virtual world generated by the virtual reality system of FIG. 1.
Figure 44:
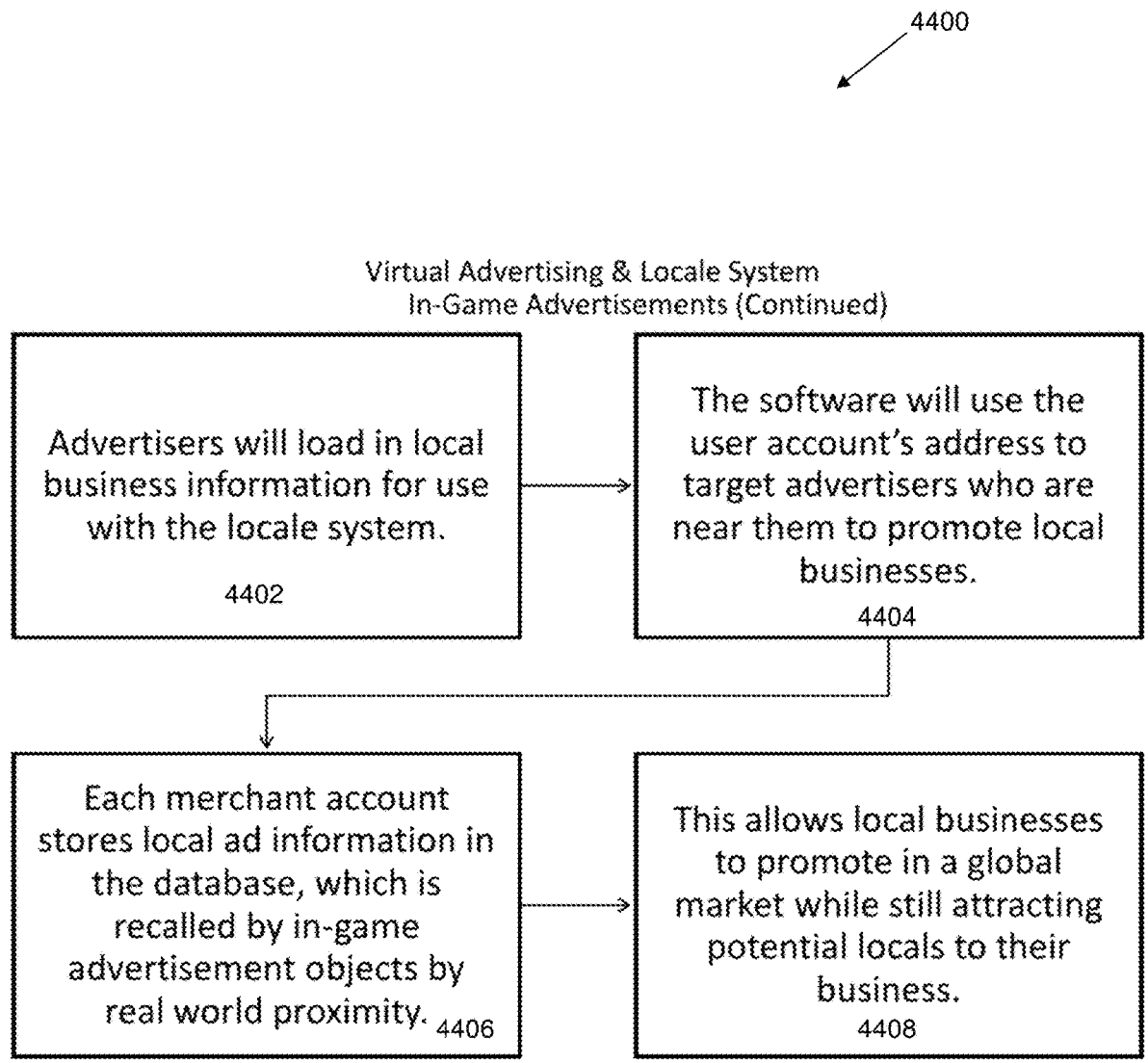
FIG. 44 is a flow diagram illustrating a continuation of the sample method of FIG. 43 for providing in-game advertisements in the virtual world generated by the virtual reality system of FIG. 1.
Figure 45:
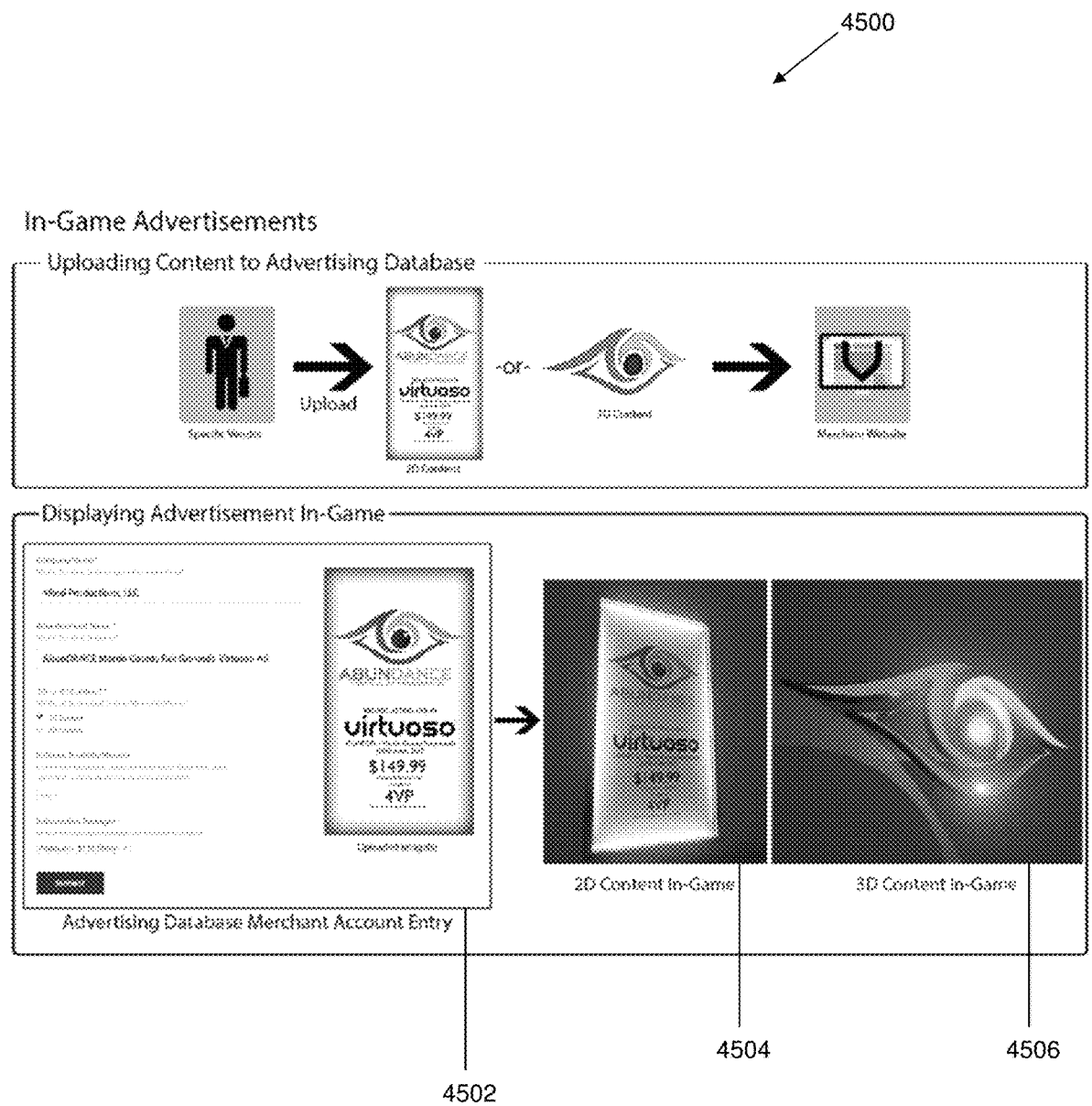
FIG. 45 is a schematic diagram illustrating sample digital advertisements that may be rendered and displayed in the virtual world generated by the virtual reality system of FIG. 1.

Referring to FIGS. 43-45, methods 4300, 4400 and accompanying illustration 4500 are schematically illustrated. At step 4302, the method 4300 may include providing companies with merchant accounts with the ability to advertise in the virtual world based on categories and events of their choice. At step 4304, the method 4300 may include enabling merchants to upload 2D graphics for imagery and video. In certain embodiments, merchants can upload 3D graphics for virtual world items, merchandise, and for presentation purposes in the virtual world. At step 4306, the method 4300 may include populating the virtual world with template advertisement items, such as virtual fliers, billboards, kiosks, and/or virtual booths. At step 4308, the method 4300 may include having each template listen to the advertising database (database 155) to determine which advertisements to cycle through, and for how long. At step 4402, the method 4400 may include having advertisers load in local business information for use with the virtual world. At step 4404, the method 4400 may include enabling the system 100 to use the user account address for the user to target advertisers who are near the users in the physical world to promote their businesses. At step 4406, the method 4400 may include storing for each merchant account, advertisement information in the database 155, which may be called by virtual world advertisement objects based on real-world proximity. At step 4408, the method 4400 may include allowing local businesses to promote in a global market, while attracting potential locals to their business. FIG. 45, shows a sample advertisement 4502 uploaded into the system 100, a 2D version of the advertisement 4504 rendered in the virtual world, and a 3D version of the advertisement 4506 rendered in the virtual world.

Figure 46:
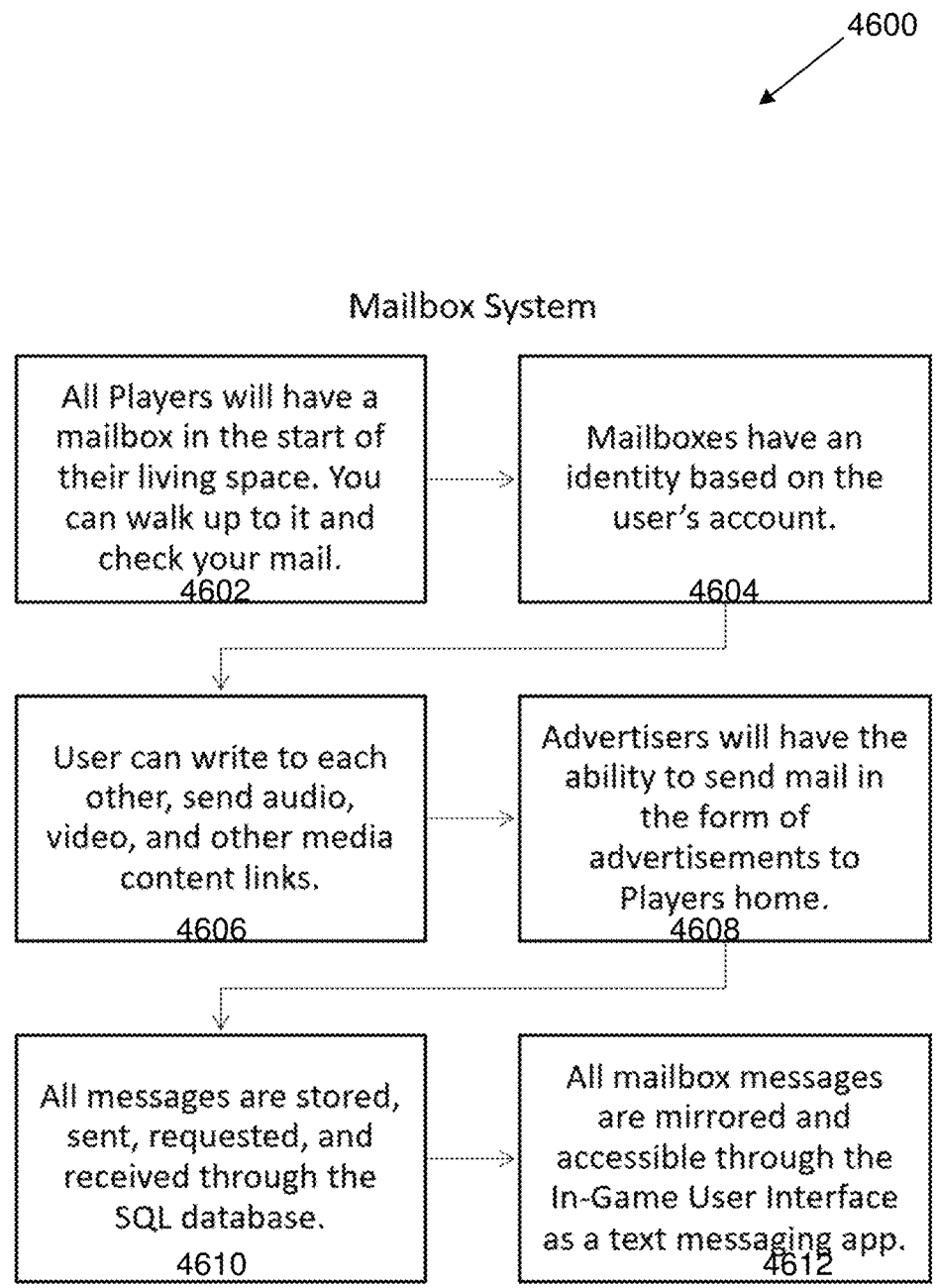
FIG. 46 is a flow diagram illustrating a sample method for providing a digital mailbox system according to an embodiment of the present disclosure.

Referring to FIGS. 46-47, a method 4600 and accompanying illustration 4700 are schematically illustrated. At step 4602, the method 4600 may include enabling users to having a mailbox 4702 rendered in their virtual home when they sign into the client application. The user can walk up to the mailbox 4702 with their avatar and check their electronic mail. At step 4604, the method 4600 may include enabling the mailbox 4702 have an identity based on the user's account stored in the system 100. At step 4606, the method 4600 may include enabling users to write to each other, and/or send audio, video, and/or other links to other users. At step 4608, the method 4600 may include enabling advertisers to have the ability to send mail in the form of advertisements to the user's mailbox 4702 in the virtual world. At step 4610, the method 4600 may include storing, sending, requesting, and receiving all messages from the mailbox 4702 by using the database 155. At step 4612, the method 4600 may include mirroring all mailbox messages and making them accessible via the in-game phone interface 3202, 3302 as a text messaging application in the virtual world. In FIG. 47, a sample mailbox interface 4704 is shown. Notably, any of the methods and/or steps of the methods described in FIGS. 1-48 and/or in the present disclosure may be combined with any other method, methods, and/or steps of methods described in FIGS. 1-48 and/or in the present disclosure.

The systems and methods disclosed herein may include additional functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by learning the types of events and activities that users typically participate in and automatically suggesting new events and activities for the users to participate in based on the user's preferences or history, a reduced amount of computer operations need to be performed by the devices in the system 100 using the processors and memories of the system 100 than if the users have to specifically request access to new events and activities as a separate step. In such a context, less processing power needs to be utilized because the processors and memories do not need to be dedicated for processing such requests. As a result, there are substantial savings in the usage of computer resources by utilizing the software and algorithms provided in the present disclosure. In certain embodiments, various operative functionality of the system 100 may be configured to execute on one or more graphics processors and/or application specific integrated processors. For example, the rendering of the virtual worlds may be performed on the graphics processors, and, in certain embodiments, as the system 100 learns over time various user preferences and/or actions conducted in the system 100, artificial intelligence and/or machine learning algorithms facilitating such learning may also be executed on graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the application and/or the system. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, upon receiving a request from a user (e.g. first user 101) to participate in a particular event or activity in the digital world, any device in the system 100 may transmit a signal to a computing device receiving or processing the request that only a specific quantity of computer processor resources (e.g. processor clock cycles, processor speed, etc.) may be devoted to processing the input, any other operation conducted by the system 100, or any combination thereof. For example, the signal may indicate a number of processor cycles of a processor may be utilized to process the input, and/or specify a selected amount of processing power that may be dedicated to processing the input or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 48:
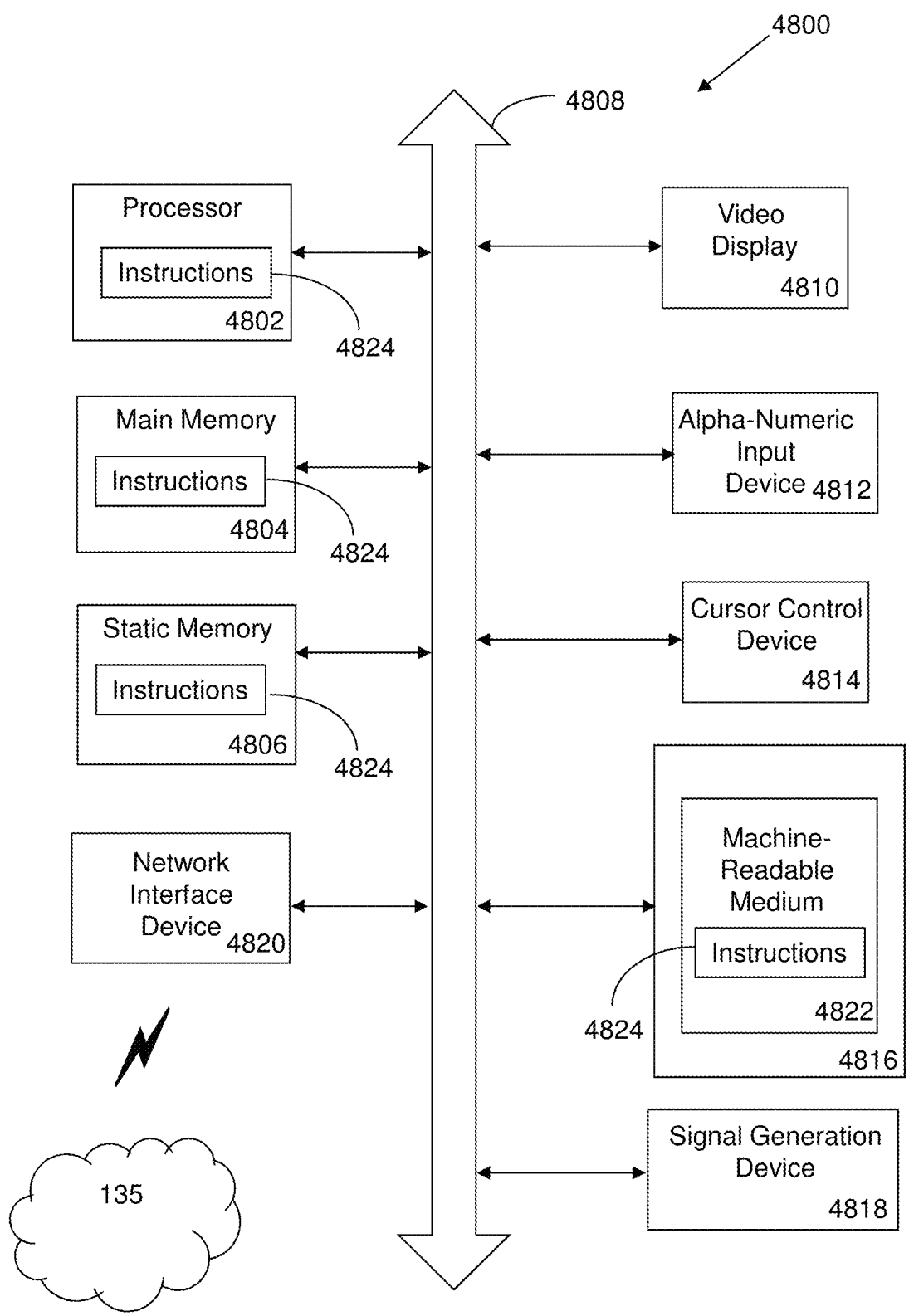
FIG. 48 is a schematic diagram of a machine in the form of a computer system within which a set of instructions, when executed, may cause the machine to perform any one or more of the methodologies or operations of the systems and methods for providing the functional features of the virtual reality system described in the present disclosure.

Referring now also to FIG. 48, at least a portion of the methodologies and techniques described with respect to the exemplary embodiments of the system 100 can incorporate a machine, such as, but not limited to, computer system 4800, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the cameras 117, the sensors 125, the on-site computing device 120, the server 140, the server 150, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 4800 may include a processor 4802 (e.g., a central processing unit (CPU), a graphics processing unit (GPU, or both), a main memory 4804 and a static memory 4806, which communicate with each other via a bus 4808. The computer system 4800 may further include a video display unit 4810, which may be, but is not limited to, a liquid crystal display (LCD), a flat panel, a solid state display, or a cathode ray tube (CRT). The computer system 4800 may include an input device 4812, such as, but not limited to, a keyboard, a cursor control device 4814, such as, but not limited to, a mouse, a disk drive unit 4816, a signal generation device 4818, such as, but not limited to, a speaker or remote control, and a network interface device 4820.

The disk drive unit 4816 may include a machine-readable medium 4822 on which is stored one or more sets of instructions 4824, such as, but not limited to, software embodying any one or more of the methodologies or functions described herein, including those methods illustrated above. The instructions 4824 may also reside, completely or at least partially, within the main memory 4804, the static memory 4806, or within the processor 4802, or a combination thereof, during execution thereof by the computer system 4800. The main memory 4804 and the processor 4802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 4822 containing instructions 4824 so that a device connected to the communications network 135, another network, or a combination thereof, can send or receive voice, video or data, and communicate over the communications network 135, another network, or a combination thereof, using the instructions. The instructions 4824 may further be transmitted or received over the communications network 135, another network, or a combination thereof, via the network interface device 4820.

While the machine-readable medium 4822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
    a memory that stores instructions; and
    a processor that executes the instructions to perform operations, the operations comprising:
        receiving, via a client application executing on a first user device, authentication credentials associated with a user of the client application;
        logging, based on the authentication credentials, the user into the client application;
        loading, after logging the user into the client application, a virtual home for the user and an avatar for the user, wherein the virtual home is rendered and viewable via a graphical user interface of the client application and resides within a virtual world rendered by the client application;
        enabling, via the client application, the user to join a live event or activity occurring in a real world, wherein the live event or activity is occurring in a first location that is different from a second location that the first user device and the user are located at;
        generating an event profile table for the live event or activity that includes incoming event data and media content generated during the live event or activity, wherein the event profile table references recorded source data in the incoming event data and media content corresponding to audio, video, lighting, or fixture sequences occurring at the live event or activity;
        generating, based on the recorded source data, a virtual object for inclusion in a digital version of the live event or activity in the virtual world that corresponds to a physical object at the live event or activity;
        digitally rendering the digital version of the live event or activity within the virtual world in accordance with the event profile table, wherein the virtual object is placed at a virtual location in the virtual world based on data corresponding to a location of the physical object at the live event or activity in the recorded source data, and wherein the virtual object is configured to perform, via a data stream of the event profile table, an action in accordance a portion of the audio, video, lighting, or fixture sequences occurring at the live event or activity that are associated with the physical object; and
        enabling, via the client application, the user to participate in the digital version of the live event or activity.

2. The system of claim 1, wherein the operations further comprising detecting a performer performing at the live event or activity by utilizing one or more sensors located in proximity to the live event or activity.

3. The system of claim 2, wherein the operations further comprise transmitting depth sensor imagery information from the sensors to a server for processing, and wherein the operations further comprise aligning the depth sensor imagery information from each of the sensors to generate a complete wraparound digital view of the performer.

4. The system of claim 3, wherein the operations further comprise rendering the complete wraparound digital view of the performer on the client application in the digital version of the live event at a location in the virtual world corresponding to an actual location of the performer at the live event or activity in the real world.

5. The system of claim 1, wherein the operations further comprise enabling the user to access a content stream of the live event or activity obtained from one or more cameras positioned in proximity to the live event or activity, and wherein the operations further comprise displaying the content stream of the live event or activity.

6. The system of claim 5, wherein the operations further comprise generating an avatar for a performer at the live event or activity based on location data streams and tracking data obtained from one or more sensors at the live event or activity, wherein the operations further comprise defining digital positions of the performer in the virtual world corresponding to actual positions of the performer at the live event or activity based on the location data streams and tracking data, wherein the operations further comprise causing the avatar for the performer to move to the digital positions in real-time with the actual positions of the performer at the live event or activity, thereby enabling for real-time emulation of the live event or activity.

7. The system of claim 6, wherein the operations further comprise obtaining motion capture data from a wearable device worn by a performer at the live event or activity, wherein the wearable device obtains the motion capture data from one or more sensors positioned on a body of the performer at the live event or activity.

8. The system of claim 7, wherein the operations further comprise parsing the motion capture data to define an avatar of the performer at the live event or activity, wherein the operations further comprise applying the motion capture data to the avatar, and wherein the operations further comprise replicating movement of the performer in the real world within the virtual world by utilizing the avatar and the motion capture data.

9. The system of claim 1, wherein the operations further comprise obtaining a media content stream from a 360 degree camera positioned at the live event or activity in the real world, wherein the operations further comprise providing an identity for the media content stream obtained from the 360 degree camera, wherein the operations further comprise generating a complete wraparound view of at least a portion of the live event or activity, and wherein the operations further comprise streaming the complete wraparound view to the client application.

10. The system of claim 9, wherein the operations further comprise generating an identity table for the live event or activity, wherein the operations further comprise recording incoming data associated with the live event or activity into a set of folders, wherein the identity table references the recorded source data for the audio, video, lighting and fixture sequences, point cloud data, animations, and scene configurations, and wherein the operations further comprise configuring virtual audio emitters, virtual light emitting diode walls, virtual point cloud display objects, virtual lights, and virtual fixtures based on the recorded source data.

11. The system of claim 1, wherein the operations further comprise positioning virtual lights, virtual fixtures, virtual point cloud display objects, virtual video walls, and virtual visual effects at locations in the virtual world that correspond to actual locations for lights, fixtures, objects, and visual effects existing in the real world.

12. The system of claim 1, wherein the operations further comprise providing a virtual phone user interface viewable within the virtual world for the user, wherein the operations further comprise enabling access to features and functionality in the virtual world via the virtual phone user interface.

13. A method, comprising:
receiving, via a client application executing on a first user device, authentication credentials associated with a user of the client application;
logging, based on the authentication credentials, the user into the client application;
loading, after logging the user into the client application, a virtual home for the user and an avatar for the user, wherein the virtual home is rendered and viewable via a graphical user interface of the client application and resides within a virtual world rendered by the client application, wherein the loading is performed by utilizing instructions from a memory that are executed by a processor;
enabling, via the client application, the user to join a live event or activity occurring in a real world, wherein the live event or activity is occurring in a first location that is different from a second location that the first user device and the user are located at;
generating an event profile table for the live event or activity that includes incoming event data and media content generated during the live event or activity, wherein the event profile table references recorded source data in the incoming event data and media content corresponding to audio, video, lighting, or fixture sequences occurring at the live event or activity;
generating, based on the recorded source data, a virtual object for inclusion in a digital version of the live event or activity in the virtual world that corresponds to a physical object at the live event or activity;
digitally rendering the digital version of the live event or activity within the virtual world in accordance with the event profile table, wherein the virtual object is configured to perform, via a data stream of the event profile table, an action in accordance a portion of the audio, video, lighting, or fixture sequences occurring at the live event or activity that are associated with the physical object; and
enabling, via the client application, the user to participate in the digital version of the live event or activity.

14. The method of claim 13, further comprising populating virtual vendors and booths including virtual merchandise in the virtual world, further comprising enabling the user to interact with the virtual merchandise, further comprising displaying an inventory quantity associated with the virtual merchandise and a preview of the virtual merchandise in three-dimensional imagery.

15. The method of claim 14, further comprising receiving an order for a first product of the virtual merchandise, further comprising providing a rendered three-dimensional virtual version of the first product to the user in the virtual world in response to the order, and further comprising shipping an actual real-life version of the first product to a location specified by the user in the real world.

16. The method of claim 13, further comprising providing an interactive object within the virtual world for the user to interact with, further comprising prompting the user to access content associated with the interactive object via a virtual phone user interface rendered in the virtual world, wherein the prompting of the user is performed in response to the user interacting with the interactive object.

17. The method of claim 16, further comprising creating a user profile for the user and connecting to a social media application and a social media account associated with the user, further comprising loading social media data corresponding to the social media account into a virtual phone user interface within the virtual world, further comprising enabling the user to interact with other users using the social media application and social media account in the virtual world.

18. The method of claim 17, further comprising sharing social media content associated with the social media account with the other users connected to the social media account of the user, further comprising causing the social media account of the user to add the other users as friends when the avatar of the user is in proximity with avatars of the other users in the virtual world.

19. The method of claim 18, further comprising providing an animated three-dimensional printer within the virtual world for creating virtual bracelets within the virtual world, further comprising enabling media content to be attached to the virtual bracelets.

20. A non-transitory computer-readable device comprising instructions, which when loaded and executed by a processor, cause the processor to perform operations comprising:
receiving, via a client application executing on a first user device, authentication credentials associated with a user of the client application;
logging, based on the authentication credentials, the user into the client application;
loading, after logging the user into the client application, a virtual home for the user and an avatar for the user, wherein the virtual home is rendered and viewable via a graphical user interface of the client application and resides within a virtual world rendered by the client application;
enabling, via the client application, the user to join a live event or activity occurring in a real world, wherein the live event or activity is occurring in a first location that is different from a second location that the first user device and the user are located at;
generating an event profile table for the live event or activity that includes incoming event data and media content generated during the live event or activity, wherein the event profile table references recorded source data in the incoming event data and media content corresponding to audio, video, lighting, or fixture sequences occurring at the live event or activity;
generating, based on the recorded source data, a virtual object for inclusion in a digital version of the live event or activity in the virtual world that corresponds to a physical object at the live event or activity;
digitally rendering the digital version of the live event or activity within the virtual world in accordance with the event profile table, wherein the virtual object is configured to perform, via a data stream of the event profile table, an action in accordance a portion of the audio, video, lighting, or fixture sequences occurring at the live event or activity that are associated with the physical object; and enabling, via the client application, the user to participate in the digital version of the live event or activity.

* * * * *